US010552651B1

(12) United States Patent
Fink et al.

(10) Patent No.: US 10,552,651 B1
(45) Date of Patent: Feb. 4, 2020

(54) FREQUENCY MULTIPLEXED RADIO FREQUENCY IDENTIFICATION

(71) Applicant: United States of America as represented by the Administrator of the National Aeronautics and Space Administration, Washington, DC (US)

(72) Inventors: Patrick W. Fink, Missouri City, TX (US); Gregory Y. Lin, Friendswood, TX (US); Timothy F. Kennedy, Sugar Land, TX (US); Phong H. Ngo, Friendswood, TX (US)

(73) Assignee: United States of America as represented by the Administrator of the National Aeronautics and Space, Washington, DC (US)

( * ) Notice: Subject to any disclaimer, the term of this patent is extended or adjusted under 35 U.S.C. 154(b) by 106 days.

(21) Appl. No.: 15/635,843

(22) Filed: Jun. 28, 2017

Related U.S. Application Data

(60) Provisional application No. 62/356,121, filed on Jun. 29, 2016.

(51) Int. Cl.
*G06K 7/10* (2006.01)
*H04L 5/14* (2006.01)
(Continued)

(52) U.S. Cl.
CPC ............ *G06K 7/10356* (2013.01); *H04L 5/14* (2013.01); *H01Q 15/0013* (2013.01); *H04B 1/713* (2013.01)

(58) Field of Classification Search
None
See application file for complete search history.

(56) References Cited

U.S. PATENT DOCUMENTS

| 7,012,516 B2 | 3/2006 | Laurosch et al. |
| 7,042,346 B2 | 5/2006 | Paulsen |

(Continued)

FOREIGN PATENT DOCUMENTS

| CH | 89070 A5 | 8/1998 |
| DE | 19826428 A1 | 6/1998 |

(Continued)

OTHER PUBLICATIONS

Lee et al., "Compact Miniaturized Antenna for 210 MHz RFID," Antennas and Propagation Society International Symposium, 2008, AP-S 2008, IEEE.

(Continued)

*Primary Examiner* — Carlos Garcia
(74) *Attorney, Agent, or Firm* — Kurt G. Hammerle; Edward K. Fein

(57) ABSTRACT

A radio frequency identification (RFID) system for frequency multiplexing includes, in an exemplary embodiment, an RFID interrogator configured for generating an RFID signal, wherein a channel frequency of the RFID signal changes over time; at least one antenna or transmission line; and a diplexer coupling the RFID interrogator and the antennas or transmission lines and configured for distributing the RFID signal to each of the antennas or transmission lines, respectively, depending on the channel frequency of the RFID signal generated. The antennas or transmission lines are configured to transmit an electromagnetic wave in response to and at the channel frequency of the RFID signal distributed thereto. Other embodiments include RFID systems and methods including a frequency selective surface and both similar and different components and aspects for frequency multiplexing.

14 Claims, 18 Drawing Sheets

US 10,552,651 B1
Page 2

(51) Int. Cl.
  *H04B 1/713* (2011.01)
  *H01Q 15/00* (2006.01)

(56) References Cited

U.S. PATENT DOCUMENTS

| | | |
|---|---|---|
| 7,119,659 B2 | 10/2006 | Bonalle et al. |
| 7,250,865 B2 | 7/2007 | Maloney |
| 7,310,070 B1 | 12/2007 | Hardman et al. |
| 7,348,884 B2 | 3/2008 | Higham |
| 7,570,168 B2 | 8/2009 | Hubmer et al. |
| 7,648,065 B2 | 1/2010 | Marino |
| 7,920,764 B2 | 4/2011 | Kewitsch |
| 8,094,028 B2 | 1/2012 | Braun et al. |
| 8,115,618 B2 | 2/2012 | Robertson et al. |
| 8,138,925 B2 | 3/2012 | Downie et al. |
| 8,717,238 B2 | 5/2014 | Fogg et al. |
| 10,025,960 B1* | 7/2018 | Fink ............... G06K 7/10356 |
| 2003/0141962 A1 | 7/2003 | Barink |
| 2005/0143023 A1* | 6/2005 | Shih ............... H04B 1/005 455/101 |
| 2007/0080804 A1 | 4/2007 | Hirahara et al. |
| 2008/0068173 A1 | 3/2008 | Alexis et al. |
| 2008/0074271 A1 | 3/2008 | Hodges |
| 2012/0056717 A1 | 3/2012 | Maharbiz et al. |
| 2012/0133488 A1 | 5/2012 | Choi et al. |

FOREIGN PATENT DOCUMENTS

| | | |
|---|---|---|
| DE | 102007034437 A1 | 5/2008 |
| EP | 1693778 A1 | 2/2006 |
| FR | 2836581 A1 | 2/2002 |
| WO | WO2005081808 A1 | 9/2005 |
| WO | WO2010151132 A1 | 12/2010 |

OTHER PUBLICATIONS

Samani, "Using RFID Technology to Locate Missing Books in the Library: A Feasibility Study," Diss. University of Nottingham, 2006.

Ching et al., The Right UHF RFID Tags for Libraries-Criteria, Concerns and Issues, 2011.

Menzel et al., "Potentials for Radio Rreqency Identification in AEC/FM," Tsinghua Science and Technology, 2008, pp. 329-335, vol. 13, Issue S1.

Foina et al., "An RFID Bulk Cargo Supervising System," Latin America Tranactions, IEEE, 2009, pp. 688-693, vol. 7, Issue 6.

\* cited by examiner

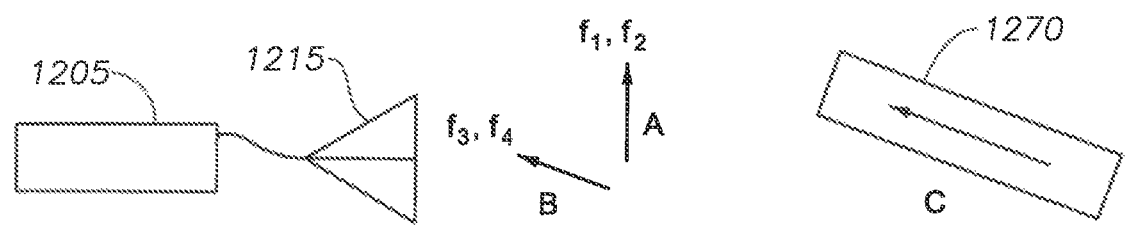
FIG. 12
FIG. 13
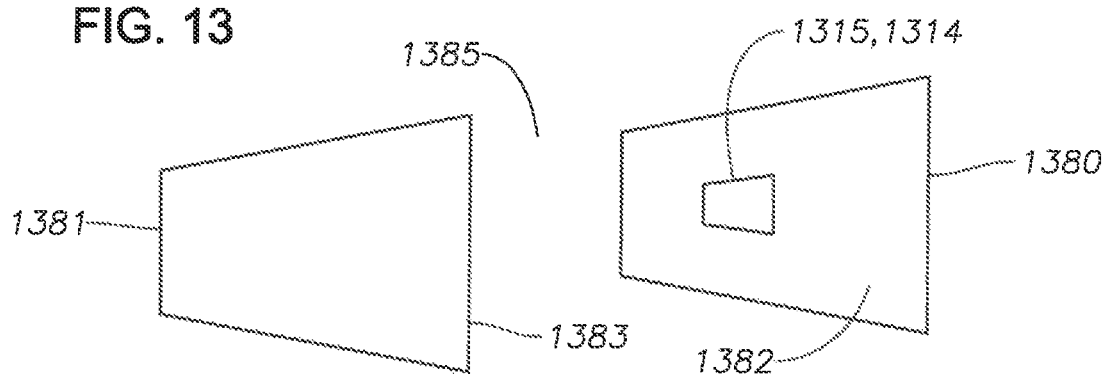
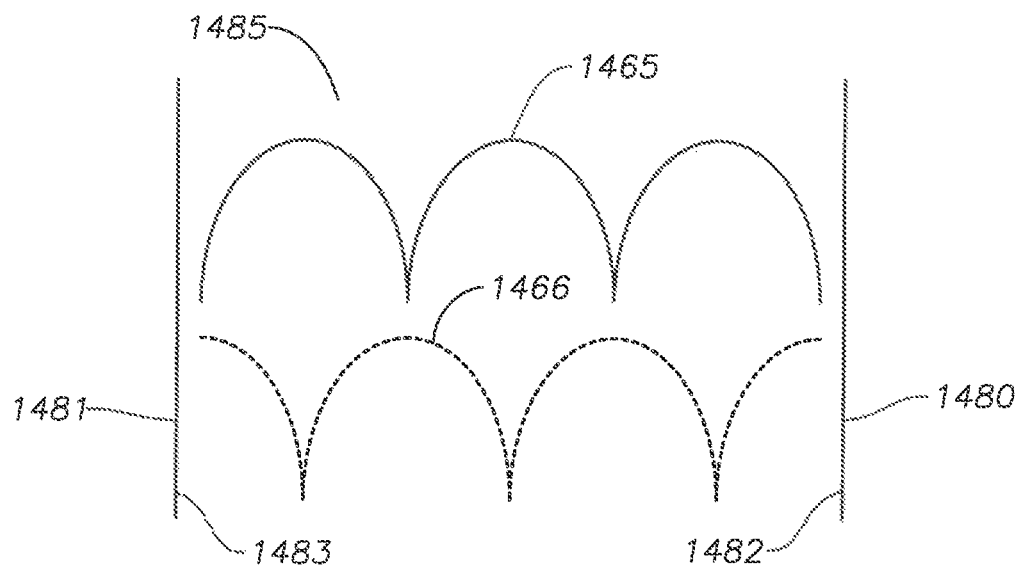
FIG. 14

FREQUENCY MULTIPLEXED RADIO FREQUENCY IDENTIFICATION

CROSS-REFERENCE TO RELATED APPLICATIONS

This application claims priority to U.S. Provisional Application Ser. No. 62/356,121 titled "Systems, Apparatuses and Methods for Frequency Multiplexed Radio Frequency Identification," filed on Jun. 29, 2016, and is incorporated herein in its entirety by reference.

ORIGIN OF THE INVENTION

The invention described herein was made by employees of the United States government and may be manufactured and used by or for the government of the United States of America for governmental purposes without the payment of any royalties thereon or therefor.

FIELD OF THE DISCLOSURE

The present disclosure relates generally to the field of radio frequency identification ("RFID"). More particularly, the disclosure relates to frequency multiplexing in the context of RFID.

SUMMARY

Embodiments disclosed herein provide systems, methods, and apparatuses for frequency multiplexed Radio Frequency Identification (RFID).

According to a first aspect of the disclosure, a radio frequency identification (RFID) system is provided. The system comprises an RFID interrogator configured for generating an RFID signal, wherein a channel frequency of the RFID signal changes over time; a plurality of antennas; and a diplexer coupling the RFID interrogator and the plurality of antennas and configured for distributing the RFID signal to each of the plurality of antennas, respectively, depending on the channel frequency of the RFID signal generated. Each of the plurality of antennas is configured to transmit an electromagnetic wave in response to and at the channel frequency of the RFID signal distributed thereto.

According to a second aspect of the disclosure, a radio frequency identification (RFID) system is provided. The system comprises an RFID interrogator configured for generating an According to a second aspect of the disclosure, a radio frequency identification (RFID) system is provided. The system comprises an RFID interrogator configured for generating an RFID signal, wherein a channel frequency of the RFID signal changes over time; a plurality of transmission lines, each of the plurality of transmission lines being at least partially open; and a diplexer coupling the RFID interrogator and the plurality of transmission lines and configured for distributing the RFID signal to each of the plurality of transmission lines, respectively, depending on the channel frequency of the RFID signal generated. Each of the plurality of transmission lines is configured to transmit an electromagnetic signal in response to and at the channel frequency of the RFID signal distributed thereto.

According to a third aspect of the disclosure, a radio frequency identification (RFID) system is provided. The system comprises an RFID interrogator configured for generating an RFID signal, wherein a channel frequency of the RFID signal changes over time; a first narrow band antenna, characterized by a first passband, the first passband corresponding to a first range of frequencies; a second narrow band antenna, characterized by a second passband, the second passband corresponding to a second range of frequencies, wherein the second range of frequencies differs from the first range of frequencies, whereby the second passband differs from the first passband; and first and second feed lines configured for feeding the RFID signal to each of the first and second narrow band antennas, respectively. The first narrow band antenna is configured to transmit a first electromagnetic wave in response to and at the channel frequency of the RFID signal fed thereto, if the channel frequency of the RFID signal falls within the first passband, and the second narrow band antenna is configured to transmit a second electromagnetic wave in response to and at the channel frequency of the RFID signal fed thereto, if the channel frequency of the RFID signal falls within the second passband.

According to a fourth aspect of the disclosure, a radio frequency identification (RFID) system is provided. The system comprises an RFID interrogator configured for generating an RFID signal, wherein a channel frequency of the RFID signal changes over time; at least one single feed patch antenna; a first feed line configured for feeding the RFID signal to the single feed patch antenna, if the channel frequency of the RFID signal falls within a first passband; and a second feed line configured for feeding the RFID signal to the single feed patch antenna, if the channel frequency of the RFID signal falls within a second passband, the second passband being different than the first passband. The single feed patch antenna is configured to transmit a first electromagnetic wave in response to and at the channel frequency of the RFID signal fed thereto from the first feed line and a second electromagnetic wave in response to and at the channel frequency of the RFID signal fed thereto from the second feed line.

According to a fifth aspect of the disclosure, a radio frequency identification (RFID) system is provided. The system comprises an RFID interrogator configured for generating an RFID signal, wherein a channel frequency of the RFID signal changes over time within a given bandwidth; at least one single feed patch antenna; and a single feed line configured for feeding the RFID signal to the at least one single feed patch antenna. The single feed patch antenna is configured to transmit an electromagnetic wave in response to and at the channel frequency of the RFID signal fed thereto from the feed line. The single feed patch antenna is further configured such that the electromagnetic wave exhibits (1) a polarization tilt angle that varies depending on the channel frequency of the RFID signal, (2) a substantially linear polarization at all channel frequencies of the RFID signal within the given operational bandwidth, and (3) a range of polarization tilt angles across the given operational bandwidth that spans at least 70 degrees within a single quadrant.

According to a sixth aspect of the disclosure, a radio frequency identification (RFID) system is provided. The system comprises an RFID interrogator configured for generating an RFID signal, wherein a channel frequency of the RFID signal changes over time within an operating bandwidth, the operating bandwidth comprising a first portion thereof and a second portion thereof, the first portion of the operating bandwidth not completely overlapping with the second portion of the operating bandwidth; at least one antenna; and a frequency selective surface. The RFID signal is to be fed to the least one antenna, and the least one antenna is configured to transmit an electromagnetic wave in response to the RFID signal fed thereto. The frequency selective surface is configured to present as a boundary condition a surface impedance that changes according to the frequency of an electromagnetic wave impinging thereon. The frequency selective surface is configured such that (1) when the channel frequency of the RFID signal falls within the first portion of the operating bandwidth, a first surface impedance is established on the frequency selective surface that alters, according to a first pattern, the electromagnetic wave transmitted by the at least one antenna and/or an electromagnetic wave transmitted by an RFID tag for reception by the at least one antenna, and (2) when the channel frequency of the RFID signal falls within the second portion of the operating bandwidth, a second surface impedance is established on the frequency selective surface that alters, according to a second pattern, the electromagnetic wave transmitted by the at least one antenna and/or an electromagnetic wave transmitted by an RFID tag for reception by the at least one antenna. The first pattern differs from the second pattern.

According to a seventh aspect of the disclosure, a radio frequency identification (RFID) system is provided. The system comprises an RFID interrogator configured for generating an RFID signal, wherein a channel frequency of the RFID signal changes over time within an operating bandwidth, the operating bandwidth comprising a first portion thereof and a second portion thereof, the first portion of the operating bandwidth not overlapping with the second portion of the operating bandwidth; and one or more electromagnetic transmissive elements each extending between a first end thereof and a second end thereof, each of the electromagnetic transmissive elements electrically coupled with the RFID interrogator at the first end thereof, each of the electromagnetic transmissive elements comprising a frequency dependent load at the second end thereof and configured for transmitting the RFID signal from the RFID interrogator to the frequency dependent load, wherein the frequency dependent load presents different electromagnetic characteristics to the RFID signal transmitted to the frequency dependent load depending on the channel frequency of the RFID signal.

According to an eighth aspect of the disclosure, a radio frequency identification (RFID) method is provided. The method comprises generating an RFID signal, wherein a channel frequency of the RFID signal generated changes over time; distributing the RFID signal to a plurality of electromagnetic transmissive elements at different times, respectively, depending on the channel frequency of the RFID signal generated; transmitting a first electromagnetic signal having a first channel frequency in response to a first distributed RFID signal having the first channel frequency; and transmitting a second electromagnetic signal having a second channel frequency in response to a second distributed RFID signal having the second channel frequency. The plurality of electromagnetic transmissive elements comprises a plurality of antennas, a plurality of antenna feed lines, or a plurality of at least partially open transmission lines.

According to a ninth aspect of the disclosure, a radio frequency identification (RFID) method is provided. The method comprises generating an RFID signal, wherein a channel frequency of the RFID signal changes over time within a bandwidth; feeding the RFID signal to a microstrip antenna; and transmitting, by the microstrip antenna, an electromagnetic wave in response to the RFID signal fed thereto, the electromagnetic wave having a polarization that varies depending on the channel frequency of the RFID signal fed thereto.

Other aspects and features of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 12 is a schematic diagram, in accordance with one or more embodiments described herein, of determination of RFID tag orientation based on polarization, which may be performed by a frequency multiplexing RFID system.

FIG. 13 is a schematic diagram, in accordance with one or more embodiments described herein, of an arrangement employing a frequency selective surface in the context of frequency multiplexing RFID.

FIG. 14 is a schematic diagram, in accordance with one or more embodiments described herein, of an arrangement employing a frequency selective surface in the context of frequency multiplexing RFID, showing the effects of the frequency selective surface on electric fields of electromagnetic waves used in the frequency multiplexing RFID.

NOTATION AND NOMENCLATURE

Figure 1:
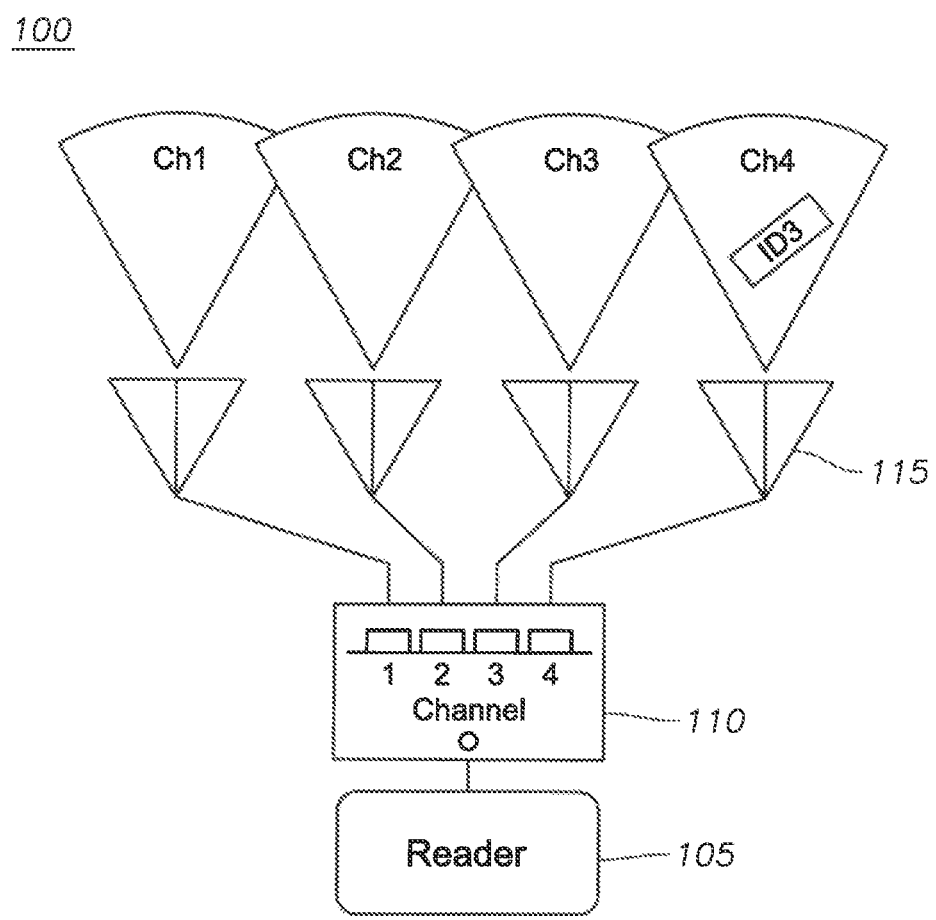
FIG. 1 is a schematic diagram, in accordance with one or more embodiments described herein, of a frequency multiplexing RFID system including a reader, a diplexer and a plurality of antennas.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" (and the like) are used in an open-ended fashion, and thus should be interpreted to mean "including, but not limited to . . . ." Also, the term "couple", "coupled" or "couples" (and the like) is intended to mean either an indirect or direct connection. Thus, if a first device couples to a second device, that connection may be through a direct connection, or through an indirect connection via other devices and connections. The word "or" is used in the inclusive sense (i.e., "and/or") unless a specific use to the contrary is explicitly stated. The word "substantially" (where not already preceded by the words "at least") shall be construed to mean "at least substantially."

It should be noted that the terms "radio frequency" (RF) and "microwave" are used interchangeably herein. The terms "interrogator" and "reader" are likewise used interchangeably to connote a transceiver that transmits electromagnetic radiation to one or more RFID tags and receives responses from the one or more RFID tags. While the interrogator may be operationally coupled to one or more processors, such processors may be internal and/or external to the interrogator. For example, in some cases the interrogator may have an internal or embedded processor that controls the functionality of the interrogator and is also capable of decoding and utilizing information received from one or more tags. In other cases, the interrogator might have an internal or embedded processor that controls the communication functionality of the interrogator, and an interface to an external processor enables the external processor to utilize information received from the one or more tags.

Although there is not unanimous concurrence regarding the definition of "waveguides" and "transmission lines," the consensus opinion is that transmission lines are a subset of waveguides that propagate, predominantly, transverse electromagnetic (TEM) waves. Herein, the term "transmission line" is used in a more general sense to denote an elongated device for transferring electromagnetic energy between two pieces of equipment, regardless of the specific propagation modes established within the elongated device. Although the term "waveguide" sometimes is construed to mean a hollow elongated, usually conductive, tube, the intent in this detailed description is the more general meaning relating to any structure designed to propagate an electromagnetic field in one or more intended directions.

The terms "pattern," "antenna pattern," "(antenna) radiation distribution pattern" or the like used herein pertain to the radiation distribution produced over a solid angular region by an antenna in response to an injection of electromagnetic energy within a specific operating frequency band or set of operating frequency bands. The pattern may comprise one or more primary beams, wherein "beam" is used to denote a pattern of radiation density over an angular span that contains a peak radiation density, and "beam" can also be described as a major lobe. In addition to the radiation intensity produced as a function of angle, "pattern" may also convey the variation in polarization as a function of angle. It is possible for a pattern to contain multiple lobes or beams, each lobe or beam characterized by a local maximum of radiation density. (It will be understood that the word "pattern" by itself may also be used herein to refer not to an antenna radiation distribution pattern but rather to another kind of pattern, whether of radiation or not. Context will make clear the meaning of the word "pattern" when used by itself; for example, a pattern that is not an antenna radiation distribution pattern will not be presented as inherently associated with a particular antenna.)

The term "polarization vector" is used herein to describe the predominant polarization exhibited by an antenna at a particular frequency; that is, it is used synonymously with the major axis of an elliptically polarized electromagnetic field. Although an elliptically polarized field also exhibits instantaneous electromagnetic fields characterized by polarization vectors not aligned with the major axes, the term "polarization vector" is used herein to convey the polarization defined by the major axis of the polarization ellipse, unless explicitly stated otherwise or made apparent by the context of the description.

The term "localize" (and the like) refers to identifying the location or position of an item, either in a global fixed coordinate system or relative to some other item or coordinate system. Identifying the location or position of an item implies also detecting the presence or existence of an item. In addition, identifying the position of an item over time may effectively serve to identify its distance (e.g., distance between RFID tag (attached to an item) and reader or other fixed object) and its movement (e.g., speed, direction, etc.) and to track an item over time. Relatedly, the term "ranging" (and the like) refers to determining the distance of a tag from a reader (or other location), or vice versa. Again, distance may be deemed to imply location, presence, movement characteristics, etc. This disclosure also discusses determining the orientation or bearing of an item, which is related to but distinct from localization.

As used herein, the term "frequency multiplexing" (and the like) refers to an arrangement in which a signal is selectively distributed (or fed or transmitted) to one of multiple electromagnetic transmissive elements (e.g., one of multiple antennas, one of multiple fed lines, one of multiple transmission lines, etc.), depending on the frequency of the signal, and/or an arrangement in which signals excite different modes or polarizations, depending on the frequency of the signal. Such arrangements can also be combined. Frequency multiplexing may operate according to a first manner of operation such that when the frequency of a signal (e.g., generated by an RFID reader) is within a first band the signal is distributed (or fed or transmitted) to a first antenna (or transmission line, feed line, etc.), when the frequency of the signal is within a second band the signal is distributed (or fed or transmitted) to a second antenna (or transmission line, feed line, etc.), and so on. Frequency multiplexing may operate according to a second manner of operation such that when the frequency of a signal (e.g., fed to an antenna, etc.) is within a first band the antenna transmits a signal having a first polarization, when the frequency of the signal is within a second band the antenna (or a different antenna) transmits a signal having a second polarization, and so on, the first and second (and any additional) polarizations having respective different orientations. Thus, the second manner of operation may be implemented in a system having only one antenna or in a system having multiple antennas. In sum, frequency multiplexing serves effectively to switch or route a signal between different antennas (or between different transmission lines, between different feed lines, etc.) and/or between different polarizations or modes. Generating or transmitting a signal having a certain polarization may also be referred to as exciting a certain mode of a device such as an antenna, waveguide, or cavity. It will be understood that this switching or routing between different antennas, polarizations, etc. occurs over time. One of ordinary skill in the art, now having the benefit of this disclosure, will appreciate that, in this context, reference to frequency of a signal in application refers to the center frequency or carrier frequency of a modulated signal and not to the instantaneous frequency of a signal, which is constantly changing. In this disclosure, the application or use of frequency multiplexing in the context of RFID may be referred to as "frequency multiplexing RFID" or "frequency multiplexed RFID" interchangeably. In this disclosure, the terms "frequency multiplexing" and "frequency multiplexed" may be abbreviated as "FM."

"Frequency multiplexing" as the term is used herein is distinct from a number of similar terms. For example, frequency multiplexing is not the same as frequency-division multiplexing, which is a technique by which the total bandwidth available in a communication medium is divided into a series of non-overlapping frequency sub-bands, each of which is used to carry a separate signal, allowing a single transmission medium such as the radio spectrum, a cable, or optical fiber to be shared by multiple separate signals. Again, frequency multiplexing is not the same as mere multiplexing, as that term is used in various contexts to mean switching using a switch. It will be noted that frequency multiplexing may be achieved by passive means (e.g., a filter) and does not require or involve a switch (e.g., electrical, mechanical, etc.), active controls, a controller (whether machine or human), a power supply, etc.

The term "electromagnetic transmissive elements" is used herein to refer to elements that guide, direct or channel electromagnetic energy, and the term includes, e.g., antennas, antenna feed lines, microstrip lines, transmission lines, waveguides, etc. The terms "guide, direct or channel" are not intended to be limited to an antenna or radiative functionality and are intended to be broader than and to encompass the terms "transmit" and "receive."

With regard to systems, apparatuses and methods for frequency multiplexed radio frequency identification described herein, the term "operating bandwidth" (or "operational bandwidth") refers to the cumulative bandwidth of all channels (all frequencies) being used in the system, apparatus, or method (which cumulative bandwidth may also be referred to as the "operating spectrum"). In some RFID systems, the operating bandwidth may be divided into a number of narrower band-limited channels, and the interrogator operates within one of these channels while communicating with RFID tags. The interrogator may successively hop through these defined channels of the system ("frequency hopping," discussed below). In passive tag RFID, the tag response is often offset slightly in frequency from the interrogator transmit frequency to prevent it from being obscured. As used herein, the term "channel" will imply the band that includes both the interrogator and the tag response. The term "channel frequency" will imply the narrow bandwidth of frequencies that define the channel, and this term will be used in place of the terms "center frequency" and "carrier frequency, which were discussed above. As will be clear from context, the operating (or operational) bandwidth may sometimes be referred to simply as the "bandwidth." In some cases, the bandwidth of a particular antenna or other component, rather than of a system comprising a plurality of antennas or components, may be discussed.

With regard to systems, apparatuses and methods for frequency multiplexed radio frequency identification described herein, lengths of portions of waveguides, transmission lines, feed lines, etc. are often described in terms of (multiples of fractions of) a wavelength. Unless indicated to the contrary, such wavelength refers to the wavelength corresponding to the frequency at the center of the operating bandwidth (and such wavelength may also be referred to as the wavelength of the center of the operating bandwidth).

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this omission may not be explicitly noted in all cases.

While various embodiments are described herein, it should be appreciated that the embodiments described herein encompass many inventive concepts that may be embodied in a wide variety of contexts. The following detailed description of exemplary embodiments, read in conjunction with the accompanying drawings, is merely illustrative and is not to be taken as limiting the scope of the claims, as it would be impossible or impractical to include all of the possible embodiments and contexts in this disclosure. Upon reading this disclosure, many alternative embodiments will be apparent to persons of ordinary skill in the art. The scope of the invention is defined by the appended claims and equivalents thereof.

Illustrative embodiments are described below. In the interest of clarity, not all features of an implementation of the exemplary embodiments may be described or illustrated in this specification. In the development of any such embodiment, numerous implementation-specific decisions may be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

RFID technologies may be categorized into "sparse zone" and "dense zone" technologies. The term "dense zone" is used to refer to smart enclosures or shelves in which the electromagnetic fields are to some extent contained. The term "sparse zones" is used to refer to those areas outside of the dense zones, hence including generally open areas, but also cracks, crevices, or other obscured spaces that are not covered by dense zone technologies. It should be noted that it is possible to have overlap between dense and sparse zones, especially in those cases in which the dense zones are not fully shielded. For example, in the case of so-called "smart shelves," items on the shelf might be read by embedded transmission lines, but they might also be read by a zone reader in the general vicinity. Embodiments disclosed herein pertain to both dense and sparse zones, including those regions in which the zones overlap.

The most prevalent UHF RFID system worldwide is the EPCglobal Class 1 Generation 2 protocol (synonymous with ISO 18000-6C), which describes the communications between the interrogator, or reader, and the tag. This system enables efficient communications between a single reader and thousands of tags, and it is characterized by a narrow bandwidth. While high gain antennas can be used to achieve fine spatial resolution, such high gain antennas also generally require, at UHF frequencies, large antenna apertures. Such large apertures may be impractical within confined environments such as space habitats, e.g., the International Space Station (ISS).

Various embodiments will now be described. Embodiments disclosed herein employ systems and methods that may be referred to as frequency multiplexing, frequency multiplexed RFID, frequency multiplexed localization, or the like.

As discussed above, embodiments disclosed herein teach arrangements in which a signal is selectively distributed (or fed or transmitted) to one of multiple electromagnetic transmissive elements (e.g., one of multiple antennas, one of multiple feed lines, or one of multiple transmission lines), depending on the channel frequency of the signal, and arrangements in which signals excite different modes or polarizations, depending on the channel frequency of the signal. Such arrangements can also be combined. Thus, according to a first manner of operation, frequency multiplexing RFID may operate such that when the channel frequency of a signal (e.g., generated by an RFID reader) is within a first band the signal is distributed (or fed or transmitted) to a first antenna (or transmission line, feed line, etc.), when the channel frequency of the signal is within a second band the signal is distributed (or fed or transmitted) to a second antenna (or transmission line, feed line, etc.), and so on. According to a second manner of operation, frequency multiplexing may operate such that when the channel frequency of a signal (e.g., fed to an antenna, etc.) is within a first band the antenna transmits a signal having a first polarization, when the channel frequency of the signal is within a second band the antenna (or a different antenna) transmits a signal having a second polarization, and so on, the first and second (and any additional) polarizations (i.e., polarization vectors) being characterized by respective different orientations. Thus, the second manner of operation may be implemented in a system having only one antenna or in a system having multiple antennas. In sum, frequency multiplexing serves effectively to switch or route a signal between different antennas (or between different transmission lines, between different feed lines, etc.) and/or between different polarizations or modes.

According to a first described (set of) embodiment(s) (described below with reference to FIG. 1), RFID signals of different channel frequencies may be transmitted to respective different regions, and the location of a tagged item may be determined by reference to the channel frequency of the response signal sent by the item's RFID tag in conjunction with the coverage area associated with that channel frequency.

FIG. 1 is a schematic diagram of a frequency multiplexing (FM) RFID system 100 including an RFID reader or interrogator 105, a diplexer 110, and a plurality of reader antennas 115.

Reader 105 has the capability to broadcast over a range of channels, each channel corresponding to a different frequency band. RFID communication protocols typically utilize very narrow bands or channels over an allowed range of the frequency spectrum governed by a regional regulatory authority. In the United States, for example, the EPCglobal Class 1 Generation 2 protocol is required by the Federal Communications Commission (FCC) to implement Frequency Hopping Spread Spectrum (FHSS) over the range 902-928 MHz. FHSS is a method of transmitting radio signals by rapidly switching among many frequency channels, using a pseudorandom sequence. Each channel is typically very narrow, often about 500 kHz. Reader 105 may employ an FHSS approach, which alternates between different channels over time, i.e., generating a signal at a channel frequency within a first bandwidth for a first duration of time, then generating a signal at a channel frequency within a second bandwidth for a second duration of time, and so on (as mentioned, the sequence of alteration may be pseudorandom; channels may be repeated over time). According to embodiments disclosed herein, FM RFID may employ channels (bandwidths) as narrow as those utilized by the EPCglobal Class 1 Generation 2 protocol, or channels (bandwidths) covering a broader range of the spectrum. FM RFID may be designed to support a multitude of the FHSS channels.

FM RFID system 100 further includes a multi-channel diplexer 110, disposed between reader 105 and antennas 115, to distribute the signal generated by reader 105 to the antennas 115, as shown schematically (channels 1-4) in FIG. 1. Diplexer may comprise, e.g., a plurality of filters, such as bandpass filters, such that the signal generated by reader 105 is distributed to a respective one of the antennas 115 depending on the channel frequency of the signal. For example, with reference to FIG. 1, a first bandpass filter may pass only signals having a frequency within a first bandwidth (channel 1, say, 902-903 MHz) to a first (leftmost, in FIG. 1) antenna 115, a second bandpass filter may pass only signals having a frequency within a second bandwidth (channel 2, say, 904-905 MHz) to a second (left middle, in FIG. 1) antenna 115, a third bandpass filter may pass only signals having a frequency within a third bandwidth (channel 3, say, 906-907 MHz) to a third (right middle, in FIG. 1) antenna 115, and a fourth bandpass filter may pass only signals having a frequency within a fourth bandwidth (channel 4, say, 908-909 MHz) to a fourth (rightmost, in FIG. 1) antenna 115. While this example employs bandpass filters, it is also possible to use lowpass and highpass filters. While this example employs non-overlapping channels, it is also possible to employ overlapping channels. With use of diplexer 110, the use of a switch to distribute the signal of interrogator 105 is eliminated. The diplexer 110 may be a passive device (e.g., a filter such as a surface acoustic wave filter). As such, diplexer 110 does not require power, cabling, control signals, or control logic, as is used for a conventional distributed switched antenna system.

In response to the signal distributed to an antenna 115 (any one of the antennas 115) by diplexer 110, the antenna 115 transmits a signal (electromagnetic wave) having the channel frequency of the signal distributed thereto by diplexer 110. An RFID tagged item within the range of the transmitted electromagnetic wave transmits a signal (electromagnetic wave) in response to the transmitted electromagnetic wave. The response signal is received (most strongly) by one of the antennas 115, and sent to reader 105. Reader 105, e.g., in conjunction with associated processing logic, infers the location (or presence, distance, orientation, etc.) of the RFID tagged item) based on the channel frequency (channel) of the response signal and the antenna coverage area associated with that channel (the coverage area of the one of the antennas 115 that transmits and receives on that channel). That is, the RFID tagged item is determined to be in the coverage area of the particular one of the antennas 115 that transmits and receives on the channel used by the response signal. In the example shown in FIG. 1, the RFID tagged item, identified as "ID3," is determined to be located in the coverage area of the fourth (rightmost) antenna 115 because the response signal received from that RFID tag was received (most strongly) at channel 4. Thus, as reflected by the fact that the coverage areas are designated as Ch1-Ch4 in FIG. 1, in system 100 the respective coverage areas of antennas 115 correspond to the respective channels 1-4.

With further regard to the determination of location of the RFID tag, the operation thereof may be as follows. The response signal from the tag may be received by a single one of antennas 115 or by multiple antennas 115 (as discussed, depending on the channel frequency of the response signal). If the response signal is received by only a single antenna 115, the location of the tag would correspond to the coverage area of that antenna. If the response signal is received by multiple antennas 115, the received signal strengths on all receiving paths (receiving antennas 115) would be compared. The tag location estimate would be weighted according to the received signal strengths (as discussed, the received signal strengths collectively depend on the channel frequency of the response signal).

The determination of location of the RFID tag may also operate as follows. The (electromagnetic) spectral response of the tag might indicate a particular location with a non-obvious association. For example, in a complex scattering environment, a given location of a tag may result in specific recognizable spectral responses in each of two or more different antennas 115 due to the propagation channels established by each antenna 115 at each channel frequency. The system may learn the association between a given set of spectral responses received by a given set of antennas 115 and a given tag location. Such associations may be learned for multiple tag locations.

The remarks given above regarding determination of location in system 100 may apply to embodiments throughout this disclosure generally, not just to system 100. Also, although these remarks refer to determination of "location," they are intended to cover the full range of associated information (such as distance, presence, orientation/bearing, speed, direction, tracking information, etc.), as discussed elsewhere in this disclosure. The term "state" of an item may be used to refer to all or a portion of this information (i.e., location and associated information).

It should be noted that, for non-RFID systems, frequency multiplexing (FM) is typically achieved using pre-designed signal frequencies that are well separated so that filter bands are fairly distinct with sufficient separation such that the filter isolation between the two bands can be made very high. This separation is used because, in such other FM systems, transmission in any of the bands might occur simultaneously, so isolation between the bands help avoid interference. In such other FM systems, a given signal is fully in one band or another with considerable isolation between the bands, and there is a one-to-one correspondence between the defined physical operating bands (that would be defined by filters or diplexers) and the channels on which the transceivers operate. In addition, in such FM systems, different signals often flow simultaneously, thus necessitating the clear separation that is provided by having each signal contained in a band that is isolated from other bands. For example, multiple radio clients might each be serviced simultaneously by a distinct FM band, and isolation will avoid interference.

In contrast, in the context of FM RFID, the channels are generally very closely spaced and there are more distinct channels. The channel spacing is particularly close and the number of channels particularly high when the primary intent of the channelization is for FHSS. As described herein, only one channel is used at any given time so that isolation between adjacent channels is not much of a concern. The RFID FM systems described herein may have many more channels defined than segmentations defined by filters, diplexers, or other frequency dependent devices. Thus, some channel content might flow through more than one of said segmentations. The channelization scheme of this type of RFID thus would generally not be deemed well designed or well suited for other types of FM, because the channels are too closely spaced and hence would require filters that could not be realized in practice without unacceptable loss or size. However, FM is successfully applied in the RFID context as described in the instant disclosure by virtue of the highly statistical nature of RFID links, and, in some instances, application of artificial intelligence to derive conclusions or statistical inferences. For example, in many RFID scenarios, the reader interrogates the same tag many hundreds or thousands of times within a minute. Due to the closely spaced RFID channel bands, the RFID FM devices might not fully divert all power in its entirety as they would in other FM devices, so the power is smeared to more than one device (e.g., antenna, filter, waveguide). Said another way, the directivity of the FM devices in RFID applications is likely not as high as in other FM applications. As an example, with FM applied to an RFID application, channel frequencies at a low end of the operating spectrum might be directed strongly toward a first antenna direction or polarization. Channel frequencies at the other (i.e., high) end of the operating spectrum would be directed strongly toward a second antenna direction or polarization. Channels in between might direct some portion of power toward the first antenna direction or polarization with the remainder of power being directed toward the second antenna direction or polarization, with the ratio transitioning from predominance toward the first to predominance toward the second as the channel frequency increases. So while the characteristics of the communication channel owing to the interrogator channel frequency might not be conducive to a strong reader-tag link at any given time interval, over many trials in different channels, with the communication channel undergoing modifications from one trial to the next due to a frequency multiplexed influence, the system is more likely to succeed as compared to using other RFID techniques. Moreover, if allowed by regional governing regulations, the system can learn which FM configurations (channels) are optimal for communicating with each tag. This type of intermittent or variable performance would likely not be tolerable in other communication applications, for example, cellular communications. In some applications, the technology described herein are practical because of the inherent RFID range limitations imposed by safety and regulatory bodies. Diplexers can often be made very narrowband at the expense of efficiency, to the point where the decreased efficiency renders the diplexer impractical for other communication links if the channels were as narrow as in many RFID systems. However, antenna gain, transmit power, or both are often limited by regional regulations or by safety considerations. So, the power inefficiency of a narrowband diplexer can be inconsequential in many RFID links, and in some embodiments described herein, FM applied to RFID can result in improved performance that would not be possible by increasing transmit power or antenna gain due to regulatory or safety constraints. In other embodiments described herein, antenna designs are employed in novel ways to achieve integrated narrowband multiplexing based on the inherent band-limited features of these particular antenna designs, which heretofore have been considered only as limitations. The remarks in this paragraph apply generally to embodiments described herein.

Figure 2:
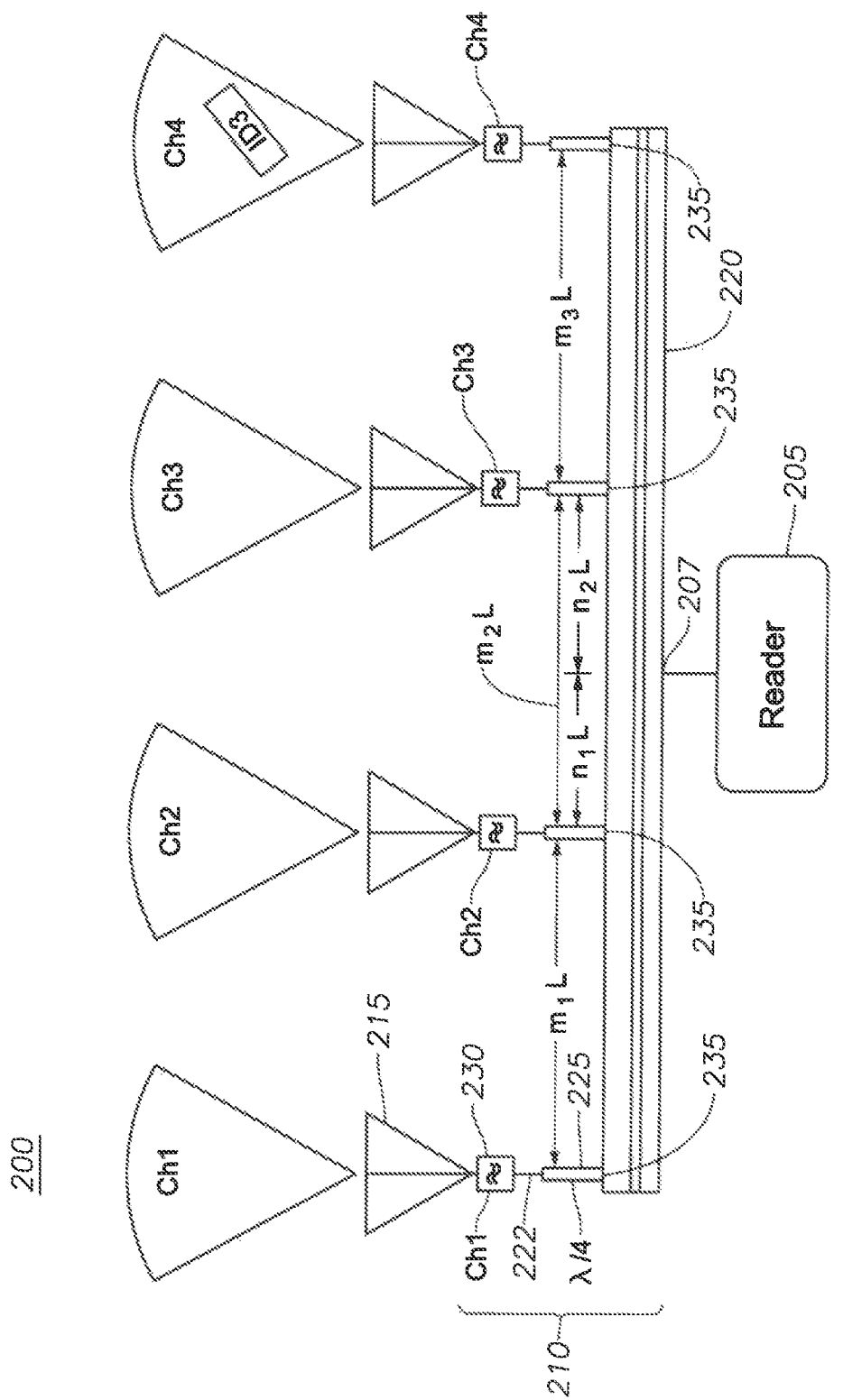
FIG. 2 is a schematic diagram, in accordance with one or more embodiments described herein, of a frequency multiplexing RFID system including a reader, a diplexer and a plurality of antennas, wherein the diplexer is implemented in a distributed fashion.

An alternative embodiment, or set of embodiments, is now described with reference to FIG. 2. FIG. 2 is a schematic diagram of an FM RFID system 200 including a reader 205, a diplexer 210 and a plurality of reader antennas 215, wherein the diplexer 210 is implemented in a distributed fashion. In the arrangement shown in FIG. 2, diplexer 210 includes a waveguide 220, a plurality of (e.g., quarter-wave) impedance transformers 225, and a plurality of filters 230. Each impedance transformer 225 is coupled to a respective filter 230, and each filter 230 is coupled to a respective antenna 215. As described with reference to FIG. 1, each filter 230 may be a bandpass filter that permits a subset of the total channel spectrum to pass between the reader 205 and the respective antenna 215. The out-of-band impedance looking into the filters 230 may closely approximate a short-circuit, so distributed $\lambda/4$-wave impedance transformers 225 are connected between respective filters 230 and waveguide 220 such that the impedance at waveguide 220 looking into any of the transformers 225 approximates an open-circuit at out-of-band frequencies. Here and in further discussions throughout this disclosure pertaining to wavelength and the lengths of transmission lines, $\lambda$ is the wavelength at the center of the operating bandwidth, i.e., the cumulative bandwidth of all channels being used (i.e., in FIG. 2, channels 1-4) ($\lambda$ may also be referred to as the effective wavelength), unless indicated to the contrary. Similarly, each interface 235 between a respective antenna 215 branch and waveguide 220 is separated from an adjacent interface 235 by an integer number of $\frac{1}{2}$-wavelengths along waveguide 220 such that any open circuit at an antenna 215 branch is transformed to appear as an open circuit at any of the other interfaces 235. (In FIG. 2, $m_1$, $m_2$ and $m_3$ represent integers, as do $n_1$ and $n_2$, and L equals $\frac{1}{2}$ wavelength.)

The arrangement of diplexer 210 in FIG. 2 described above may also be described as follows. Diplexer 210 includes waveguide 220 and a plurality of quarter-wave transformers 225, each of the quarter-wave transformers 225 coupling the waveguide 220 with a respective one of the filters 230, which interface respectively to the antennas 215, each of the quarter-wave transformers 225 forming a respective interface (i.e., junction point) 235 with the waveguide 220. Reference numerals 222 represent merely connections between quarter-wave transformers 225 and respective filters 230; they do not represent physical lengths of feed lines between the quarter-wave transformers 225 and the filters 230. Diplexer 210 further includes a plurality of bandpass filters 230, each of the bandpass filters 230 disposed between and coupled to a respective wave transformer 225 and a respective antenna 215. Each of the bandpass filters 230 is characterized by a passband and an impedance that is substantially zero at frequencies outside of the passband. Adjacent ones of the interfaces 235 are separated by a respective portion of the waveguide 220 having a length equal to a respective integer (m) multiple of a half of a wavelength, the wavelength being that wavelength corresponding to the center of the system operating bandwidth, the system operating bandwidth comprising the span of frequencies of all channels employed in the RFID system. The RFID interrogator 205 is connected to the waveguide 220 at a junction 207, a distance between the junction 207 and either of the two closest interfaces 235 being an integer (n) multiple of one half of a wavelength. Each of the quarter-wave transformers 225 may be a quarter-wave impedance transformer. It is noted that the quarter-wave transformers 225 may have a length equal to any odd integer of a quarter-wavelength. Alternatively, it is noted that the quarter-wave transformers 225 may have a length equal to any even integer of a quarter-wavelength if each of the bandpass filters 230 is characterized by a passband and an impedance that is very large relative to the impedances of connecting devices 215 and 225 at frequencies outside of the passband.

In some embodiments, the channel filters 230 are implemented using surface acoustic wave (SAW) technology, as SAW filters can be implemented with very low loss for very narrow bandwidths. It should be noted that the channels designated as Ch1-Ch4 do not necessarily correspond to the channels of a particular RFID standard or protocol, nor are they necessarily of the same bandwidth. For example, the bandwidth Ch1 may correspond to 3 channels of the UHF standard EPCglobal Class 1 Generation 2, whereas the bandwidth Ch2 may correspond to 5 channels of the same UHF standard. In some embodiments, the passbands associated with one or more channels are not contiguous. Although the coverage areas corresponding with each channel are shown as non-overlapping, in some embodiments the system is designed such that these coverage areas overlap. The remarks in this paragraph apply not only to the embodiments described here with reference to FIG. 2, but also to the embodiments described above with reference to FIG. 1 and the embodiments described below with reference to subsequent drawings.

Figure 3:
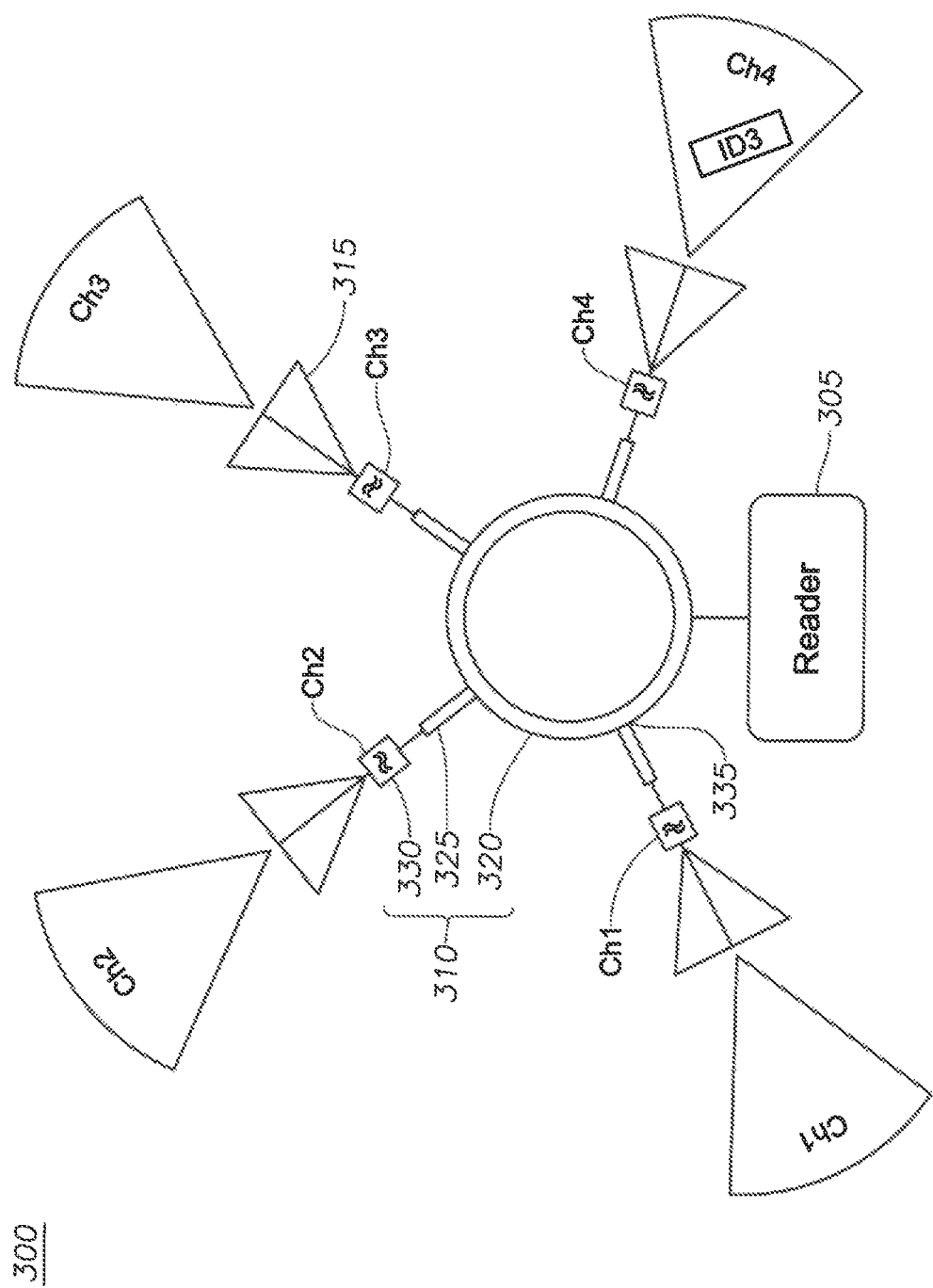
FIG. 3 is a schematic diagram, in accordance with one or more embodiments described herein, of a frequency multiplexing RFID system including a reader, a diplexer and a plurality of antennas, wherein the system has a non-linear configuration.

An alternative embodiment, or set of embodiments, is now described with reference to FIG. 3. FIG. 3 is a schematic diagram of an FM RFID system 300 including a reader 305, a diplexer 310 and a plurality of reader antennas 315, where the system has a non-linear configuration. The non-linear configuration may be deemed a rotated, circular or partial circular configuration. The arrangement shown in FIG. 3 includes elements analogous to those of FIG. 2 (e.g., transmission line 320, quarter-wave transformers 325, filters 330, and interfaces 335), but the characteristics of those elements or of the overall system (beyond the non-linear configuration) are not necessarily identical to that of FIG. 2. As with system 200 of FIG. 2, analogously in system 300 of FIG. 3, diplexer 310 includes the waveguide 320, at least one of the quarter-wave transformers 325 and at least one of the filters 330, as indicated by the bracket shown in FIG. 3. (Note that the lines shown between respective quarter-wave transformers 325 and respective filters 330, analogous to elements 222 in FIG. 2, represent mere connections, not physical lengths of feed/transmission line.) In system 300, antennas 315 are arranged in a rotated (non-linear) configuration (rather than the linear configuration of system 200) so as to cover a wider angle, provide higher gain than a simple wide-beam or omni-directional antenna, and permit localization of a tag based on the frequencies at which tags respond. Transmission line (waveguide) 320, wave transformers 325, filters 330, and interfaces 335 are also arranged in a rotated or circular configuration corresponding to that of antennas 315. The angular separation between antennas 315 and the entire angular extent of the rotated configuration of antennas 315 in system 300 may be other than that shown in FIG. 3. In system 300, restrictions similar or identical to those discussed with respect to system 200 regarding the separation of interfaces and the electrical length of the transmission lines may apply. Alternatively, the configuration of system 300 may be compact in size so that all of the interfaces 335 are electrically close to each other, thus eliminating the requirement that the spacing between the interfaces be integer numbers of half-wavelengths.

Figure 4:
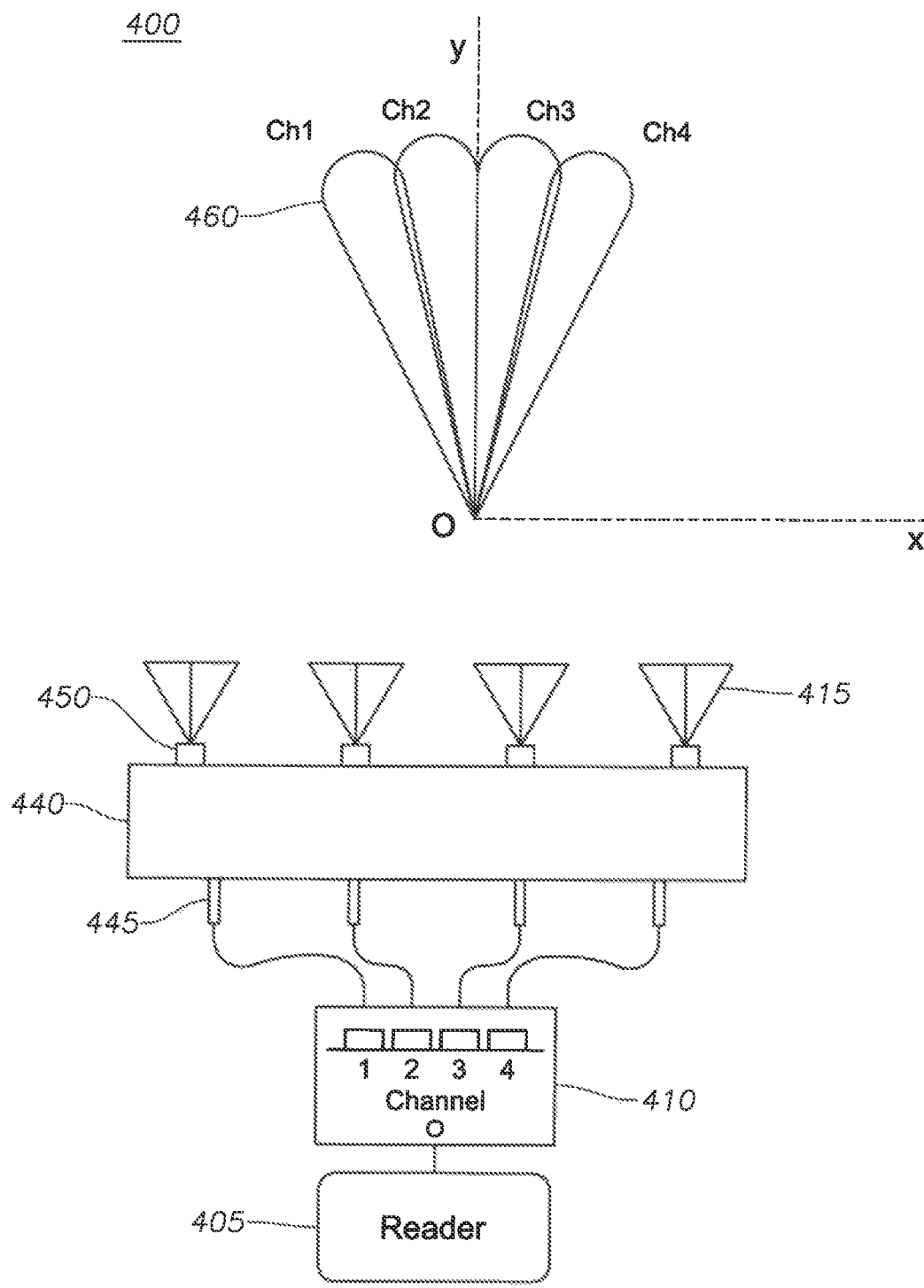
FIG. 4 is a schematic diagram, in accordance with one or more embodiments described herein, of a frequency multiplexing RFID system including a reader, a diplexer, a plurality of antennas, and a beamforming network.

An alternative embodiment, or set of embodiments, is now described with reference to FIG. 4. FIG. 4 is a schematic diagram of an FM RFID system 400 including a reader 405, a diplexer 410, a plurality of reader antennas 415, and a beamforming network 440. Beamforming network 440 is disposed between diplexer 410 and antennas 415. (It will be understood that the language "disposed between" does not necessarily mean that beamforming network 440 is disposed physically/spatially between diplexer 410 and antennas 415, but rather that beamforming network 440 is disposed operationally between diplexer 410 and antennas 415, that is, signals are transmitted from diplexer 410 to antennas 415 via beamforming network 440.) Beamforming network 440 includes terminal ports 445 and antenna ports 450. The signals to and from reader 405 are channeled by diplexer 410 to ones of the terminal ports 445 of beamforming network 440. The antenna ports 450 of beamforming network 440 are each connected to a respective antenna 415. As those of ordinary skill in the art would understand, now having the benefit of this disclosure, beamforming network 440 and antennas 415 act to form a characteristic set of antenna radiation distribution patterns 460, with each radiation distribution pattern 460 associated with one of the beamforming network terminal ports 445. Thus, each of the four channels 1-4 designated on diplexer 410 is associated with one of the four radiation distribution patterns 460 as shown. (Such a set of radiation distribution patterns may conventionally be shown relative to a Cartesian coordinate system defined by x and y axes and an origin O, as shown.) The approach illustrated in FIG. 4 may permit long range interrogation, as the signals received by the antennas are combined, and similarly, signals transmitted by the antennas are combined, to form a strong, composite signal.

Figure 5:
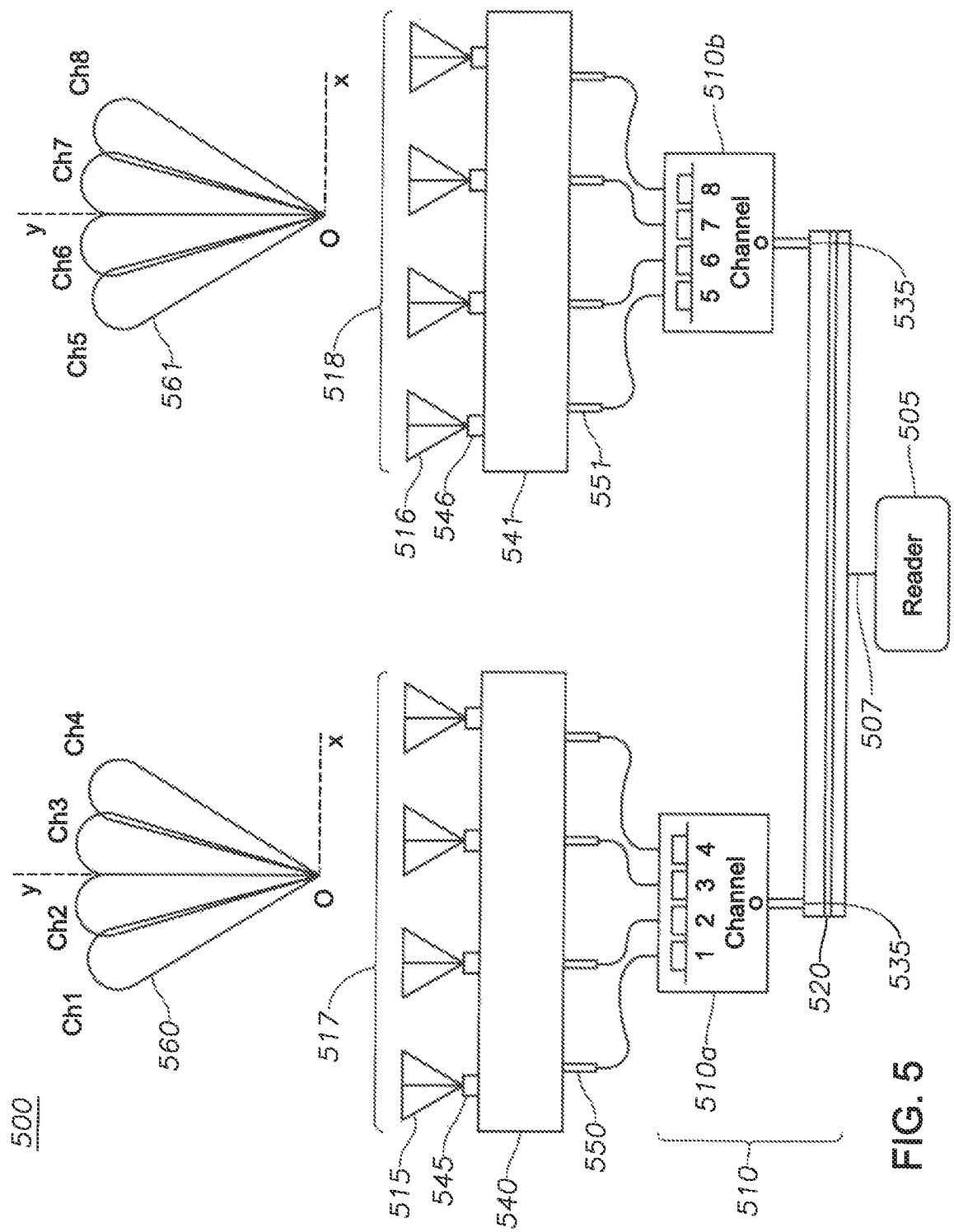
FIG. 5 is a schematic diagram, in accordance with one or more embodiments described herein, of a frequency multiplexing RFID system including a reader, a diplexer, a plurality of antennas, and a plurality of beamforming networks, wherein the diplexer and the beamforming networks are implemented in a distributed fashion.

An alternative embodiment, or set of embodiments, is now described with reference to FIG. 5. FIG. 5 is a schematic diagram of an FM RFID system 500 including a reader 505, a diplexer 510, pluralities 515, 516 of reader antennas, and a plurality of beamforming networks 540, 541, wherein the diplexer 510 (subdiplexers 510a and 510b) and the beamforming networks 540, 541 are implemented in a distributed fashion similar to that shown in FIG. 2. System 500 (FIG. 5) may thus be thought of as an extension of system 400 of FIG. 4, in which multiple beamforming networks 540, 541 and a diplexer are distributed in a manner similar to system 200 (as shown in FIG. 2). Thus, system 500 (FIG. 5) may be understood conceptually as a combination of (the defining features of) system 200 (FIG. 2) and system 400 (FIG. 4). In system 500, the spacing between interfaces, whether between adjacent diplexed beamforming networks 540, 541 or between a diplexed beamforming network 540 or 541 and reader 505, may be constrained as discussed in conjunction with system 200 (FIG. 2) such that out-of-band circuits do not result in impedance mismatches at other interfaces. For example, it is assumed that the subdiplexers 510a and 501b include filters and impedance transformers (analogously to systems 200 and 300) to isolate channels. As described with reference to system 400 (FIG. 4), beamforming networks 540, 541 and antennas 515, 516 act to form characteristic sets of antenna radiation distribution patterns 560, 561. Although shown with only two beamforming networks 540, 541, system 500 is extensible to a greater number of beamforming networks. Furthermore, although the antennas 515, 516 of the beamforming networks 540, 541 are shown in FIG. 5 to be spaced in a collinear fashion, the system is extensible to rotated (non-linear) configurations in which each array 517, 518 of antennas 515, 516 is rotated in a circular/partly circular configuration similar to the rotation of single antenna elements 315 in system 300 shown in FIG. 3. That is, e.g., array 517 of antennas 515 may be rotated relative to array 518 of antennas 516, with the antennas 515 arranged linearly relative to one another and the antennas 516 arranged linearly relative to one another. In this case, each of arrays 517, 518 may be referred to as a linear array. However, it is also possible for the antennas 515 to be arranged in a rotated configuration relative to one another, and/or the antennas 516 to be arranged in a rotated configuration relative to one another. In this case, each of arrays 517, 518 may be referred to as a rotated array. Diplexer 510 may be understood as encompassing sub-diplexer 510a for beamforming network 540, sub-diplexer 510b for beamforming network 541, and waveguide/transmission line 520 connecting reader 505 with sub-diplexer 510a and sub-diplexer 510b. In the context of FIG. 5, each of sub-diplexers 510a and 510b presents an open-load impedance (i.e., effectively infinite) over passband channels of the other of subdiplexers 510a and 510b, and the spacings between the reader junction 507 at waveguide/transmission line 520 and the interfaces 535 (of sub-diplexers 510a and 510b) at waveguide/transmission line 520 are such that this open load-impedance is presented to the reader 505 on the side for which the channel frequency is not within the passband of that respective sub-diplexer. In another embodiment (not illustrated), diplexer 510 may include a third sub-diplexer at reader junction 507, the third sub-diplexer being characterized by two passbands, one of the two passbands allowing signals whose channel frequencies fall within channels 1-4 to pass along waveguide/transmission line 520 to sub-diplexer 510a and the other of the two passbands allowing signals whose channel frequencies fall within channels 5-8 to pass along waveguide/transmission line 520 to sub-diplexer 510b.

As mentioned above, SAW circuits can provide narrow-band filtering functions as the basis for a centralized or distributed diplexer system. Another approach is to use narrow-band antenna elements such that the filtering function is provided by the antenna. For example, microstrip patch antennas can closely resemble parallel RLC resonant circuits. Other types of antennas closely resemble series RLC resonant circuits. Although the antenna filter response is not usually as narrow as may be obtained using SAW devices, there are some advantages, such as fewer parts, smaller size, and lower mass, that may be realized when tighter channelization is not required. Several such embodiments using narrow-band antenna elements are described below. A narrow band antenna is thus characterized by a passband corresponding to a range of frequencies that the antenna will pass or transmit (the narrow band antenna is designed to filter out frequencies falling outside of the range of frequencies).

The FM RFID systems described above may generally be considered to be designed as sparse zone RFID technology, although they are not necessarily so limited. Below, FM RFID systems generally designed for dense zones (e.g., smart shelves, smart enclosures, and smart surfaces) are described, although again they are not necessarily so limited.

Figure 6:
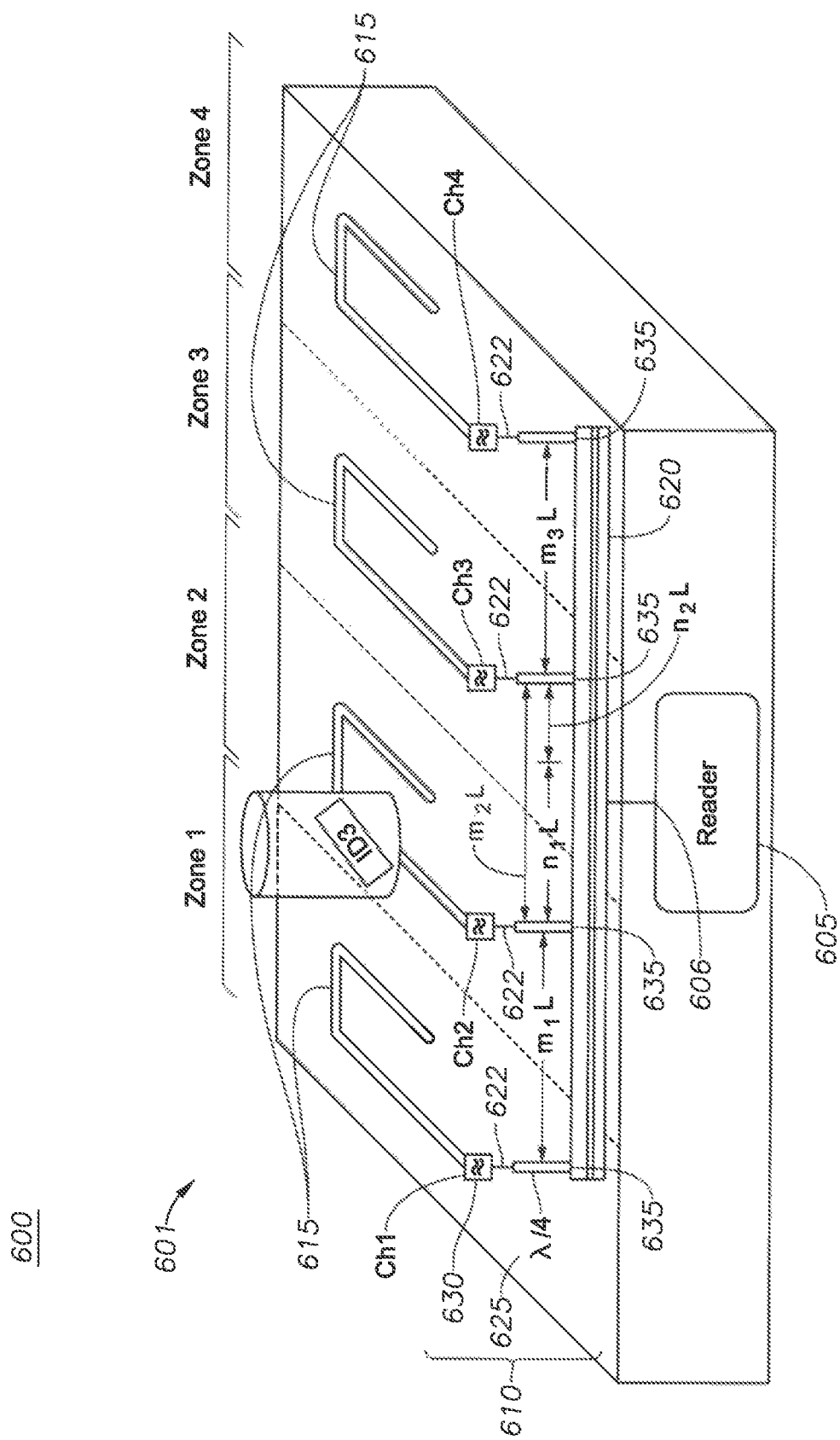
FIG. 6 is a schematic diagram, in accordance with one or more embodiments described herein, of a frequency multiplexing RFID system for a smart shelf, the system including a reader, a diplexer, and a plurality of at least partially open transmission lines, wherein the diplexer is implemented in a distributed fashion.

An alternative embodiment, or set of embodiments, is now described with reference to FIG. 6. FIG. 6 is a schematic diagram of an FM RFID system 600 for a smart shelf 601, the system including a reader 605, a diplexer 610, and a plurality of open (or at least partially open) transmission lines 615, wherein the diplexer 610 is implemented in a distributed fashion similar to that shown in FIG. 2. System 600 (FIG. 6) may thus be thought of as a modification of system 200 (FIG. 2), in particular, as applied to a smart shelf. A main difference between system 600 and system 200, in terms of structural components, is that system 600 employs open transmission lines 615 instead of the antennas 215 of system 200. Accordingly, in system 600 an electromagnetic signal is transmitted along a transmission line 615 in response to and at the channel frequency of the RFID signal distributed thereto rather than the situation in system 200 wherein an electromagnetic wave is transmitted by an antenna 215 in response to and at the channel frequency of the RFID signal distributed thereto. The electromagnetic signal transmitted along transmission line 615 effectively reaches RFID tags by near-field coupling or radiation from transmission line 615. The term "(at least partially) open" is used here to mean that the transmission lines 615 are not entirely electromagnetically shielded (the electric fields along the transmission lines 615 are not entirely blocked), so that at least some electromagnetic energy or radiation from the transmission lines 615 may couple to nearby RFID tags, either by near-field coupling or radiation. In some embodiments, the transmission lines 615 may be covered by a non-RF-opaque material, i.e., a material that permits RF electromagnetic radiation to pass through it.

As seen in FIG. 6, frequency multiplexing is used to transmit signals to different regions (zones 1-4) on smart shelf 601, via respective transmission lines 615. As discussed above, a (micro)processor could estimate the location of an RFID tagged item on smart shelf 601 according to the responding channel or the relative signal strengths of the responding channels. That is, the processor would determine that the item is located in the coverage region (zone) of the one of the transmission lines 615 that receives the response signal from the item's RFID tag (most strongly). Thus, the smart shelf system 600 of FIG. 6 could distinguish the location of the tagged item (ID3) as being within one of the four coverage zones 1-4 (specifically, coverage zone 2, in the example illustrated in FIG. 6) on smart shelf 601 when the distributed network of transmission lines 615 is fed from a single port 606 on the reader 605. Many readers have the ability to switch between four ports. Thus, by using the distributed network shown in FIG. 6 in conjunction with four ports, reader 605 could distinguish up to 16 different regions (zones) on smart shelf 601. Much finer resolution could be achieved using narrower filters to isolate individual channels. For example, in the United States, as regulated by the Federal Communications Commission, the EPCglobal Class 1 Generation 2 protocol may employ frequency hopping spread spectrum over at least 50 channels.

System 600 is shown with waveguide 620, quarter-wave impedance transformers 625, connections 622, filters 630, interfaces 635, and interface spacings ($m_1L$, $m_2L$, $m_3L$, $n_1L$, $n_2L$) as in system 200 of FIG. 2 (the lines shown between respective quarter-wave impedance transformers 625 and respective filters 630, analogous to elements 222 in FIG. 2, represent mere connections, not physical lengths of feed/transmission line). The description of analogous, like-numbered elements in system 200 of FIG. 2 is applicable to these elements of system 600 of FIG. 6. Alternate arrangements in this regard (e.g., such as discussed above) are also possible for system 600.

We turn now from smart shelves (nominally two-dimensional regions) to smart enclosures (nominally three-dimensional regions).

For purposes of this disclosure, smart enclosures may be thought of as RF cavities. While the discussion below refers to "drawers," it will be understood that the smart enclosures discussed here may be any kind of three-dimensional container or any three-dimensional region, regardless of whether it is (1) physically (a) completely enclosed or (b) rather partly enclosed and partly open, and regardless of whether it is (2) electromagnetically (a) completely enclosed (i.e., shielded) or (b) rather partly enclosed (shielded) and partly open (not shielded). Furthermore, the FM RFID systems, apparatuses and methods described herein for application to smart enclosures are also applicable to three-dimensional regions of space that are not necessarily enclosures, i.e., that may be open/unbounded or at least substantially open. With regard to smart enclosures, FM RFID may provide fine localizing resolution as described above as well as radiation diversity, polarization diversity, and reduced volume requirements. One of the design goals of a feed system for a smart enclosure is to have the feed circuit volume not detract appreciably from the usable storage volume of the enclosure. This design goal, however, typically conflicts with the desire to cover the full bandwidth allocated to an RFID protocol. For example, in order to cover the full EPCglobal Class 1 Generation 2 bandwidth, microstrip patch antennas typically have to be made fairly thick, e.g., 1 to 3 cm. (microstrip patch antennas become wider in bandwidth as their thickness increases). Furthermore, in order to achieve a desired read accuracy near 100% when the drawer contains many tagged items or contains items with substantial levels of liquid or conductive materials, it is typical to place two to four antennas around the perimeter of the drawer. In addition to overcoming obscuration of tags and signal attenuation, the diversity achieved with multiple antennas can avoid problems with natural nulls in the modal field distribution as well as problems with polarization. The desire to have multiple feed antennas throughout the drawer, however, not only subtracts from the storage volume, but also places requirements on the reader to switch among the multiple antennas. Because many readers have integrated four-port switches, operation with a single drawer does not usually constitute a severe restriction. However, for large drawers, or systems of drawers, switch limitations can become problematic.

The distributed feed systems discussed above in the context of sparse zone RFID and smart shelves can be applied to smart enclosures to improve on various limitations of smart enclosures such as those discussed above.

Figure 7:
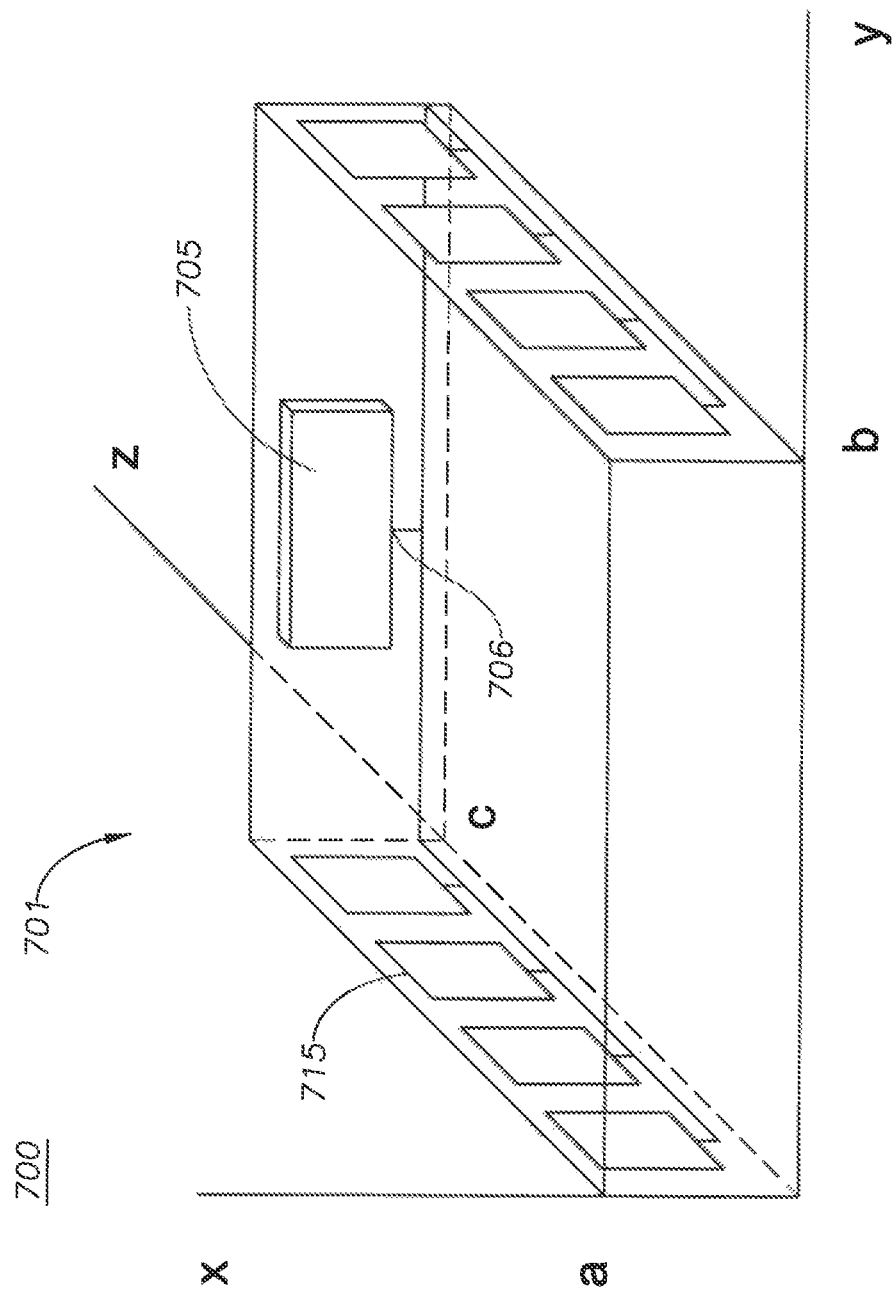
FIG. 7 is a schematic diagram, in accordance with one or more embodiments described herein, of a frequency multiplexing RFID system for a smart enclosure, the system including a reader and a plurality of narrow band antennas.

In this regard, an alternative embodiment, or set of embodiments, is now described with reference to FIG. 7. FIG. 7 is a schematic diagram of an FM RFID system 700 for a smart enclosure 701, the system including a reader 705 and a plurality of narrow band reader antennas 715. Smart enclosure 701 is a three-dimensional enclosure, having a height a, a length b, and a depth c, as shown by the illustrated x, y and z axes. For brevity, the implementation details in the distribution line (from reader 705 to antennas 715) are not shown in FIG. 7, given that one of ordinary skill in the art will understand this aspect of system 700 in view of the remainder of this disclosure. Narrow band antennas 715 may be microstrip antennas and, more particularly, patch antennas. While eight antennas 715 are shown, a smaller or larger number of antennas 715 may be employed. In some embodiments, one or more of antennas 715 may be rotated relative to other(s) of antennas 715. For example, one or more antennas 715 of the group of antennas 715 shown on the left wall of enclosure 701 may be rotated in the plane of the left wall of enclosure 701, which is the x-z plane (i.e., the plane formed by the x and z axes), and one or more antennas 715 of the group of antennas 715 shown on the right wall of enclosure 701 may be rotated in the plane of the right wall of enclosure 701, which is parallel to the x-z plane. Such rotation may be, e.g., by 90 degrees or another angle. Also, although antennas 715 are illustrated in a certain form, antennas 715 may employ alternate narrow band designs, or a combination of two or more different narrow band designs, in order to optimize the amplitude and polarization coverage throughout the enclosure volume. In system 700, a single reader port 706 may feed all eight antennas 715, thus allowing other ports (not shown) to be connected to other drawers (not shown) or to antennas (not shown) on other surfaces of the same enclosure. Nonetheless, multiple reader ports 706 may be employed in system 700.

Figure 8:
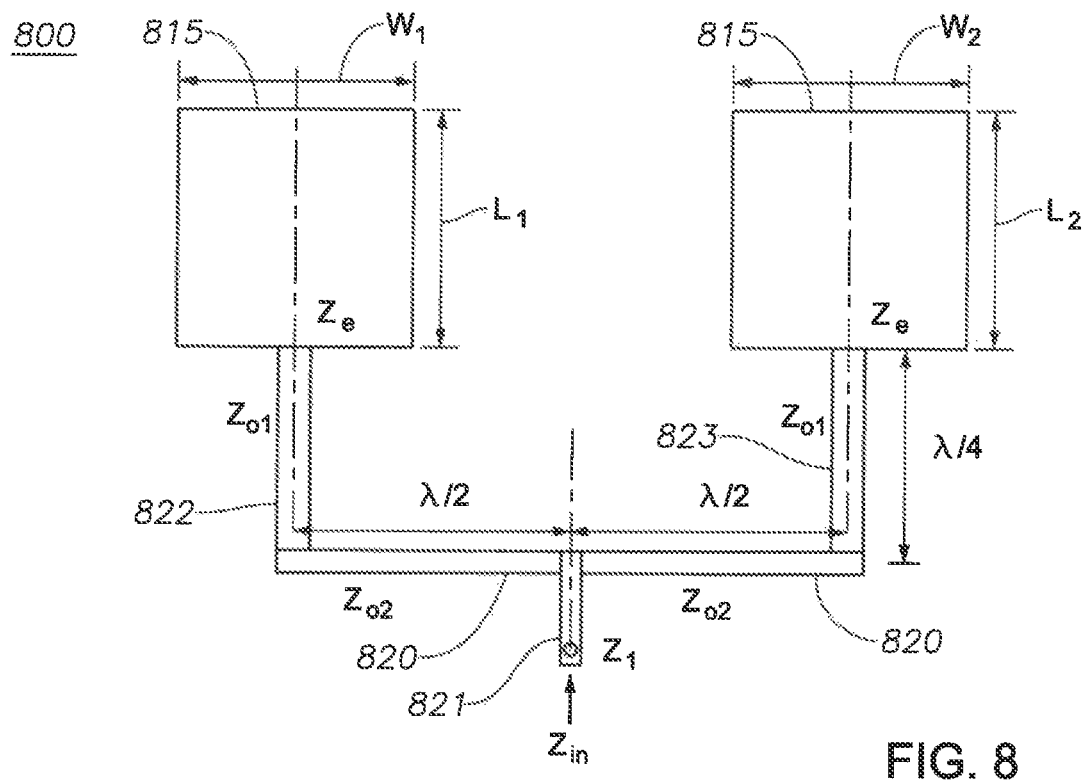
FIG. 8 is a schematic diagram, in accordance with one or more embodiments described herein, of a frequency multiplexing RFID narrow band antenna and feed system, including a reader and a plurality of narrow band antennas.

An alternative embodiment, or set of embodiments, is now described with reference to FIG. 8. FIG. 8 is a schematic diagram of an FM RFID narrow band antenna and feed system 800. System 800 may be used, e.g., for smart enclosure 701, or for another type of region such as a three-dimensional region of space that is at least substantially open. System 800 represents one possible way of many in which the details of system 700 may be elaborated. System 800 includes a reader (not shown in FIG. 8 but shown generally as reader 705 in FIG. 7) and at least one narrow band reader antenna 815. As shown in FIG. 8, system 800 also includes trunk line 820 and feed lines 821, 822 and 823. Feed lines 822 and 823 feed a signal from either end of trunk line 820 to a respective one of antenna 815. Trunk line 820 feeds a signal from feed line 821 to feed lines 822 and 823. Feed line 821 feeds a signal from a reader port (not shown in FIG. 8 but shown generally as reader port 706 in FIG. 7) to trunk line 820. Narrow band antennas 815 may be microstrip antennas and, more particularly, patch antennas. The number of antennas (and associated feed lines) may vary from that illustrated in FIG. 8, as seen, for example, in FIG. 7 (showing four antennas operatively connected to an associated feed line).

Using the illustrated exemplary case of two narrow band antennas 815, a first narrow band antenna 815 (e.g., shown at left) may be characterized by a first passband, the first passband corresponding to a first range of frequencies, and the second narrow band antenna (shown at right) may be characterized by a second passband, the second passband corresponding to a second range of frequencies, where the second range of frequencies differs from the first range of frequencies, such that the second passband differs from the first passband. The second passband may differ from the first passband, i.e., the second range of frequencies may differ from the first range of frequencies, in either of the following two ways: (1) the first and second passbands may be overlapping (i.e., the first range of frequencies and the second range of frequencies may include one or more but not all frequencies in common) or (2) the first and second passbands may be non-overlapping (i.e., the first range of frequencies and the second range of frequencies may be mutually exclusive, not having any frequencies in common). The first narrow band antenna 815 is configured to transmit a first electromagnetic wave in response to and at the channel frequency of the RFID signal fed thereto by the associated first feed line (shown at left), if the channel frequency of the RFID signal falls within the first passband, and the second narrow band antenna 815 is configured to transmit a second electromagnetic wave in response to and at the channel frequency of the RFID signal fed thereto by the associated second feed line (shown at right), if the channel frequency of the RFID signal falls within the second passband. (In the case that the first and second passbands overlap, each of the narrow band antennas 815 would transmit an electromagnetic wave in response to and at the channel frequency of the RFID signal fed thereto if the channel frequency of the RFID signal falls within the overlapping region of the first and second passbands.) As mentioned above with reference to other embodiments and as holds generally throughout this disclosure, the channel frequency of the RFID signal generated by the reader 805 and fed by the feed lines to the respective antennas 815 may vary over time, e.g., according to an FHSS scheme. The term "first feed line" may be used to refer to the entire feed line from reader port to first (e.g., shown at left) narrow band antenna 815, including feed line 821, left portion of trunk line 820, and feed line 822; the term "second feed line" may be used to refer to the entire feed line from reader port to second (e.g., shown at right) narrow band antenna 815, including feed line 821, right portion of trunk line 820, and feed line 823. Each of the terms "first feed line" and "second feed line" may also be used to refer to a portion of those respective entire feed lines running from the reader port to the respective antenna. Similarly, the term "feed line" may be used to refer to an entire feed line or to a portion of the respective feed line running from the reader port to the corresponding antenna.

Antennas 815 may be of sufficiently narrow band that their corresponding bandwidths do not overlap significantly, with the antenna center frequencies being close enough that half-wavelength ($\lambda/2$) lines (between antenna branch and reader port, along trunk line 820) and quarter-wavelength ($\lambda/4$) lines (feed lines 822, 823) are similar in length at the two center frequencies of the antennas. Both patch antennas 815 may be edge-fed with microstrip lines of characteristic impedance $Z_{01}$, and the patch input impedance at the edge of each patch antenna 815 may be $Z_e$, as shown. Those skilled in the art, now having the benefit of this disclosure, would recognize that the input impedance at the ends of the $\lambda/4$ lines (feed lines 822, 823) opposing the patch antenna 815 ends is given by $Z_{01}^2/Z_e$, where $\lambda$ is the effective wavelength of the microstrip line, and the effective wavelength is the physical distance that corresponds to one wave cycle on the microstrip line. Hence, when the frequency is sufficiently out of band for either patch antenna 815, the edge impedance will appear close to 0, and the impedance at the other ends of the quarter wavelength lines (feed lines 822, 823) will appear to be infinite, or large enough to present an effective open circuit at the ends of trunk line 820 where they interface with the respective quarter-wave lines (822, 823) (the further the frequency is out of band, the more closely the edge impedance will approximate 0 and the more closely the impedance at the other ends of the quarter wavelength lines 822, 823 will approach infinite impedance). The half-wavelength line (trunk line 820) will result in this apparently infinite impedance being presented at the junction with feed line 821; hence, the out-of-band patch antenna 815 (e.g., shown at left) will appear as an open circuit within the operating band of the other patch antenna 815 (shown at right), and vice versa. For the in-band side, the antenna edge impedance must be transformed such that the input impedance $Z_{in}$ to the circuit in FIG. 8 is matched to the impedance of the transmission line (not shown) that connects to the reader (not shown in FIG. 8 but shown generally as reader 705 in FIG. 7). The impedance at the intersection of feed line 820 and 822, 823, in the direction of the in-band antenna, is also $Z_{01}^2/Z_e$, and at the in-band side, $Z_e$ is substantially greater than zero. The impedance at the intersection of feed line 821 and trunk line 820 is likewise (very nearly) $Z_{01}^2/Z_e$ in the direction of the in-band antenna. The length and characteristic impedance $Z_1$ of transmission line 821 can be selected to further transform the impedance to the desired impedance $Z_{in}$. Alternatively, $Z_{01}$ can be selected such that the transformed impedance $Z_{01}^2/Z_e=Z_1=Z_{in}$, such that no further transformation is required to match the in-band side to the reader impedance. In this manner, a predominance of power entering the input port in FIG. 8 is directed substantially to either the left or right antenna 815 according to the channel or frequency of operation at that time. Assuming $Z_{01}$ and $Z_{02}$ are selected appropriately, the impedance of the in-band patch antenna can be readily matched to the input impedance $Z_{in}$. $Z_{02}$ may be selected to minimize line loss. Those skilled in the art, now having the benefit of this disclosure, would recognize that there exist multiple techniques to impact the impedance at the antenna feed point. For example, instead of feeding the line at the very edge of the patch, the feed point can be inset into the patch to reduce the resonant impedance, $Z_e$. Thus, multiple design degrees of freedom are available to match the impedance and also to establish the resonant frequencies and bandwidths of the two or more patch antennas 815.

It should be noted that the details shown in FIG. 8 exemplify one group of embodiments of many possible. For example, as discussed previously (FIG. 2), the quarter-wavelength lines could be odd-integer multiples of a quarter wavelength, and the half wavelength lines could be integer multiples of a half wavelength. For other antennas that can be modeled by a series resonant circuit, the lines 822, 823 would be integer multiples of a half wavelength instead of a quarter wavelength. Also, although transmission lines are illustrated as linear, they may incorporate bends or meanders in order to satisfy geometric constraints, such as desired antenna spacing.

While the embodiments described thus far may provide spatial diversity by, for example, pointing the antenna in FIG. 8 in different directions, embodiments described further below may also provide polarization diversity. It will be noted that the arrangements described herein provide polarization diversity to the reader antenna.

Figure 9:
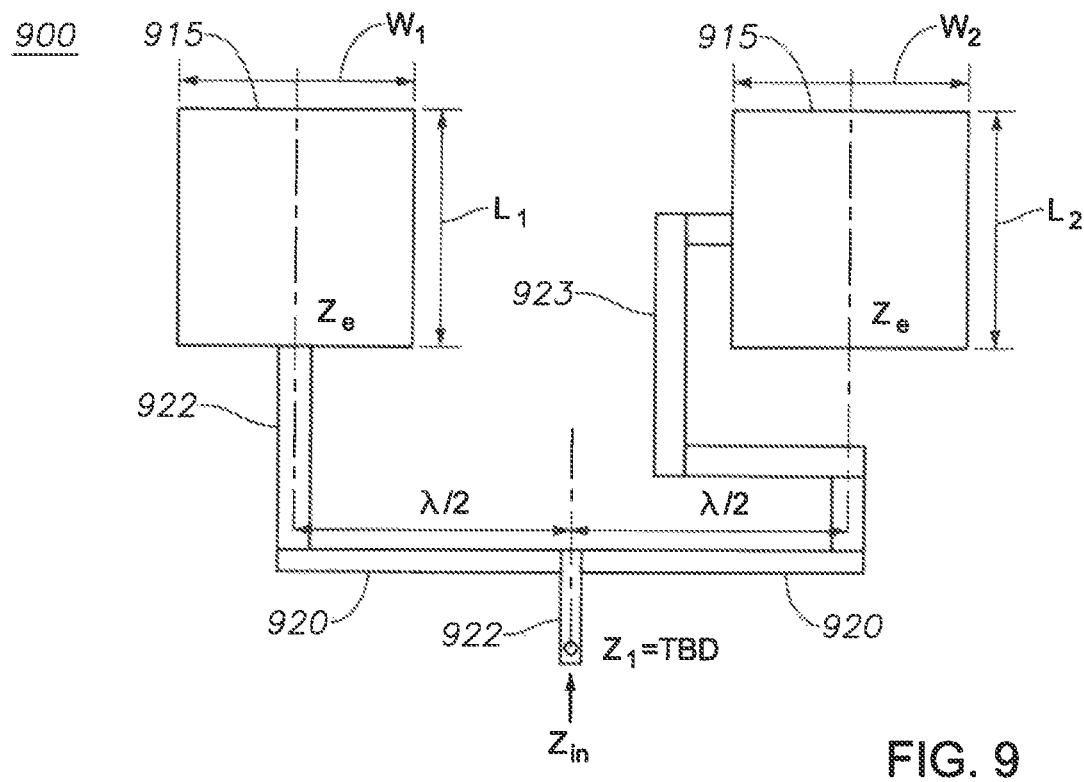
FIG. 9 is a schematic diagram, in accordance with one or more embodiments described herein, of a frequency multiplexing RFID narrow band antenna and feed system, including a reader and a plurality of narrow band antennas, the system providing polarization diversity.

An alternative embodiment, or set of embodiments, is now described with reference to FIG. 9. System 900 shown in FIG. 9 may be understood as a variant of system 800 shown in FIG. 8, with system 900 providing polarization diversity unlike system 800. FIG. 9 is a schematic diagram of an FM RFID narrow band antenna and feed system 900, including a reader (not shown in FIG. 9 but shown generally as reader 705 in FIG. 7) and a plurality of narrow band reader antennas 915. System 900 may be used, e.g., for smart enclosure 701, or for another type of region such as a three-dimensional region of space that is at least substantially open. As with system 800, narrow band antennas 915 may be microstrip antennas and, more particularly, patch antennas. The number of antennas (and associated feed lines) may vary from that illustrated in FIG. 9, as seen, for example, in FIG. 7. Similar to antennas 815, in system 900 the two antennas 915 may be designed such that their operating bandwidths are adjacent, but do not completely overlap. As with system 800 of FIG. 8, system 900 also includes trunk line 920 and feed lines 921, 922 and 923, interconnecting the analogous elements as in system 800, and with similar half-wavelength spacing between antenna branch and reader port, as shown. However, feed line 923 of system 900 differs from feed line 823 of system 800 in that feed line 923 feeds a (first) edge of right side patch antenna 915 orthogonal to a (second) edge of left side patch antenna 915 fed by feed line 922, whereby the radiating edges of right side antenna 915 (the vertical edges) are orthogonal to the radiating edges of left side antenna 915 (the horizontal edges), and hence, the radiated fields from the respective antennas 915 will possess orthogonal polarizations, one vertical and the other horizontal. As with system 800, the antennas 915 are characterized by different, possibly overlapping passbands. In regions where the passbands overlap, the set of antennas 915 may radiate such that the fields combine, and the polarization may become elliptical, including the special case in which the polarization is linear diagonal, i.e., the polarization vector is at 45 degrees to the polarization of either of the antennas 915. Similar to waveguide 823, waveguide 923 is a quarter-wavelength or an odd integer multiple of a quarter-wavelength, even though it might be characterized by one or more right angles, curves, or mitered bends in order to feed the orthogonal edge. For other types of antennas that are well modeled by a series RLC circuit, the waveguides 922, 923 are even integer multiples of a quarter wavelength. Although the two antennas 815 look similar, and the two antennas 915 look similar, as is known to those skilled in the art, now having the benefit of this disclosure, the length of the antenna is a factor in establishing the resonant frequency, and often only small differences in length will offset the resonant frequency, particularly for narrowband patch antennas.

Figure 10:
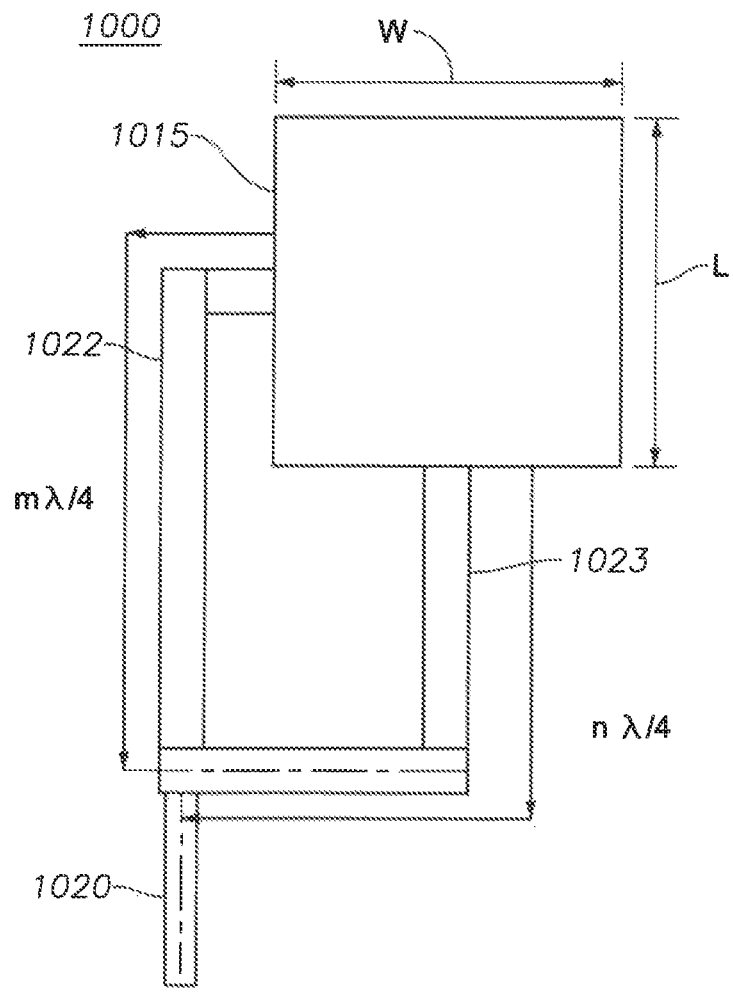
FIG. 10 is a schematic diagram, in accordance with one or more embodiments described herein, of a frequency multiplexing RFID narrow band antenna and feed system, including a reader and a single microstrip patch antenna fed by two feed lines, the system providing polarization diversity.

An alternative embodiment, or set of embodiments, is now described with reference to FIG. 10. FIG. 10 is a schematic diagram of an FM RFID narrow band antenna and feed system 1000, including a reader (not shown in FIG. 10 but shown generally as reader 705 in FIG. 7), a microstrip patch reader antenna 1015 fed by two feed lines 1022, 1023. Trunk line 1020 connects feed lines 1022, 1023 to a reader (again, not shown in FIG. 10 but shown generally as reader 705 in FIG. 7). System 1000 may be used, e.g., for smart enclosure 701, or for another type of region such as a three-dimensional region of space that is at least substantially open. Like system 900, system 1000 provides polarization diversity, but unlike system 900 system 1000 uses one microstrip patch antenna 1015 to achieve polarization diversity of the generated RFID signal of the reader. In each of systems 800 and 900, small differences between the lengths $L_1$ and $L_2$ of the two respective patch antennas 815, 815 (or 915, 915) are typically used to offset the resonant frequencies of the patch antennas (i.e., patches) relative to each other, although other methods, such as perturbations to one or both patches, can also be used to offset the resonances (the length here mentioned is defined as the distance from the fed edge to the opposing edge of the patch). The orthogonal patch dimension, defined as the width ($W_1$ or $W_2$) affects the bandwidth of the patch but has little effect on the resonance. So, the widths ($W_1$ and $W_2$) of patch antennas 815, 815, in system 800 and the widths of patch antennas 915, 915 in system 900 can be set to establish the desired patch bandwidth. However, in system 1000, the width W and the length L of patch antenna 1015 are set to have magnitudes different from each other so as to create two orthogonal resonances in patch antenna 1015 that are sufficiently separated that their respective operating bandwidths do not completely overlap. For example, with a laminate characterized by a relative permittivity of approximately 3 and a laminate thickness of 0.175 inches, one dimension of the patch antenna might be 3.630 inches, and the orthogonal dimension might be 3.505 inches. Feed lines 1022 and 1023 may each have a length equal to an odd integer multiple of a quarter wavelength. The length of feed line 1022 may but need not be equal to the length of feed line 1023. For example, the length of feed line 1022 may be an odd integer multiple 'm' of a quarter wavelength, and the length of feed line 1023 may be an odd integer multiple 'n' of a quarter wavelength, where m and n may but need not be the same odd integer. The "length" of feed line 1022 or 1023 refers to the distance from the junction with trunk line 1020 to the junction with antenna 1015. With these length constraints, the feed lines 1022, 1023 serve as impedance transformers, and hence prevent signals having out-of-band frequencies from traveling down the wrong one of feed lines 1022, 1023, similarly as discussed above with respect to previously described embodiments. In the case of system 1000, antenna 1015 generates electromagnetic waves having different polarizations, in response to receipt, respectively, of the two signals fed from respective feed lines 1022, 1023. The different polarizations may be characterized by different orientations, e.g., they may be orthogonal to each other. Further, the different polarizations may be vertical and horizontal, respectively, or vice versa. Over spectrum regions in which the passbands of the two modes overlap, the antenna may exhibit yet different polarizations. In some embodiments, feed line 1022 and feed line 1023 are of the same electrical length such that the phase of the RFID signal associated with propagation thereof along each of feed line 1022 and feed line 1023 is the same, and the first passband and second passband overlap such that the electromagnetic wave generated by antenna 1015 in response to a signal from feed line 1022 having a first polarization characterized by a first (e.g., linear) orientation and the electromagnetic wave generated by antenna 1015 in response to a signal from feed line 1023 having a second, different polarization characterized by a second, different (e.g., linear) orientation jointly result in a polarization characterized by a (e.g., diagonal) orientation between the first orientation and the second orientation. Such intermediate (e.g., diagonal) orientation provides additional polarization diversity.

Figure 11B:
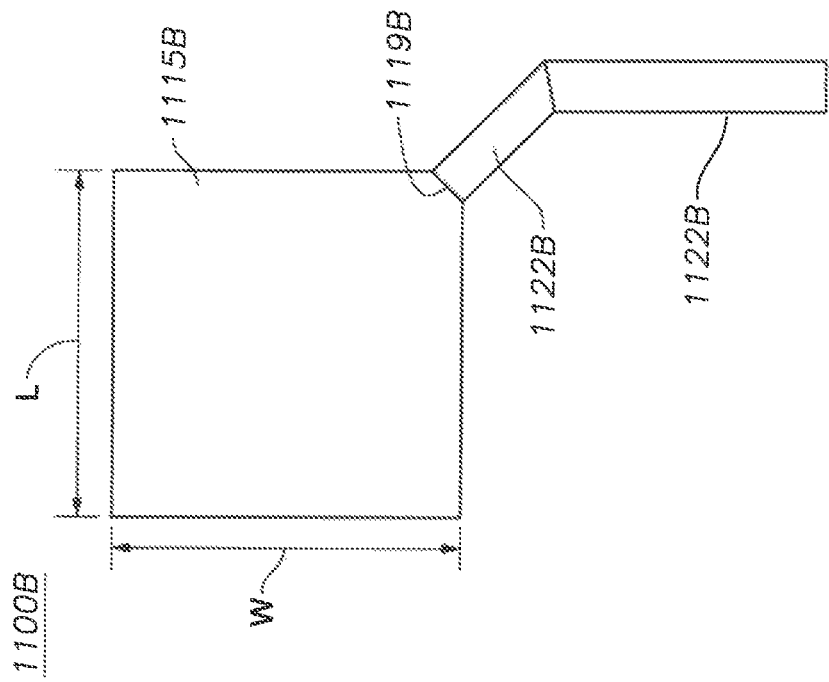
FIGS. 11A and 11B are schematic diagrams, in accordance with one or more embodiments described herein, each illustrating a respective frequency multiplexing RFID narrow band antenna and feed system, including a reader and a single microstrip patch antenna fed by a single feed line, the system providing polarization diversity.
Figure 11A:
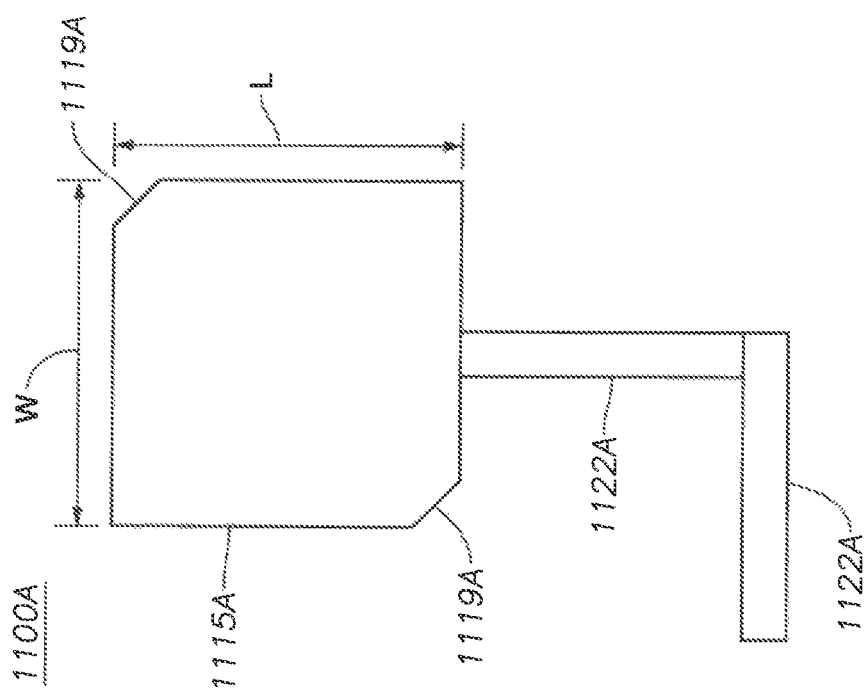

An alternative embodiment, or set of embodiments, is now described with reference to FIGS. 11A and 11B. FIGS. 11A and 11B are schematic diagrams of FM RFID narrow band antenna and feed systems 1100A and 1100B, respectively, each system including a reader (not shown in FIGS. 11A and 11B but shown generally as reader 705 in FIG. 7) and a microstrip patch reader antenna 1115A or 1115B, respectively, fed by a feed line 1122A or 1122B, respectively. Systems 1100A and 1100B may be used, e.g., for smart enclosure 701, or for another type of region such as a three-dimensional region of space that is at least substantially open. Like systems 900 and 1000, systems 1100A and 1100B provide polarization diversity, but unlike those systems, each of systems 1100A and 1100B uses one microstrip patch antenna 1115A or 1115B, respectively, paired with one feed line 1122A or 1122B, respectively, to achieve polarization diversity of the generated RFID signal of the reader, i.e., a "single feed microstrip patch" design. Unlike feed lines 921, 922 and 923 in system 900 and feed lines 1022 and 1023 in system 1000, because power is divided between two modes internal to the patch 115A or 1115B in systems 1100A and 1100B, feed lines 1122A and 1122B are not constrained to an odd integer of a quarter wavelength for the purpose of creating a high impedance that reduces or blocks power from coupling to the antenna 1115A or 1115B, respectively. However, feed lines 1122A and 1122B may be a quarter wavelength line used to match impedances as needed.

Each of antennas 1115A and 1115B is a single feed microstrip patch design that can excite two modes, one that radiates a substantially linear first polarization, and another that radiates a substantially linear second polarization, the two polarizations being characterized by different orientations. The two polarizations may be orthogonal to one another, e.g., horizontal and vertical. This patch design is frequently used to create two modes in substantially equal proportions with respect to magnitude with one mode excited approximately 90 degrees ahead of, or behind, the other (e.g., orthogonal) mode. The formation of two orthogonal polarizations that are separated by approximately 90 degrees in phase creates waves that are circularly polarized, or at least elliptically polarized waves that are very nearly circular in polarization. The formation of two modes that are nearly equal in amplitude but separated by 90 degrees in phase is achieved by perturbing a substantially square conductive patch such that the mode resonances are slightly displaced. As those of ordinary skill in the art would understand, now having benefit of this disclosure, there are multiple ways to achieve this effect, i.e., a multitude of single-feed approaches to achieve a circularly polarized variant of the single feed multistrip patch antenna. While a single-feed circularly polarized patch provides value in polarization diversity for many applications, for at least some RFID applications there may also be disadvantages. Embodiments described herein include additional aspects or features in order to optimize RFID links when the channel frequency varies over time. More specifically, these other embodiments realize a multi-linear polarization antenna rather than a circularly polarized antenna. The term "multi-linear polarization" is used to mean highly elliptical polarization in which the tilt angle of the polarization vector varies as a function of frequency, as opposed to simply dual polarization, as described further below. The tilt angle, or polarization tilt angle, is the angle that the polarization vector makes with an axis of a coordinate system. The term "highly elliptical" is used to mean an ellipse with an axial ratio of 3 dB or greater in some embodiments, and in other embodiments, it means an ellipse with an axial ratio greater than or equal to 5 dB.

Techniques, in a single feed microstrip patch design, to perturb the modes such that one resonates at a slightly different frequency than the other can be classified into at least two different types: those that alter an aspect along a diagonal dimension of the patch antenna and have a feed line aligned with a horizontal or vertical dimension, often referred to as "Type A", and those that alter an aspect along a horizontal or vertical dimension (i.e., corresponding to the dimensions of W or L) with a feed line along a diagonal line, often referred to as "Type B". Another way of describing these two types is that in Type A the configuration of the patch is altered in a diagonal direction and the patch has a feed aligned with a width or length direction, and in Type B the configuration of the patch is altered in a direction of the width or length and the patch has a feed aligned with a diagonal direction. In Type A, the alteration of the configuration of the patch may be, e.g., in a central region or at a corner of the patch. In Type B, the alteration of the configuration of the patch may be, e.g., in a central region of the patch, in a central region of a side of the patch, or along an entire side of the patch. In either Type A or Type B, the alteration of configuration may be a truncation (also referred to as "chamfering") or cutout, or, oppositely, an extension or tab (extending outward of the patch). An example of the first approach (Type A), illustrated in FIG. 11A, is to truncate the corners of a square patch 1115A, as shown by reference numerals 1119A, with the degree of truncation being sufficient to separate the mode resonances beyond that used for circular polarization. Thus, W and L would be equal in this approach. An example of the second approach (Type B), corresponding to a perturbation along a dimension W or L, illustrated in FIG. 11B, is to use a rectangular patch 1115B whose shape is relatively close to square. That is, the length L of the patch would differ slightly in magnitude from the width W of the patch 1115B. Also, in this approach, the feed line 1122B intersects the patch 1115B at a corner region 1119B of the patch 1115B. In contrast to single feed circularly polarized antennas that may use a similar architecture, in system 1100 the difference between length L and width W is, for a set patch thickness, greater in order to impart greater separation between the modal resonant frequencies, thus eliminating the condition for circular polarization. Thus, in system 1100B, the width W and the length L of patch antenna 1115B may be set to have magnitudes different from each other, as with patch antenna 1015 of system 1000.

The unloaded quality factor (Qo) of a single mode determines, in part, the amount of patch perturbation to produce the multi-linear polarization response. The quality factor Qo also determines the perturbation to achieve the circular polarization response for the single feed circularly polarized patch, and for both designs (i.e., circularly polarization and multi-linear polarization) the quality factor is assumed to be the same for both modes. A primary difference is seen, however, in the relationship between Qo and the magnitude of the perturbation. A perturbation (or perturbation area, also referred to as a delta area), Ds, is defined as an area either added to or subtracted from the top (i.e., non-ground plane) side metallization of a patch antenna. An area S is defined as the area of the unperturbed top side metal pattern of a patch. For the conventional Type A circularly polarized patch, the ratio of Ds to S equals 1 divided by the product of 2 and Qo (that is, Ds/S=1/(2*Qo). For Type B designs, the conventional circularly polarized patch prescribes the ratio of Ds to S as 1 divided by Qo (that is, Ds/S=1/Qo) (see, e.g., *Microstrip Antenna Design Handbook*, Prakash Bhartia, et al, 2001, pp. 503-515 Artech House). For the circularly polarized patch designs of both Type A and Type B, Qo is typically selected based on the desired axial ratio bandwidth, the impedance bandwidth, and the desired efficiency, although the axial ratio bandwidth is usually the most important factor. In other words, if the selected Qo satisfies the axial ratio bandwidth, it usually also satisfies the impedance bandwidth and the efficiency requirements. In both Type A and Type B designs, for the circularly polarized patch design resulting from the selected Qo and the resulting perturbation area, Ds, the normalized magnitudes of the impedances resulting from each mode are approximately 0.707 of the respective peak normalized magnitude values at the mid-band frequency at which they cross. In other words, if each mode has a normalized peak impedance response of 1.0 at the resonant frequency of that mode, the two modes cross at a relative impedance magnitude of 0.707 near the center frequency. The peak resistive, and impedance, values occur at the center resonance frequencies for each mode, respectively. In contrast, an exemplary embodiment for a single feed multi-linear polarization design is described next.

To convey the design process of the multi-linear polarized variant of single feed microstrip patch design, the following parameters are defined:

Bo: fractional operational bandwidth of the system

Bv: fractional 2:1 VSWR bandwidth of each individual mode, assumed to be the same for each of the two individual modes fa: center frequency of lower resonant mode fb: center frequency of upper resonant mode fc: center frequency of operating bandwidth; also midpoint between mode resonances sigma: ratio of mode separation to the product of the fractional operational bandwidth and the center frequency, fc X: the ratio of the fractional VSWR mode bandwidth to the operational bandwidth Ds: area of perturbation of top side patch metallization S: area of top side patch metallization Using these parameters, for a Type B single feed patch, the perturbation for the multi-linear design can be expressed in terms of the fractional operational bandwidth as:

$$Ds/S=(2\text{sigma}Bo)/(2+\text{sigma}Bo) \qquad \text{Eqn 1}$$

Equivalently, the perturbation ratio Ds/S can be expressed in terms of the fractional 2:1 VSWR bandwidth as:

$$Ds/S=(2\text{sigma}Bv)/(2X+\text{sigma}Bv) \qquad \text{Eqn 2}$$

The latter equation can be equivalently expressed in terms of Qo:

$$Ds/S = (2\text{sigma})/(2\text{sqrt}(2)XQo + \text{sigma}) \quad \text{Eqn 3}$$

It should be noted that X and Bv in Eqn 2 are related quantities, and likewise X and Qo in equation 3 are related quantities, such that setting one quantity also establishes the other. However, the equations are useful for comparing the increased magnitude of perturbation ratio Ds/S for a single feed multi-linear polarized patch compared to that for circularly polarized patches, which is often expressed in terms of Qo.

For a Type A single feed multi-linear polarized patch antenna, the equations establishing the perturbation ratio Ds/S are expressed as follows:

$$Ds/S = (\text{sigma}Bo)/(2 + \text{sigma}Bo) \quad \text{Eqn 4}$$

$$Ds/S = (\text{sigma}Bv)/(2X + \text{sigma}Bv) \quad \text{Eqn 5}$$

The latter equation can be equivalently expressed in terms of Qo:

$$Ds/S = (\text{sigma})/(2\text{sqrt}(2)XQo + \text{sigma}) \quad \text{Eqn 6}$$

As explained previously, the multi-linear design may separate the modes to a greater extent compared to the circularly polarized design. Also, because the multi-linear design generally utilizes higher Qo modes than the circularly polarized designs, the peak resistance corresponding to the former design may be greater than the latter design. For a good impedance match, it is typically desired that the variation in resistance not be too great within the operational band. Further, in order to achieve a high polarization aspect ratio (i.e., the ratio of the major to minor axis of the polarization ellipse) at the midband point, it is desired that the voltage phase difference between the two modes be substantially different than ±90 degrees at the midband point. For perfect linear polarization, the phase difference would be 0 or 180 degrees, although good near-linear polarization performance can be achieved without reaching these extremes. As the modes are moved further apart, the phase difference separation from ±90 degrees is increased. So, greater separation of the modes toward the edge of the operational bandwidth may improve both the impedance match throughout the band and the linearity of the polarization at the midband point. If the mode band centers fb and fa are removed too far outside the operational band limits, the desired polarization response is not achieved. In particular, the polarization tilt axis, tau, does not vary substantially, as will be discussed further below. Thus, for the multi-linear design, in order to achieve a good impedance match, a good elliptical aspect ratio, and a wide range of polarization tilt angles, the mode center frequencies, fa and fb, are located toward the ends of the operational band, either just inside or just outside the operational bands limits. The parameter sigma defines this separation as the ratio of the mode frequency separation (fb−fa) to the fractional operational bandwidth:

$$\text{sigma} = (fb - fa)/(Bofc) \quad \text{Eqn 7}$$

A value of sigma=1 places the lower and upper mode frequencies, fa and fb, respectively, to be coincident with the lower and upper limits of the operational bandwidth. In practice, values of sigma might be slightly larger than 1 or slightly less than 1 to balance requirements for polarization tilt, axial ratio, and impedance match. For example, sigma might be 1.3 or 0.8.

In an exemplary embodiment, a design is initiated by selecting Qo according to a desired fractional operating bandwidth, Bo. A value of X is selected in order to meet impedance and polarization requirements. In general, a value of X approximately equal to 0.47 is found to permit a good impedance match as well as good polarization characteristics. In other cases, discussed below, a different value of X might be used, for example to meet an efficiency requirement. For this exemplary embodiment, it is assumed that the value of Qo expressed by the following equation:

$$Qo = 1/(\text{sqrt}(2)XBo) \quad \text{Eqn. 8}$$

results in an acceptable value of efficiency when X=0.47. In this case, a value of sigma between 0.95 and 1.3 produces very good polarization tilt angle and axial ratio results. For example, the value of sigma=1.3 provides a polarization tilt angle that covers all but 5.4 degrees of a first quadrant, and a minimum axial ratio of 5.8. The value of sigma=0.95 provides a polarization tilt angle that covers a full quadrant and about 15 degrees of a second quadrant, and a minimum axial ratio of 3.2 dB over a quadrant. The final selection of sigma may be dictated according to satisfying requirements for the input impedance match.

It should be emphasized that equation 8 is expressed in terms of a fractional operating bandwidth, such that the results are extensible to a very wide range of operating bandwidths. In some extreme cases, the operating bandwidth of the system may be so narrow that the Qo according to Eqn. 8 results in an unacceptably low efficiency. In such cases, a larger value of X may be used to result in a larger fractional VSWR bandwidth and hence lower Qo.

Also of significance, with single feed circularly polarized patch antennas, designers typically minimize Qo to broaden the axial ratio bandwidth of the patch. In fact, in many single feed circularly polarized designs, the axial ratio bandwidth requirement drives the designer to use a low Qo much more than does the impedance bandwidth. Lowering the Qo is typically done by increasing the thickness of the patch or decreasing the relative permittivity of the substrate between the top and bottom metal layers, which necessitates an increase of the overall metallized area. In contrast, with the multi-linear patch design, higher mode Qo's are typically desired as this results in greater axial ratios (higher eccentricity, or degree of polarization linearity). For example, as described above, the fractional VSWR bandwidth Bv may be only, approximately, one half (0.47 in the preceding example) of the operational bandwidth, and hence the Qo may be approximately twice that of a Qo designed for the full operational bandwidth. The higher Qo is typically achieved by reducing the patch thickness, which is usually also a trait for size and weight considerations. The higher Qo may also be achieved by increasing the relative permittivity of the substrate between the top and bottom metallization areas of the patch, which necessitates a reduced metallization area for fixed resonant frequencies.

Increasing the patch thickness typically increases the patch efficiency, ignoring effects of surface waves. However, the thickness to achieve acceptable circular polarization over an operational bandwidth is often greatly in excess of the thickness for acceptable patch efficiency. In contrast, the design of the multi-linear polarized single feed patch antenna allows for the thickness to be reduced down to the desired efficiency of the patch. In fact, due to the reduction of polarization losses afforded by the multi-linear polarization, in comparison to the 3 dB one-way loss between a circularly polarized antenna and a linearly polarized antenna, the designer may be afforded the design freedom to reduce the efficiency of the patch, and hence also further reduce the thickness of the patch.

The following example is specific to designing a Type B multi-linear polarized single feed patch: We defined a delta area, Ds, as the product of (i) the difference between length and width and (ii) width, where width is shorter than length. That is, Ds=(L−W)*W. We define an area, S, that is defined as W*W.

It is of interest to examine the difference in perturbation areas between the circularly polarized (CP) single feed designs and the multi-linear polarized single feed designs. For the Type B CP design, the perturbation is prescribed to be Ds/S=1/Qo. In contrast, for the multi-linear polarized single feed design, if it is assumed X is approximately 0.5, that 1.4 Qo>>1 (which holds for all patches of practical interest), and that sigma is at least 1, then a lower bound on the perturbation ratio may be expressed by $$Ds/S > sqrt(2)/Qo \qquad \text{Eqn. 9}$$

In this case, the perturbation area is at least 40% greater than that associated with the Type B CP design. In one or more embodiments, sigma=1.3, such that Ds/S is approximately 2 times the perturbation ratio for the Type B CP design. Similar ratios may be found in comparing the Type A versions of both designs. Because the mode separations are determined by the perturbation ratios, it can be seen that the mode resonances in the multi-linear design are separated to a greater degree by these same factors; that is, >40% or approximately 2 times the separation in one or more embodiments compared to the CP designs. As an example, for a laminate characterized by a relative permittivity of approximately 3 and a laminate thickness of 0.175 inches, one dimension of a Type B patch might be 3.630 inches, and the orthogonal dimension might be 3.505 inches. The resulting unloaded quality factor (Qo) of either mode may be approximately 53 with a corresponding 10 dB return loss bandwidth of 14 MHz, such that the resulting superposition of the two staggered modes can cover the entire band defined by the North American (FHSS) implementation of the EPCglobal Class 1 Generation 2 standard. As stated above, a delta area, Ds, is defined as the product of (i) the difference between length and width, and (ii) width, where width is shorter than length. The delta area, divided by the area, S, approximately established by Equation 1, 2, or 3 above, results in a ratio of 0.0366. In contrast, for single-fed circularly polarized patch designs, this ratio is prescribed to be 1/Qo, or in this case 0.019 (see, e.g., *Microstrip Antenna Design Handbook*, Prakash Bhartia, et al, 2001, pp. 503-515 Artech House). In other words, the type B design taught herein calls, in this example, for a ratio of delta area divided by area that is approximately 1.9/Qo, which results in an extension of one dimension that is approximately 1.9 times greater than is taught for singly-fed circularly polarized antennas with the same Qo.

For single feed patches of Type A, the condition for circular polarization is that the delta area divided by the area is equal to 1/(2 Qo), where in this case the delta area is the additional patch area added to or removed along the diagonal dimension. Following the technique for the Type B case with circular polarization would result in a delta area divided by area that is approximately 1/Qo.

Figure 20:
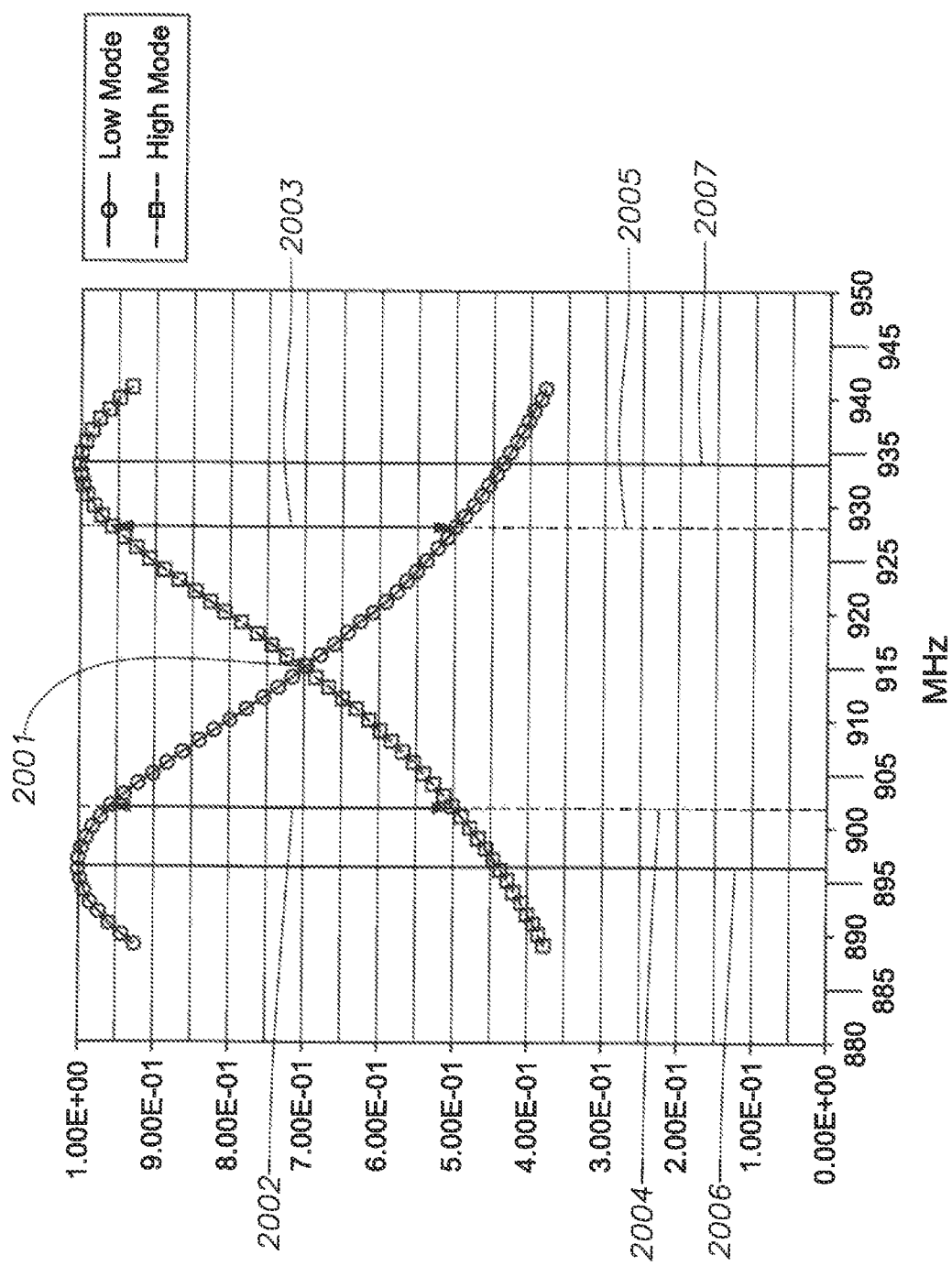
FIG. 20 is a graph showing the normalized magnitude voltage responses of upper and lower resonant modes in a single feed circularly polarized patch antenna.
Figure 21:
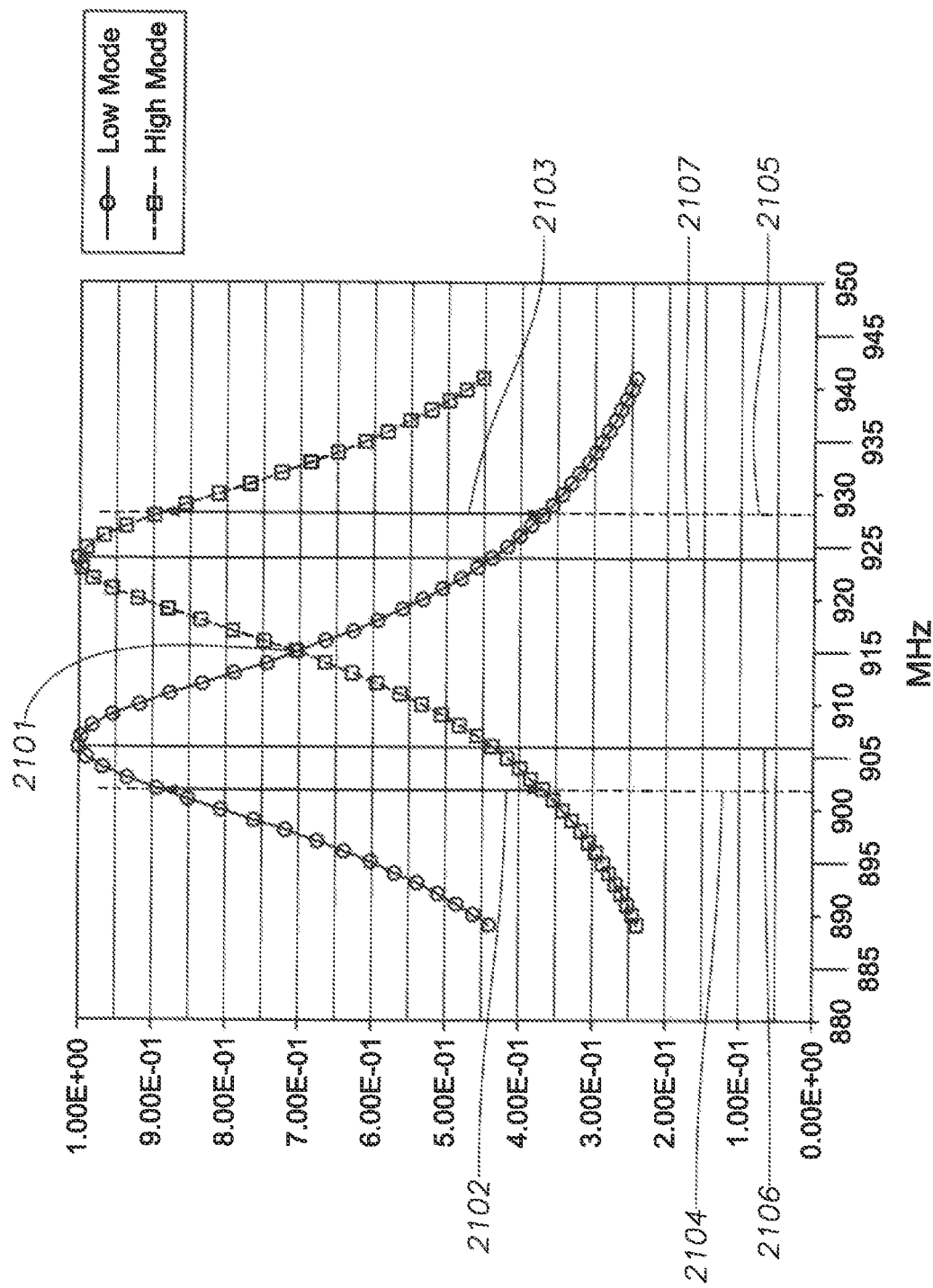
FIG. 21 is a graph showing the normalized magnitude voltage responses of upper and lower resonant modes in a single feed circularly polarized patch antenna having a higher unloaded quality factor as compared to FIG. 20.

To further underscore the differences in the design and functionality of the multi-linear polarized Type B single feed patch antenna compared to the circularly polarized (CP) Type B single feed patch antenna, FIG. 20 shows the normalized magnitude voltage responses of the two modes (upper and lower resonant modes) in a single feed circularly polarized patch antenna in which Qo=25. The x-axis is in units of MHz and corresponds to an operational RFID band from lower frequency 2004 at 902 MHz to an upper frequency 2005 at 928 MHz. The y-axis represents the normalized magnitude voltage response. The conditions for circular polarization result in a lower mode center frequency 2006 and an upper center mode frequency 2007. As required for the circular polarization condition of the single feed patch, the responses intersect at midband at point 2001 with a value of approximately 0.707 relative to the peaks, which have a normalized value of 1.0. In practice the peaks of the two resonant modes may not be exactly the same magnitude level. The phase difference (not shown) between the two modes at this point is approximately ±90 degrees, as it is for circular polarization. For perfect circular polarization, the amplitudes are equal, so the axial ratio of the antenna tends to become elliptical at the band edges, where the difference in amplitudes shown by arrows 2002 and 2003 is such that the voltage magnitude ratio is 1.9. However, because of the low Qo, the amplitude and phase are close enough to the conditions for circular polarization (equal amplitude and ±90 degree phase difference) that the axial ratio does not exceed 6.3 dB even at band edges. If the patch Qo is increased to 53, and the condition for circular polarization is maintained by moving the modes closer together, the normalized magnitude voltage responses become narrower as shown in FIG. 21. The units of the x-axis in FIG. 21 are also in MHz. Specifically, the mode center frequencies 2106 and 2107 are inside of the operational band limits 2104 and 2105. The crossing point 2101 remains at a level of 0.707, as it should for the circular polarization condition, and similarly the phase difference between the two modes (not shown) is approximately 90 degrees at this point. The separation 2102 at the lower operational band limit 2104 and the separation 2103 at the upper operational band limit 2105 of the operating band at the edges has increased to result in a magnitude ratio of approximately 2.4, which results in a higher axial ratio at the band edges. This design would typically be considered under-designed in the sense that it does not achieve good axial ratio performance across the entire operating bandwidth. However, this sub-optimal performance is sometimes used for single feed circularly polarized patch designs as increased axial ratio bandwidth often comes at the expense of unsuitably large patches or increased cost. Although the under-designed CP single feed patch becomes linear at the band edges, it will be shown below that this under-designed CP single feed design is inferior to the specific multi-linear design. In other words, the multi-linear design does not result simply from applying the conditions for circular polarization with a Qo that is too high to obtain broad circular polarization across the operating bandwidth. Rather, the multi-linear single feed design requires a specific Qo relative to the operating bandwidth and proper spacing of the two resonant modes.

Figure 22:
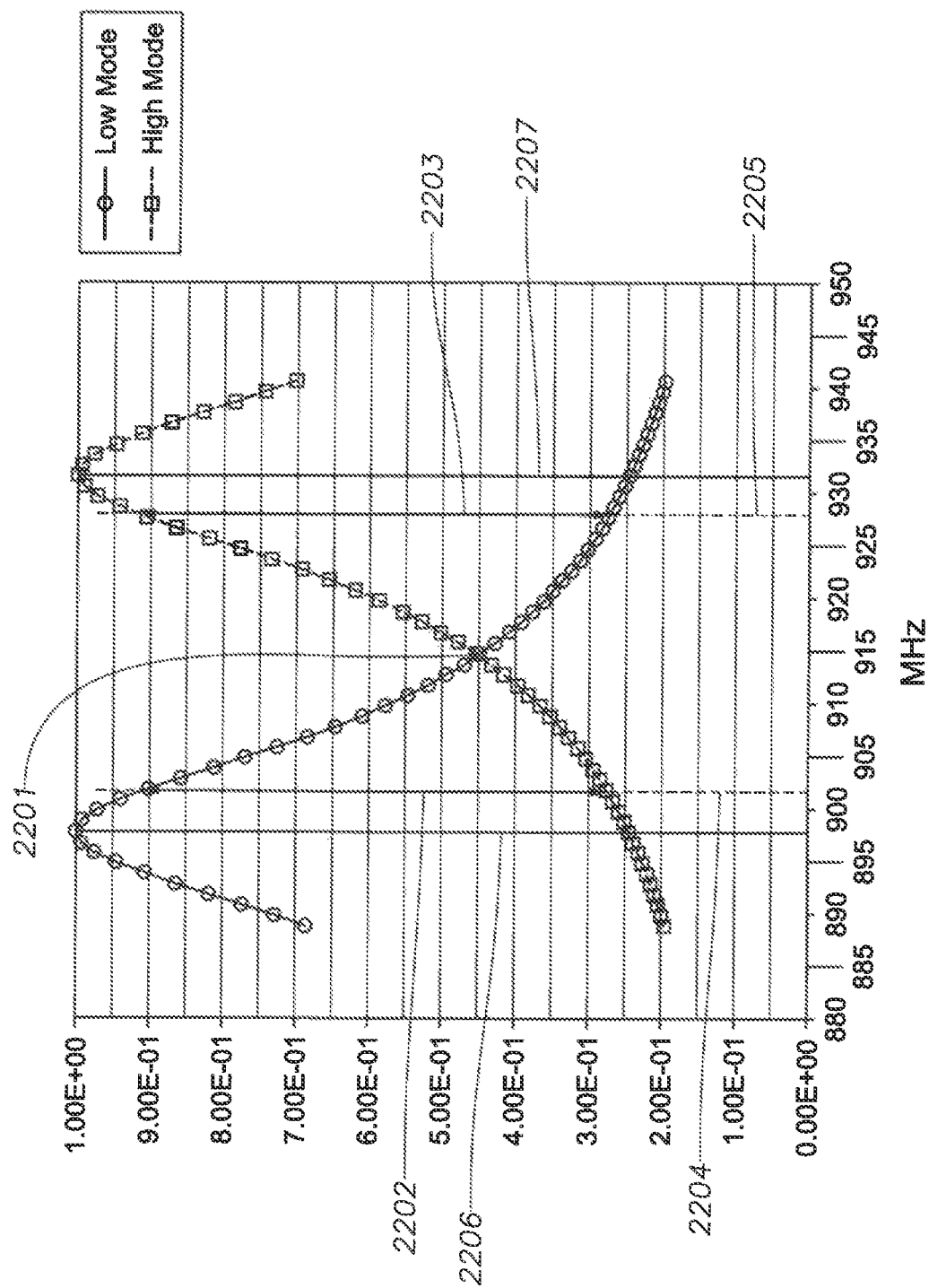
FIG. 22 is a graph showing the normalized magnitude voltage responses of upper and lower resonant modes in a single feed multi-linear polarized patch antenna, in accordance with one or more embodiments described herein.

FIG. 22 illustrates the normalized magnitude voltage responses of the two modes (upper and lower resonant modes) for the multi-linear polarized single feed design when the single mode Qo=53 and sigma=1.3. The units of the x-axis in FIG. 22 are also in MHz. A lower mode response has a center frequency 2206 and an upper mode response has a center frequency 2207. At midband, the magnitudes intersect at a point 2201 with a voltage magnitude response of approximately 0.45. Furthermore, the phase (not shown) difference at midband is 125 degrees—substantially different than the ±90 degrees for circular polarization. So, even though the two magnitudes are equal at midband, the phase difference is such that the two modes together produce a highly elliptical response (5.8 dB axial ratio), as opposed to a circular polarization response. At the lower operating band edge 2204 and at the upper operating band edge 2205, the magnitude ratios shown by arrows 2202 and 2203, respectively, have increased to about 3.2, so that greater polarization linearity is achieved at the band edges of the multi-linear patch design compared to the circular polarization design.

One of the significant features of the multi-linear polarized single feed patch design is that the design results in a polarization vector that advances from horizontal to vertical as the frequency is increased across the operational band, and that at each increment, or step in frequency, the polarization response is characterized by an axial ratio that is 3 or higher. In other words, the multi-linear polarized single feed patch produces polarization tilt angles, with respect to an axis referenced to the patch, that spans at least nearly 90 degrees as the frequency increases from the lower limit of the operational band to the upper limit of the operational band, and at each frequency step the axial ratio is at least 3. The phrase "nearly 90 degrees", as used herein, means at least 70 degrees in some embodiments and greater than 80 degrees in other embodiments. This multi-linear functionality is due to the (i) gradual transition of radiation from one dominant mode at one end of the operating band to the other mode at the other end of the operating band, where "dominant" refers to the stronger voltage response between the two modes; and to the (ii) relative phase response being substantially different than ±90 degrees, preferably 0 degrees or 180 degrees. The vector summation of the fields from the two modes results in a major axis of the polarization ellipse and a corresponding polarization tilt angle that transitions across the span of polarization tilt angles as the channel frequency transitions from one end to the other of the operational bandwidth. It is possible to design a single feed antenna in which the polarization response is highly elliptical, yet the polarization tilt angle does not cover the angular region of a quadrant as the frequency is shifted across the operational band. As an example, the circularly polarized patch with Qo=53 from the previous example is reconsidered. Typically, antenna designers select a circularly polarized antenna to control polarization loss in communication links in which one end is served by a linearly polarized antenna with unknown orientation. Single feed antennas are often chosen for manufacturing ease and small size. However, broadband low axial ratio performance, which requires a low Qo, is difficult to achieve with single feed patch designs, especially if the patch thickness is a constraint. If a single feed design is applied in which the Qo is too high, a low axial ratio across the whole operational band is not possible, as illustrated in the previous example displayed in FIG. 21 in which the Qo=53. In this case the polarization becomes linear at the band edges. However, the polarization vector does not sample the full quadrant as a function of frequency, with a high axial ratio at each frequency within the operating band, as does the multi-linear design. This difference between the total angular extent of the circular polarization design and that of the multi-linear polarization design is illustrated in FIG. 23, which is described next.

Figure 23:
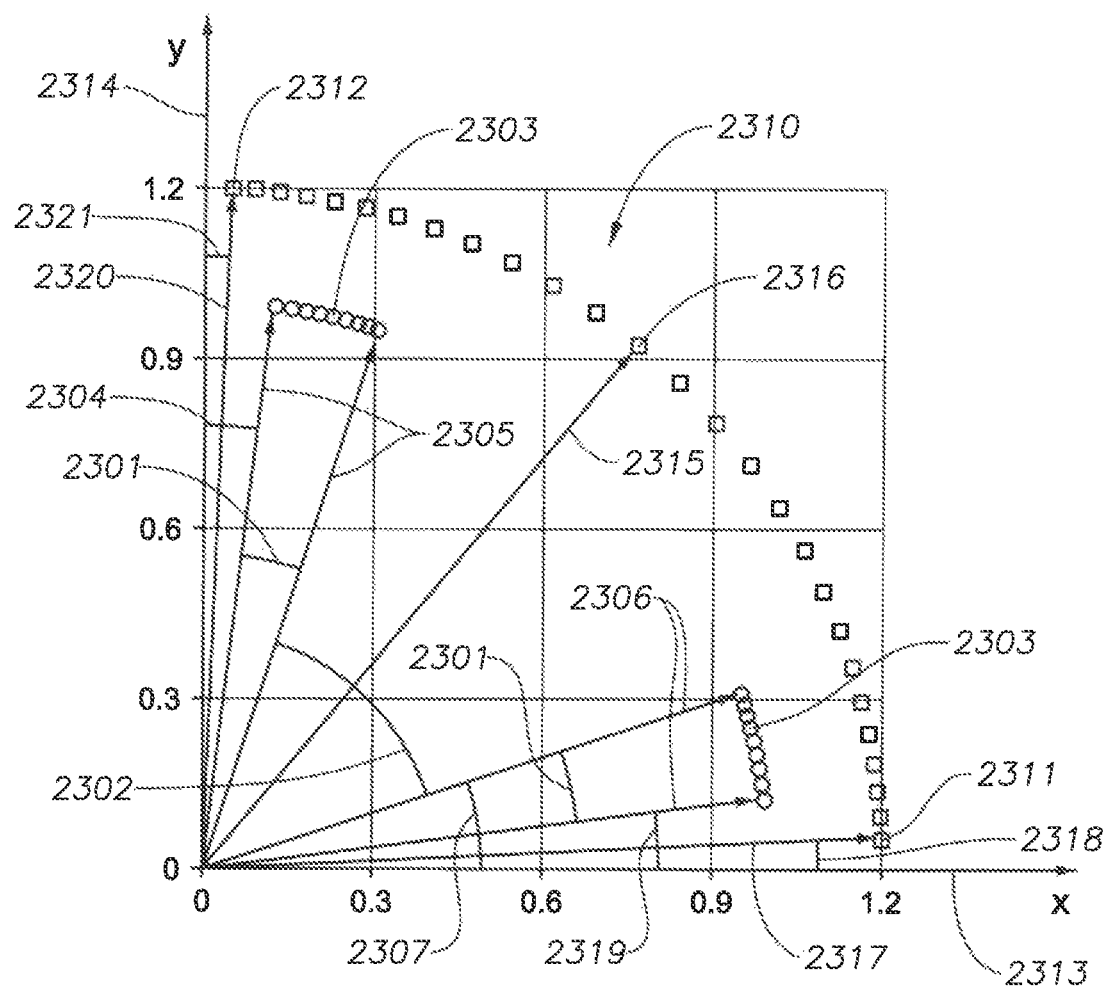
FIG. 23 is a graph showing the (A) polarization vectors, (B) polarization tilt angles, and (C) total angular span covered, (i) for the case of a single feed circularly polarized patch antenna and (ii) for the case of a single feed multi-linear polarized patch antenna, in accordance with one or more embodiments described herein.

FIG. 23 shows two sets of polarization vector endpoints, 2303 (circular polarization) and 2310 (multi-linear polarization), over a first quadrant defined by positive x- and y-values in a Cartesian coordinate system with x-axis 2313 and y-axis 2314 (data set 2303 appears in the figure as two separate data sets, but these are actually deemed part of a single data set 2303; the explanation for this interpretation is given below). The illustrated values along the x- and y-axes in FIG. 23 represent normalized strength of the electric field (as normalized values, they have no units); a given interval along the x-axis represents the same magnitude as the same interval along the y-axis. In the context of FIG. 23, "polarization vectors" are defined to be synonymous with the major axis polarization vector of an elliptically polarized electromagnetic field, and "polarization endpoints" are defined to be the vector endpoints of that same major axis polarization vector. In the figure, polarization vectors are denoted by reference numerals 2305, 2306, 2315, 2317, and 2320 (note that each of reference numerals 2305 and 2306 refers to two illustrated vectors). Each data symbol in sets 2303 and 2310 represents an endpoint of a polarization vector, although the polarization vectors having these endpoints are not shown, except for 2305, 2306, 2315, 2317, and 2320, so as not to detract from the legibility of the figure. For example, polarization vector 2315 terminates at endpoint 2316. In each of sets 2303 and 2310, neighboring data symbols represent a 1 MHz difference in frequency, and the total span of frequencies is from 902 MHz to 928 MHz, which is the operational bandwidth in this example. Only endpoints corresponding to an axial ratio greater than 5 dB are shown, as these are the points at which polarization loss is greatly reduced in transmission to a linear polarized antenna. Data set 2303, denoted by circle symbols in the plot, corresponds to a single feed circularly polarized (CP) patch with Q=53. The angle that a polarization vector makes with an axis, such as the angles 2319 and 2307 between the polarization vectors 2306, respectively, and the x-axis, is referred to as a polarization tilt angle. Similarly, polarization vector 2317 terminates at endpoint 2311 with a polarization tilt angle 2318. Data set 2310, denoted by the square symbols, corresponds to the single-feed multi-linear (ML) polarized design. The mode spacing for the ML design is greater than the CP design as prescribed previously; that is, the mode spacing of the ML design is approximately twice as great as that of the CP design. The radius, or magnitude of the polarization vectors in FIG. 23, is insignificant; the difference in radius between the two data sets 2303 and 2310 (or between the magnitude of CP polarization vectors 2305, 2306 and the magnitude of multi-linear polarization vectors 2315, 2317, and 2320) is introduced artificially and only serves to better distinguish the two data sets 2303 and 2310. The span 2302, in which there are no data points corresponding to the CP design, arises from the absence of polarization vectors over this angular span for the frequencies within the operating bandwidth. That is, over the span of frequencies that define the operating bandwidth, the major axes of the polarization ellipses do not lie within this angular span for the CP design. There are two spans 2301 within the CP data set 2303 in which the axial ratio is greater than 5 dB, and the polarization vectors 2305 are shown at the respective angular ends of one of these spans 2301, and the polarization vectors 2306 are shown at the respective angular ends of the other one of these spans 2301. Thus, all the endpoints 2303 of the CP data set within the two spans 2301 represent polarization vectors with corresponding axial ratios greater than 5 dB, although for the purpose of readability the polarization vectors having those endpoints 2303 are not shown except for the four polarization vectors 2305 and 2306. The total angular span covered by linear polarization, that is, the sum of the two spans 2301 (in this case, defined by axial ratio greater than 5 dB), is approximately 22 degrees. In contrast, the total angular span covered by the multi-linear polarization, indicated by the set of the endpoints 2310, covers almost the entirety of the quadrant, i.e., almost 90 degrees.

It should be noted that the end points of the multi-linear span, such as points 2311 and 2312, correspond to the two end frequencies of the operational band, 902 MHz and 928 MHz, respectively, in this example. So, whereas channel hopping at resolution steps finer than 1 MHz will result in additional polarization vector endpoints within the interior of the angular span, the outer limits 2311 and 2312 will not be exceeded for this particular design. In other words, in this specific design there will be no tilt angle less than the angle 2318 formed by the vector 2317 to point 2311 (approximately 2.5 degrees) and the x-axis, and no tilt angle greater than the angle (not identified by reference number but shown to be approximately 87.5 degrees) formed by the vector 2320 to endpoint 2312 and the x-axis. Thus, the polarization vectors corresponding to endpoints 2311 and 2312 closely approach the horizontal and vertical axes, respectively. In contrast, larger gaps 2304 and 2319 exist for the CP design data set. It should be noted that, for the CP design, these gaps 2304 and 2319 do not imply the absence of radiation with a polarization vector aligned within regions 2304 and 2319. Rather, the polarization tilt angles within these regions will not also exhibit an axial ratio greater than 5 dB, and hence linear tags polarized in the range of the spans of the gaps 2304 and 2319 will entail higher minimum polarization loss over the set of frequencies within the operating band, compared to the multi-linear design. While the difference in magnitude between gap 2304 (CP case) and gap 2321 (ML case), or between gap 2319 (CP case) and gap 2318 (ML case) may not appear to be great, this difference is in fact highly significant. In other words, coverage (specifically, polarization tilt angle with axial ratio greater than 5 dB) in one embodiment may be extended to as close to the coordinate axes as possible (or even beyond the axes). Similarly, the gap 2302 associated with the CP case is a significant disadvantage, compared to the ML case, because the ML case will exhibit reduced polarization loss over this angular region as well. Designing for polarization vectors (with polarization tilt angle with axial ratio greater than 5 dB) close to the coordinate axes is a factor, not just for the coverage of quadrant one, but more so for coverage into the neighboring quadrants, namely quadrants two and four. As is customary, quadrant two is defined as the set of coordinates [x<0, y>0]; quadrant three as coordinates [x<0, y<0], and quadrant four as coordinates [x>0, y<0]. The oscillation of the electric field creates the negative vectors to those shown in FIG. 23 such that quadrant three is covered to the same extent as quadrant one. For the multi-linear design, polarization coverage of quadrants two and four is largely dependent upon the nearest polarization vector in quadrants one or three. In this case, if the quadrant one polarization vectors are close to the x- and y-axes, as in the preceding example with polarization vector 2317 and corresponding polarization endpoint 2311, and the polarization vector 2320 and corresponding polarization endpoint 2312, significant improvement in (i.e., reduction of) polarization loss is also achievable in quadrants two and four, although not to the same degree as quadrants one and three. A worst case arises in which a corresponding antenna (i.e., the other end of the link) is polarized midway between the x- and y-axes in quadrants two or four (i.e., either 135 degrees or 315 degrees counterclockwise from the x-axis). In this case, assuming the multi-linear design achieves polarization vectors near the x- and y-axes in quadrants one and three, this worst case polarization loss is about 3 dB. However, that loss occurs only at that one specific angle—everywhere else the loss is less when the vector endpoints in quadrant one align exactly with the x- and y-axes. With the small coverage gaps 2318 and 2321 at the x- and y-axes, respectively, or in other words, with the small angles formed by polarization vector 2317 and the x-axis, and by polarization vector 2320 and the y-axis, respectively, the worst case polarization loss is slightly greater than 3 dB at angles 135 and 315 degrees in quadrants two and four respectively; and up to a small angular extent less than or greater than 135 and 315 degrees, the worst case polarization loss tapers from slightly greater than 3 dB to 3 dB. For example, for the multi-linear design data illustrated in FIG. 23, the polarization vector 2320 ending at point 2312 is approximately 2.7 degrees from the y-axis. Thus, the worst case polarization loss to a tag oriented at 135 degrees counterclockwise from the x-axis is 3.4 dB. At 132.3 degrees and at 137.7 degrees the polarization loss would be 3 dB, and everywhere else within quadrant two the polarization loss is expected to be less than 3 dB. In comparison, the theoretical 3 dB loss is precisely the loss expected everywhere in a link between a circularly polarized antenna and a linearly polarized antenna. This example has illustrated that the multi-linear single feed design does not arise by happenstance in which only the Qo is increased. Rather, the multi-linear design, characterized by: (i) a highly elliptical polarization at each channel frequency; (ii) an ellipse major axis tilt angle that varies throughout two quadrants (one and three or two and four) as a function of channel frequency, and (iii) polarization vectors very near the x- and y-axes (i.e., a range of tilt angles that covers at least very nearly 90 degrees or possibly more than 90 degrees), must be carefully designed with both a measured selection of Qo and a corresponding mode separation as prescribed above.

Although the example above was applied with respect to a specific coordinate system, those skilled in the art, now having the benefit of this disclosure, will recognize that the coverage characteristics of quadrants one and three may be interchanged, through design, with quadrants two and four. That is, in the preceding example, the polarization coverage illustrated in FIG. 23 also extends to quadrant three due to the oscillatory nature of the polarization vector of electromagnetic fields. Thus, the polarization loss characteristics in quadrant four are expected to be described similarly to those in quadrant two in the example above. So, quadrants one and three have stronger polarization coverage than quadrants two and four in the preceding example. Those skilled in the art of antenna design, now having the benefit of this disclosure, would recognize that the multi-linear polarized single feed patch antenna may be alternatively designed to provide the stronger polarization coverage in quadrant four as opposed to quadrant one. Then, quadrants four and two would be characterized by the stronger polarization coverage, and in this alternative design the polarization coverage characteristics of quadrants one and three would be interchanged with quadrants two and four. In general, two of the quadrants will be characterized by stronger polarization coverage than the remaining two.

The mode spacing, established by the variable "sigma" referenced above, and the ratio of the fractional VSWR mode bandwidth to the operational bandwidth, represented by the variable "X", can both be modified slightly to impact the axis gap angles 2318 and 2321. For example, a value of sigma=1.2, instead of 1.3 as in the previous example (FIG. 22), results in axis gap angles 2318 and 2321 of only 0.05 degrees. This typically reduces the axial ratio at the center band. In this case, the axial ratio at center band is reduced from 5.8 to 5.1 when sigma is reduced from 1.3 to 1.2. Similarly, Qo may be slightly reduced to lessen the axis gap angles 2318 and 2321 at the expense of axial ratio at the center band. These slight variations would typically be traded in consideration of impedance matching requirements in the design of the multi-linear single feed patch. For example, a more stringent impedance matching requirement might require sigma=1.3, whereas a less stringent impedance matching requirement might permit sigma=1.2. In some cases, a sufficiently lenient impedance matching requirement might permit sigma equal to or slightly less than 1.0, in which case the axis gap angle 2304 may vanish. In fact, polarization vector endpoint 2312 may cross over into quadrant two, further improving polarization coverage in that quadrant.

There are a number of ways in which Type A and Type B patch perturbations may be implemented. A second type of Type A approach is to modify system 100 B by employing cutouts of the conductive regions of the patch. Again, the cutout region is larger than the cutout region used to achieve circular polarization, and in fact large enough to render the polarization highly elliptical or substantially linear.

With regard to single feed circularly polarized antenna systems, the frequency bandwidth over which the patch is circularly polarized is very narrow, in fact, significantly narrower than the overall impedance and radiation bandwidths. Outside of that narrow band in which the patch is nearly circularly polarized, the patch becomes linear horizontally and vertically polarized at opposite ends of the patch band, respectively.

There are at least two disadvantages to the conventional single feed circularly polarized patch antenna, one of which applies to many applications, and the other of which is specific to many RFID applications. The first of these disadvantages is, as stated above, that the bandwidth over which the antenna exhibits good circular polarization (i.e., the axial ratio bandwidth) is quite limited, and is in fact found to be significantly less than the impedance and radiation pattern bandwidths of the antenna. To broaden the axial ratio bandwidth, designers may increase the thickness of the antenna such that the axial ratio bandwidth fully covers the operating bandwidth. This increased thickness sometimes results in unacceptably voluminous antennas. Designers may be able to reduce the relative permittivity of the substrate between the top and bottom metallization layers of the patch, but this type of change increases the cross-sectional area of the patch. Regardless of the difficulties with the single feed patch, the simplicity of single feed designs has resulted in numerous deployments.

The second disadvantage of these single feed circularly polarized patch antennas is generally shared with the class of circularly polarized antennas in many RFID applications, i.e., regardless of the design. Most RFID tags employ linear polarization, driven by the demand for low cost and small-size tags and given the fact that circularly polarized antennas are, in general, larger and more complex with higher fabrication cost. Because tag orientation is often unknown, and linear cross-polarization between a reader antenna and a tag antenna can result in very high (theoretically infinite) link loss, and frequently to the point at which reader-tag communication is not possible, RFID readers frequently employ antennas with circular polarization. However, whereas the use of circularly polarized reader antennas at the reader prevents unlimited polarization loss, there is an associated nominal loss of 6 dB in the roundtrip link (3 dB polarization power loss from the reader antenna to the RFID tag, and another 3 dB polarization power loss from the RFID tag antenna back to the reader) because half of the power is lost to polarization mismatch between circular and linear polarizations.

In view of the above disadvantages, this disclosure teaches a variation on the above approaches to a single feed circularly polarized patch antenna. This variation results in improved performance for RFID systems in which the channel frequency is varied over time. According to this variation, the horizontal and vertical polarization mode center frequencies are separated to the low and high edges of the entire operating band. For RFID systems employing FHSS, these edges would encapsulate the entire FHSS band. Thus, at one end of the FHSS band, the antenna operates as a horizontally polarized antenna, whereas at the other end of the FHSS band the antenna operates as a vertically polarized antenna. Toward the middle of the band, the modes are roughly equal in amplitude but without the ±90 degree separation that would constitute a circularly polarized antenna. Instead, toward the middle of the band, the two modes tend to create a diagonal polarization (or an elliptical polarization with high aspect ratio) that lies between the horizontal and vertical modes. In this manner, the 6 dB roundtrip polarization loss is avoided in RFID reader-to-tag communications. In addition, there is no need to increase the patch antenna thickness to increase the axial ratio bandwidth. In fact, the requirement to band-limit each mode (frequency multiplex) drives the design to thinner patches.

The substantially multi-linear polarization described above is achieved by designing the patch antenna such that the resonant frequencies of the two modes are significantly further apart than is used for single-feed circularly polarized (CP) antennas and by utilizing antenna unloaded quality factors that are significantly higher than typically employed for single-feed circularly polarized antennas, as described above. For example, the aspect ratio of the nearly square design is greater than for the CP design, and the chamfered corner design as taught herein has a larger chamfer compared to the CP design. Whereas in single-feed CP designs, the magnitude of the input impedance at the channel frequency is typically $1/\sqrt{2}$ below the peak impedance magnitude in order to achieve the ±90 degree phase separation, as taught herein the impedance magnitudes of the two modes might cross at one-half or less of the peak impedance magnitude.

The usual design choice in RFID communications is to employ a CP antenna for use with the reader in order to handle the arbitrary polarization angle of the one or more tags, which typically have linearly polarized antennas. The biggest disadvantage of this approach is that, nominally, 3 dB of power is lost in the link from the reader to the tag, and another 3 dB of power is lost in the link from the tag back to the reader. As an alternative to circularly polarized antennas, some practitioners deploy systems in which the reader switches between multiple linearly polarized antennas, typically between two and four. One disadvantage of this approach is that different antennas are usually employed for spatial diversity; e.g., to look in different directions to ensure optimal coverage so that tags are not missed. An antenna used for polarization diversity cannot usually also provide adequate spatial diversity. Moreover, an additional antenna must be used for each linear polarization. If two antennas with orthogonal polarizations are employed in a switching scheme, and a tag is aligned diagonally between those two polarizations, the polarization power loss is theoretically identical to that associated with a link between circular and linear polarized antennas. A second disadvantage is that the reader must send switch commands to control the antennas. The embodiments described and taught herein, in which a single antenna provides multiple linear (or elliptical with high eccentricity) polarizations, progressing from one linear polarization toward another orthogonal linear polarization as a function of increasing channel frequency, might not be practical for a vast majority of links in RF and wireless communication links, and hence these embodiments would not be readily apparent to antenna and communication systems engineers. For example, whereas orthogonal polarizations, each associated with a discrete bandwidth that is isolated from the other by a guard band, are not uncommon to promote channel isolation (e.g., in forward and return links), devising a communication scheme with a multitude of closely spaced channels in order to promote polarization diversity would be considered prohibitively complex and expensive. Frequency hopping spread spectrum techniques applied in other communication practices (i.e., non-RFID), could not readily adopt the single feed multi-linear polarization solution because links with requirements for a high degree of determinism could not tolerate the frequent polarization misalignments that would result; i.e., the polarization hopping would have to be synchronized, which would require a priori knowledge of the antenna orientations on each side of the link, thus rendering the solution entirely impractical. The impracticality of the solution is further highlighted by the consideration that the source would be transmitting energy over a variety of polarizations, only one of which would really be optimal for the receiving end. In contrast, an RFID reader commonly serves a multitude of tag clients exhibiting the full range of polarizations, such that power transmitted at any specific polarization is not generally wasted. Furthermore, in systems in which antenna size and complexity are not extreme design considerations, circularly polarized antennas are the natural choice to deal with uncertainty of the relative orientations between two antennas. The confluence of (i) RFID systems with a reader addressing up to a multitude of linearly polarized tags of arbitrary orientation; (ii) RFID applications that are tolerable of non-determinism; and (iii) the incorporation of a frequency hopping scheme for the purposes of interference mitigation and interoperability present a problem space that is somewhat unique relative to historic RF and wireless communication scenarios. Hence, antennas specialized for this problem space have not been heretofore considered. Said problem space is well addressed by a single feed multi-linear polarization antenna, as taught herein, that progresses from one linear polarization toward another orthogonal linear polarization as a function of increasing channel frequency.

Certain embodiments described above with reference to FIGS. 11A, 11B, and 20-23 may also be described as follows. A system may include an RFID interrogator configured for generating an RFID signal, where the channel frequency of the RFID signal changes over time within a given operational bandwidth; at least one single feed patch antenna; and at least one single feed line configured for feeding the RFID signal to its corresponding single feed patch antenna at a single feed point, where the at least one single feed patch antenna is configured to transmit an electromagnetic wave in response to and at the channel frequency of the RFID signal fed thereto from its corresponding single feed line. The at least one single feed patch antenna is further configured such that the electromagnetic wave exhibits (1) a polarization tilt angle that varies depending on the channel frequency of the RFID signal, (2) a substantially linear polarization at all channel frequencies of the RFID signal within the given operational bandwidth, and (3) a range of polarization tilt angles across the given operational bandwidth that spans at least 70 degrees within a single quadrant. In some embodiments, the variation in the polarization tilt angle between a first channel frequency of the RFID signal and a second, consecutive channel frequency of the RFID signal does not exceed 45 degrees. In some embodiments, the electromagnetic wave is characterized by a polarization axial ratio greater than or equal to 3.0 dB, at all channel frequencies of the RFID signal within the given operational bandwidth. As in other embodiments herein, the channel frequency of the RFID signal generated by the RFID interrogator may change over time according to a frequency hopping spread spectrum protocol. Further and more specifically as to the variation of polarization, the single feed patch antenna may be configured such that the electromagnetic wave has a first substantially linear polarization with a first polarization tilt angle in response to the RFID signal when the RFID signal has a channel frequency at or near a lower end of the given operational bandwidth, and such that the electromagnetic wave has a second substantially linear polarization with a second polarization tilt angle in response to the RFID signal when the RFID signal has a channel frequency at or near a higher end of the given operational bandwidth, the first substantially linear polarization and the second substantially linear polarization being substantially orthogonal to one another (e.g., substantially horizontal and vertical polarizations, or vice versa). Orthogonal polarizations are ones that differ from one another by 90 degrees; polarizations are considered "substantially orthogonal" to one another even if they deviate from orthogonality by up to 20 degrees, e.g., two polarizations that differ from one another by 70 degrees are considered "substantially orthogonal." Further in this regard, the single feed patch antenna may be configured such that the electromagnetic wave has a substantially linear polarization at all channel frequencies within the operational bandwidth and has a polarization tilt angle that varies between the polarization tilt angle of the first substantially linear polarization and the polarization tilt angle of the second substantially linear polarization as the channel frequency of the RFID signal increases from the lower end of the given operating bandwidth to the higher end of the given operating bandwidth. Further, the single feed patch antenna may be characterized by a lower resonant mode center frequency and an upper resonant mode center frequency, wherein the absolute value of the difference between the lower resonant mode center frequency and the upper resonant mode center frequency, divided by the upper resonant mode frequency, is greater than 1.8 times the 2:1 VSWR bandwidth and less than 3.5 times the 2:1 VSWR bandwidth. Further, the single feed patch antenna may be characterized by a 2:1 VSWR bandwidth that is equal to or greater than 40% c of the given operational bandwidth and equal to or less than 55% of the given operational bandwidth. Further, the single feed patch antenna may be characterized by a lower resonant mode, an upper resonant mode, a lower resonant mode center frequency, and an upper resonant mode center frequency, wherein a value of sigma is greater than or equal to 0.8 and less than or equal to 1.5, where sigma is the absolute value of the difference between the lower resonant mode center frequency and the upper resonant mode center frequency, divided by the given operational bandwidth, and wherein each of a 2:1 VSWR bandwidth of the lower resonant mode and a 2:1 VSWR bandwidth of the upper resonant mode divided by sigma is greater than or equal to 0.26 and less than or equal to 0.54.

Further, the single feed patch antenna may be characterized by one or more of the following: (1) the single feed patch antenna comprises a length and a width, the length being different in magnitude from the width, (2) the single feed patch antenna comprises a shape that is square or rectangular and that has one or more truncated corners, (3) the single feed patch antenna comprises a conductive region, the conductive region including a cutout thereof, and (4) the single feed line feeds the RFID signal to the single feed patch antenna at a corner of the single feed patch antenna.

Further, the single feed patch antenna may comprise a non-ground-plane-side metallization, and the non-ground-plane-side metallization may be characterized by a length, a width not equal to the length, an area equal to the product of the length and the width, and a perturbation area comprising an addition to or subtraction from the area, wherein the ratio of the perturbation area to the area (i.e., the ratio Ds/S) is equal to (2 sigma Bo)/(2+sigma Bo) for a Type B design, and is equal to (sigma Bo)/(2+sigma Bo) for a Type A design, where Bo is the fractional operational bandwidth of the single feed patch antenna, as noted above. In a Type B design, the perturbation area readily relates to a width W and a length L.

In other embodiments, the single feed patch antenna may comprise a non-ground-plane-side metallization, and the non-ground-plane-side metallization may be characterized by a length, a width equal to the length, an area equal to the product of the length and the width, and a perturbation area comprising an addition to or subtraction from the area. In a first set of these other embodiments, the perturbation area may comprise an addition to or subtraction from the area in a diagonal direction of the single feed patch antenna, the diagonal direction comprising a direction diagonal relative to the length and the width, and the single feed line may be disposed at a center of the length or at a center of the width, at one side of the single feed patch antenna, and be parallel to the length or width. More specifically, in some cases, the perturbation area may comprise a subtraction from the area, the subtraction comprising a portion cutout from an interior of the area, or the subtraction comprising truncation of one or more corners (also referred to as one or more chamfered corners) of the area, while in some cases the perturbation area may comprise an addition to the area, the addition comprising a tab extending from a corner of the area. Further, a ratio of the perturbation area to the area may equal (sigma Bo)/(2+sigma Bo), where Bo is a fractional operational bandwidth of the single feed patch antenna. Still further, the single feed patch antenna may be characterized by a fractional 2:1 VSWR bandwidth greater than 0.45 times the given operational bandwidth and less than 0.6 times the given operational bandwidth.

In a second set of these other embodiments (i.e., where the single feed patch antenna comprises a non-ground-plane-side metallization, and the non-ground-plane-side metallization is characterized by a length, a width equal to the length, an area equal to the product of the length and the width, and a perturbation area comprising an addition to or subtraction from the area), the perturbation area may comprise an addition to or subtraction from the area in a direction parallel to the length or the width of the single feed patch antenna, and the single feed line may be disposed at a corner the single feed patch antenna. More specifically, in some cases, the perturbation area may comprise a subtraction from the area, the subtraction comprising a portion cutout from an interior of the area, or the subtraction comprising a portion cutout along a side of the area, while in some cases the perturbation area may comprise an addition to the area, the addition comprising a tab extending from a side of the area, or the addition comprising an addition extending along an entire side of the area (recalling that the patch antenna is rectangular, it will be appreciated that where the addition is along an entire side, say, the width, W, of the patch, this addition is equivalent to saying that the magnitude of the adjacent side, in this case, the length, L, is increased). Further, a ratio of the perturbation area to the area may equal (2sigma Bo)/(2+sigma Bo), where Bo is a fractional operational bandwidth of the single feed patch antenna. Still further, the single feed patch antenna may be characterized by a fractional 2:1 VSWR bandwidth greater than 0.45 times the given operational bandwidth and less than 0.6 times the given operational bandwidth.

We now turn to a discussion of determining the orientation of an RFID tag (and hence of the item attached to the tag) based on the polarization of the RFID response signal received from the tag. This feature can be implemented in FM RFID embodiments described herein. How this feature is performed is explained in the following example with reference to FIG. 12. An RFID reader 1205 has a reader antenna 1215 that transmits an electromagnetic wave in either of two frequency bands and having linear polarization. The frequency bands (which may also be referred to as channels) are a first band, ranging from frequency $f_1$ through $f_2$, and a second band, ranging from frequency $f_3$ through $f_4$. Electromagnetic waves in the first band exhibit vertical polarization, A, and electromagnetic waves in the second band exhibit horizontal polarization, B. The antenna of an RFID tag 1270 receives and responds to the electromagnetic wave transmitted by the reader antenna 1215. The responsive electromagnetic wave sent by the RFID tag antenna 1270 has a polarization, C. The reader antenna 1215 receives the responsive electromagnetic wave sent by the RFID tag antenna 1270. If the received response is greater in power level or signal strength in the first band ($f_1$ through $f_2$) than in the second band ($f_3$ through $f_4$) (in other words, if the response signal received from the tag is predominantly within the first channel frequency), this result indicates that the polarization C of the response is more closely aligned with the polarization A of the first band than with the polarization B of the second band, which may be expressed as $|\vec{A}\cdot\vec{C}|>|\vec{B}\cdot\vec{C}|$. If the received response is greater in power level or signal strength in the second band ($f_3$ through $f_4$) than in the first band ($f_1$ through $f_2$) (in other words, if the response signal received from the tag is predominantly within the second channel frequency), this result indicates that the polarization C of the response is more closely aligned with the polarization B of the second band than with the polarization A of the first band, which may be expressed as $|\vec{B}\cdot\vec{C}|>|\vec{A}\cdot\vec{C}|$. The polarization C of the response corresponds with the orientation of tag antenna 1270 that sent the response, and consequently with the orientation of the item (not shown) to which the tag (not shown) is attached. If the polarization C of the response is more closely aligned with the polarization A of the first band, then the tag orientation is determined to be predominantly vertical. If the polarization C of the response is more closely aligned with the polarization B of the second band, then the tag orientation is determined to be predominantly horizontal. In general, of course, the orientation of the tag might lie somewhere in between, and weighting or mapping routines can be used to estimate the orientation of the tag. The determination of the polarization of the response signal and the consequent orientation of the tag antenna/tag may be made in conjunction with a processor (not shown) connected to or embedded within the reader 1205.

We now turn to a discussion of FM RFID employing a frequency selective surface (FSS) in the propagation environment of the RFID signals, as an additional element in an FM RFID system or method. The FSS may be used to alter or increase scattering of the RFID signals (electromagnetic waves) sent by reader and/or tag, so as to increase field strength, or to eliminate regions of weak fields or nulls due to interference or the like, or to increase the maximum received signal strength at the reader, as the RFID channel frequency varies. The FSS may also be used to alter the polarization of the RFID signals as a function of the RFID channel frequency. This feature can be implemented in FM RFID embodiments described herein. This feature is described now with reference to FIGS. 13-17.

As throughout this disclosure, the FM RFID system represented in FIG. 13 may employ an FHSS system. FIG. 13 shows an arrangement in which a reader antenna 1315 (reader not shown in FIG. 13 but shown generally as reader 1205 in FIG. 12) is transmitting through an aperture 1314 in a wall 1380 in a portal application. The region between the two walls 1380, 1381 is a portal region (or portal) 1385 through which tagged items (not shown) pass. Although such portals are sometimes established between reader antennas in open space on one or two sides of a portal region, it is also common to erect conductive portal walls with the intent of better confining the electromagnetic radiation to promote regions of higher field intensity to increase RFID signal penetration into collections of tagged items. Although this practice can induce standing waves, and hence regions of higher field intensity, it can also concurrently produce null regions.

Walls 1380, 1381 may be referred to as boundary walls. Although two walls 1380, 1381 are illustrated, it is possible to employ only a single wall (either the wall with the reader antenna or a wall without the reader antenna) or more than two walls. In this arrangement, FSSs 1382, 1383 are applied on walls 1380, 1381, respectively, although it is possible to apply an FSS on only a single wall (either the wall with the reader antenna or a wall without the reader antenna). While FSSs 1382, 1383 are in this embodiment applied on the entirety of the respective walls 1380, 1381, it is possible in other embodiments to apply the FSSs 1382, 1383 on only portions of the respective walls 1380, 1381. The FSSs 1382, 1383 are frequency selective such that they present different electromagnetic boundary conditions, respectively, at different frequencies within the operating band. For example, the FSSs 1382, 1383 may be configured such that at some channels within the FHSS band, the walls 1380, 1381 appear as a perfect electrical conductor (PEC), while at other of those channels the walls 1380, 1381 appear as an open circuit boundary, or perfect magnetic conductor (PMC). Due to the different boundary conditions at respective different frequencies within the operating band, the peaks and nulls vary throughout the portal region 1385 so that fewer tagged items are missed. This situation is illustrated schematically in FIG. 14. FIG. 14 shows respective cross-sections (showing modal peaks and nulls) of electric field amplitude 1465, 1466 between FSS walls 1480, 1481 of a portal region 1485, at frequencies at which FSS walls 1480, 1481 present PEC boundary conditions (solid line) and at frequencies at which FSS walls 1480, 1481 present PMC boundary conditions (dashed line).

An FSS as described in this embodiment may scatter an electromagnetic wave according to a first pattern (or alter the polarization of an electromagnetic wave in a first manner) when the electromagnetic wave has a frequency falling within a first bandwidth and scatter an electromagnetic wave according to a second pattern (or alter the polarization of an electromagnetic wave in a second manner) when the electromagnetic wave has a frequency falling within a second bandwidth, the first and second patterns (and the first and second manners) being different, and the first and second bandwidths encompassing respectively different, non-overlapping ranges of frequencies. In this regard, the bandwidths may but need not be continuous, for example, the first bandwidth may comprise two bandwidth segments on either side of the second bandwidth. In addition the pattern of scattering or manner of alteration of polarization may change gradually (not abruptly) from the first pattern or manner to the second pattern or manner as the channel frequency changes from a frequency within the first bandwidth to a frequency within the second bandwidth. The aforementioned configuration in which the first bandwidth comprises two bandwidth segments on either side of the second bandwidth is effectively a configuration having three bandwidth segments (three bands). It will be appreciated that any number of bands may be employed in the FSS embodiments described here; the number of bands is not limited to two or three. The aforementioned alteration of polarization of an electromagnetic wave in a given manner may be deemed a type or subset of the aforementioned scattering of an electromagnetic wave according to a given pattern. Accordingly, in this discussion of FSS embodiments, the term "pattern" will be understood to encompass both (i) a pattern defined by the angular distribution of the intensity of an electromagnetic wave and (ii) a pattern defined by the polarization of an electromagnetic wave as a function of angle ((ii) may also be referred to as a pattern of altered polarization of an electromagnetic wave).

Figure 15:
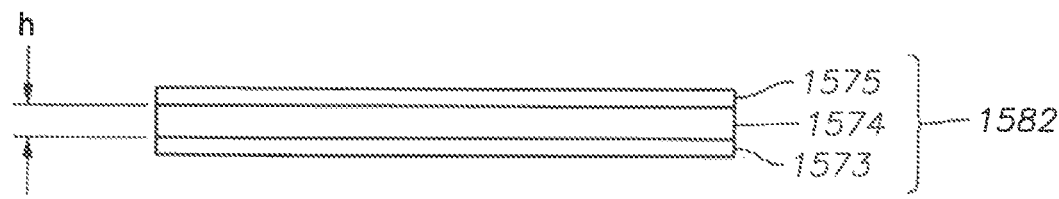
FIG. 15 is a schematic diagram, in accordance with one or more embodiments described herein, illustrating a layered structure of a frequency selective surface.

FIG. 15 shows one of many possible layer architectures for an FSS 1582. In this illustrated example, FSS 1582 includes a solid conductive layer (ground plane) 1573 at the bottom, an insulating layer 1574 in the middle, and a printed conductive layer (or pattern) 1575 on top. In the context of the portal application (e.g., an arrangement such as that shown in FIGS. 13 and 14), the terms "bottom," "middle," and "top" are used to mean that where FSS 1582 is applied to a wall (e.g., 1380, 1381, 1480, 1481) of the portal (1385, 1485), the bottom layer 1573 contacts the wall, the middle layer 1574 lies between the bottom layer 1573 and the top layer 1575, and the top layer 1575 faces the (ambient environment of the) portal region. Thus, in this context, the terms "bottom," "middle," and "top" may also be understood as interior/innermost (i.e., facing the wall), middle and exterior/outermost (i.e., facing the ambient environment of the portal region). The printed conductive pattern 1575, in combination with the solid conductive layer 1573, which is separated from the printed conductive pattern 1575 by a distance h, resonates at a frequency $f_0$. At that resonant frequency, the FSS 1582 resembles a PMC such that a reflected tangential electric field is predominantly in phase with an incident tangential electric field. This result is in contrast to a PEC boundary condition at which the reflected electric field is 180 degrees out of phase with the incident tangential electric field such that the total tangential part of the electric field vanishes at the boundary. It is recognized that no physical conductor is perfect but that practically many conductors can be treated as such. It is also recognized that PMCs exist only as abstractions of physical phenomena in which electromagnetic fields behave as they would in the vicinity of a hypothetical PMC. In another embodiment, the Ohmic losses of the FSS at or near resonance are sufficiently high that the FSS impedance more closely resembles an impedance load that is matched to free space than a PMC. Thus, at frequencies near the resonance of the FSS, the wall may significantly absorb the impinging waves so as to preclude interference effects, whereas at frequencies removed from resonance, but still within the RFID operating bandwidth, the FSS appears as a PEC.

An FSS may be instantiated by use of a metamaterial. A metamaterial is a material that is not found in nature, but is artificially synthesized in such a manner as to have properties not ordinarily found in natural materials. Further discussion of metamaterials, FSSs, and their applications may be found in U.S. Pat. Nos. 9,208,362, 9,465,965 and 9,652,646, entitled "Methods, Systems and Apparatuses for Radio Frequency Identification," a family of related applications which have some inventors in common with the instant application, and all of which applications are hereby incorporated herein by reference in their entirety.

Figure 16:
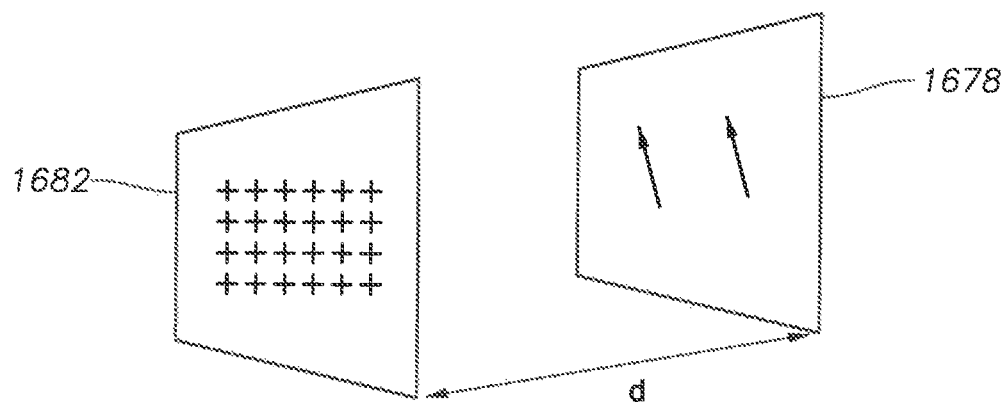
FIG. 16 is a schematic diagram, in accordance with one or more embodiments described herein, of an arrangement employing a frequency selective surface and a current sheet in the context of frequency multiplexing RFID.

Although the concept of frequency multiplexed scattering was described above in a portal application (FIGS. 13 and 14), there are many other contexts in which an FSS or metamaterial scattering object may be used to preferentially scatter the FHSS RFID signal transmitted by, or received by, the RFID reader antenna. Similarly, the FSS or metamaterial object may be used to alter the polarization of the FHSS RFID signal transmitted by, or received by, the reader antenna. FIG. 16 shows an arrangement for use with FM RFID, including an FSS 1682 in proximity to a distributed current sheet 1678. The current sheet 1678 may be any of various antenna elements with bidirectional radiation, and the arrows in FIG. 16 represent electric current vectors established on the antenna. At some frequency bands within the FHSS spectrum, the FSS 1682 acts as a PEC. When the separation distance "d" between FSS 1682 and current sheet 1678 is less than a quarter-wavelength, the mirror image (i.e., reflected radiation) tends to cancel radiation in the direction normal to the current sheet 1678 and accentuate radiation at oblique angles. At other frequency bands within the FHSS spectrum, the FSS 1682 acts as a PMC that (given the same condition regarding separating distance d) accentuates the radiation intensity in the direction normal to the current sheet 1678 and diminish obliquely directed radiation. The FSS 1682 may be constructed with layers such as those shown in FIG. 15.

As discussed above, an FSS may generally be employed with the embodiments disclosed herein. Accordingly, a basic FM RFID system employing an FSS may be described as follows. Such a system may include an RFID interrogator configured for generating an RFID signal, where the channel frequency of the RFID signal changes over time within an operating bandwidth; at least one antenna; and a frequency selective surface. The operating bandwidth comprises a plurality of portions thereof (which may be referred to as "bands"), e.g., a first band, a second band, and a third band. The system may be arranged such that, for any two of these bands, the two bands do not overlap (or do not completely overlap) with each other (thus, the two bands encompass respective ranges of frequencies that are mutually exclusive (or partly mutually exclusive, i.e., portions of their respective ranges are mutually exclusive)). According to the system, the RFID signal is to be fed to the at least one antenna, and the at least one antenna is configured to transmit an electromagnetic wave in response to the RFID signal fed thereto. Further according to the system, the frequency selective surface may comprise a surface whose electromagnetic characteristics vary depending on a frequency of an electromagnetic wave impinging thereon. The electromagnetic wave impinging thereon may be the electromagnetic wave transmitted by the at least one antenna and/or an electromagnetic wave transmitted by an RFID tag for reception by the at least one antenna, whether in response to the electromagnetic wave transmitted by the at least one antenna or not.

As mentioned above, the frequency selective surface may comprise a surface whose electromagnetic characteristics vary depending on a frequency of an electromagnetic wave impinging thereon. Specifically, the frequency selective surface may be configured to present as a boundary condition a surface impedance that changes according to the frequency of an electromagnetic wave impinging thereon (e.g., according to the channel frequency of an RFID signal). The resulting pattern (i.e., of scattering or altered polarization of the electromagnetic wave) produced by the frequency selective surface changes as a function of the frequency of the wave, and these changes in pattern, over a plurality of frequencies (e.g., channel frequencies of the RFID signal), improve the odds that the reader will be able to communicate with all tags in the environment.

Continuing the description presented in the preceding two paragraphs, according to some embodiments, when the channel frequency of the RFID signal falls within the first portion of the operating bandwidth ("band"), a first surface impedance is established on the FSS that alters the electromagnetic wave (impinging on the FSS) according to a first pattern; when the channel frequency of the RFID signal falls within the second portion of the operating bandwidth ("band"), a second surface impedance is established on the FSS that alters the electromagnetic wave (impinging on the FSS) according to a second pattern; and when the channel frequency of the RFID signal falls within a third portion of the operating bandwidth ("band"), a third surface impedance is established on the FSS that alters the electromagnetic wave (impinging on the FSS) according to a third pattern. In some arrangements, the first and third boundary conditions (surface impedances), and hence the resulting electromagnetic wave patterns produced thereby, are at least substantially the same; in other arrangements, they are not. In general (although it is not required), the system is arranged such that at least one of the first, second, and third surface impedances differs from the other two. Again, as noted, the resulting or altered electromagnetic wave patterns discussed here may refer to scattering of the electromagnetic wave or altering of the polarization of the electromagnetic wave. Again, the electromagnetic wave (impinging on the FSS) discussed in this embodiment may be the electromagnetic wave transmitted by the at least one antenna (of the FM RFID system employing the FSS) and/or an electromagnetic wave transmitted by an RFID tag for reception by the at least one antenna, whether in response to the electromagnetic wave transmitted by the at least one antenna or not. Also, as noted, the first, second and third portions of the operating bandwidth ("bands") may not be completely separated, i.e., there may be some overlap between them. Consequently, there may be some variation of the resulting electromagnetic wave patterns even within one of these three portions of the operating bandwidth. In other arrangements, there may be only two bands, such that, when the channel frequency of the RFID signal falls within the band, a first surface impedance is established on the FSS that alters the electromagnetic wave (impinging on the FSS) according to a first pattern, and when the channel frequency of the RFID signal falls within the second band, a second surface impedance is established on the FSS that alters the electromagnetic wave (impinging on the FSS) according to a second pattern. In other arrangements, there may be more than three bands.

Continuing the description presented in the preceding three paragraphs, as non-limiting examples, three common surface impedance boundary conditions are: perfect electrical conductor (short circuit), perfect magnetic conductor (open circuit), and resistive (matched termination). In a non-limiting exemplary arrangement, the second band comprises a range of frequencies that is generally between the range of frequencies of the first band and the range of frequencies of the third band, though some overlap of adjacent bands may exist. (Thus, the second band may be referred to as the "center" band.) In this arrangement, over the first and third bands, the FSS may present as a boundary condition a surface impedance at least substantially equivalent to a short circuit, and over the second band the FSS may present as a boundary condition a surface impedance at least substantially equivalent to an open circuit. Alternatively, the FSS may present at least substantially a short circuit over the first and third bands and a matched resistive termination over the second band. In both of these cases, the FSS resonates in the second (center) band. In an alternate arrangement the FSS resonates near one edge of the operating bandwidth, and there are only two (rather than three) distinct bands. Another application of FSS, or an analogue thereof, in the context of FM RFID, similar to the portal application (FIGS. 13 and 14), is a smart shelf application. In such a smart shelf application, one or more shelves are employed, and one or more surfaces of the shelf(ves) include one or more embedded waveguides each with one or more frequency dependent loads (described below). A frequency dependent load is the zero-dimensional, or point, analogue of an FSS. Similarly as described with respect to the portal, the frequency dependent loads present different boundary conditions as a function of frequency within the FHSS band of operation. Yet another application of FSS or frequency dependent loads, in the context of FM RFID, is a cavity or waveguide application. In this application, one or more cavity or waveguide walls have an FSS, metamaterial surface, or frequency dependent load(s) such that the surface impedance varies as a function of frequency within the FHSS operating spectrum, or a waveguide is terminated by a frequency dependent load. In this arrangement, a feed or antenna radiates into, or launches onto, the cavity or waveguide in order to read RFID-tagged items contained within.

Figure 17:
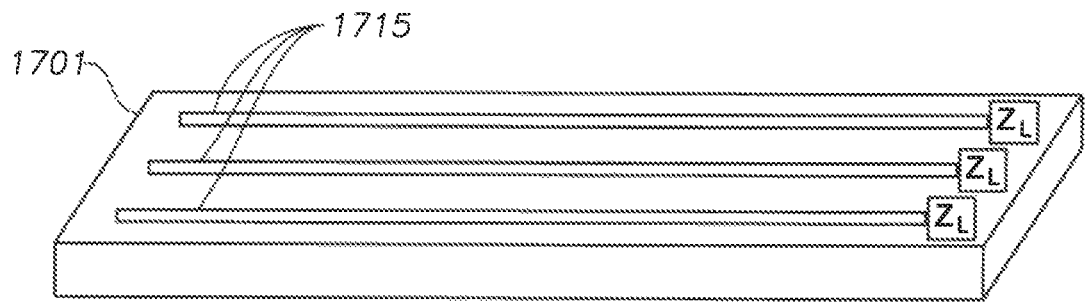
FIG. 17 is a schematic diagram, in accordance with one or more embodiments described herein, of an arrangement employing a frequency dependent load in the context of frequency multiplexing RFID.

FIG. 17 shows a smart shelf including waveguides and frequency dependent loads, which are examples of reduced dimensionality analogs to the preceding FSS or metamaterial arrangements. It has been shown that alternating open and short terminations to smart shelf transmission lines or surface waveguides can increase the communication capability by reducing the effect of nulls in standing waves (see. e.g., "A Planar Waveguide Sheet with Switched Open/Short Termination for Smart-Shelf System", K. Chen et al., Japan, IEEE 2012). In this reference, the authors describe switching the load between an open circuit and a short circuit. The resultant effect is to eliminate null regions similarly as described herein using an FSS or metamaterial. However, FIG. 17 illustrates an arrangement that may accomplish similar effects without the complexity associated with additional switches and control circuitry. More specifically, such similar effects are achieved using frequency dependent loads, $Z_L$, as shown in the smart shelf 1701 example of FIG. 17. The load $Z_L$ may be a lumped element resonator such that it appears as an open circuit over one or more first portions of the FHSS operating spectrum, and as a short circuit over one or more second portions of the FHSS operating spectrum. In the arrangement of FIG. 17, lines 1715 may be electromagnetic transmissive elements, such as open (at least partly open) transmission lines, microstrip lines, coplanar waveguides, or the like. The ends of lines 1715 opposite the load $Z_L$ ends may interface with an interrogator (not shown in FIG. 17 but shown generally as reader 1205 in FIG. 12) and may be referred to as reader (interrogator) interface ports. Alternatively, these ends may interface with one or more antennas (not shown in FIG. 17 but shown generally as antenna 1215 in FIG. 12) that receive signals from, or transmit signals to, an interrogator (not shown). Each line 1715 carries an RFID signal between the respective reader interface port (or antenna) and the respective load $Z_L$. As stated, each of the load ends $Z_L$ varies in its behavior or presents different electromagnetic characteristics to the signal transmitted down the respective line 1715 from the interrogator (or antenna) interface end, as a function of the frequency of that signal (e.g., the channel frequency of an RFID signal). The number of lines 1715, each terminating in a load $Z_L$, may vary from the number illustrated in FIG. 17. Smart shelf 1701 may be an open structure (i.e., not enclosed, open to the environment), or it may reside on a face of a fully or partially enclosed structure. Thus, at least one of lines 1715 may be mounted on an open surface. As a non-limiting alternative, at least one of lines 1715 may be mounted on a surface of a wall of a cavity or waveguide, the cavity or waveguide coupling the RFID interrogator and the at least one line 1715.

The following discussion provides non-limiting examples of more detailed elaborations of smart shelf 1701.

In these examples, the smart shelf 1701 may have four lines 1715 rather than three as shown in FIG. 17. Lines 1715 may be at least partly open transmission lines, each having characteristic impedance Zo. Each load $Z_L$ may be implemented as lumped element, distributed elements, or a combination of lumped and distributed elements. In a first example, each load $Z_L$ may be implemented in the form of a 2nd-order parallel circuit with symbolic lumped elements, e.g., a resistor, a capacitor and an inductor in parallel, sharing a common node or junction point with respective line 1715, and with an electrically short distance between each pair of adjacent ones of these three elements (R, C, L). In general, however, each load $Z_L$ may comprise a parallel circuit, a series circuit, or a combination of series and parallel circuits. Continuing with the first example (where load $Z_L$ is implemented in the form of a 2nd-order parallel circuit with symbolic lumped elements as described above), each load $Z_L$ may be nominally identical, e.g., each resistor may have resistance $R_1$, each capacitor may have capacitance $C_1$ and each inductor may have inductance $L_1$. Continuing with the first example, the length of each transmission line 1715 may be $m\lambda/4$, where m is an odd or even integer. More generally, depending on the frequency of the impinging signal, the design of load $Z_L$, and the length of transmission line 1715, the load $Z_L$ impedance may appear as an open circuit, a short circuit, a matched circuit, or a general impedance at the reader or antenna interface.

In some instances, the load $Z_L$ may appear at some frequencies as an open or short circuit; in such cases, the at least partly open transmission line 1715 is likely to radiate more than when the load $Z_L$ impedance is matched to that of the transmission line 1715. When the transmission line 1715 radiates, it is likely to pick up tags that are further removed from the transmission line 1715. At other frequencies, the load $Z_L$ appears matched, and the transmission line 1715 radiates much less, or essentially not at all. In this case, only tags that are close to the transmission line 1715 are read. In this fashion, based on the frequencies at which tags are read, and the phase and signal strength of the return signal from the tag, a processor connected to or internal to the reader may infer the tag's location relative to the transmission line 1715. In an embodiment, the resistance $R_1$ equals the line characteristic impedance Zo.

Other design factors may be used to control the amount of radiation from the at least partly open transmission lines 1715. For example, thinner substrates typically result in less radiation. According to a second example, the multiple reader interface ports may be connected to a distributed diplexer (not shown in FIG. 17 but shown generally as diplexer 610 in FIG. 6) and, assuming the transmission line 1715 lengths are suitably controlled, all of the transmission lines 1715 may be collectively interfaced to a single reader port (as in FIG. 6 all transmission lines 615 are collectively interfaced to a single reader port 606). In this second example, the diplexer controls the line distances between adjacent lines 1715 and between the reader port and the closest lines 1715 (these line distances are analogous to the interface spacings $m_1L$, $m_2L$, $m_3L$ between adjacent lines 615 and the interface spacings $n_1L$, $n_2L$ between the reader port 606 and the closest lines 615 in FIG. 6). Continuing with the second example, each load $Z_L$ may be the same 2nd-order parallel circuit with symbolic lumped elements as for the previous example, except that in this example the values of the elements may all be different, e.g., the respective resistors may have resistances $R_1$, $R_2$, $R_3$ and $R_4$, the respective capacitors may have capacitances $C_1$, $C_2$, $C_3$ and $C_4$, and the respective inductors may have inductances $L_1$, $L_2$, $L_3$ and $L_4$. Continuing with the second example, each frequency dependent load $Z_L$ has a different resonant frequency, and the length of each transmission line 1715 (i.e., from load $Z_L$ to the diplexer line leading to the adjacent transmission line 1715) is controlled to be an odd integer multiple of a quarter wavelength ($m\lambda/4$, where m is an odd integer) such that the structure directs most of the power to the particular load $Z_L$ that is resonant at the current channel frequency. At the resonant frequency, the load $Z_L$ impedance is equal to the resistance shown in the respective parallel circuit. Far below or above the resonant frequency, the load $Z_L$ appears as a short circuit.

A third example is the same as the second example, except that the resistor, capacitor and inductor comprising the load $Z_L$ at the end of each transmission line 1715 are connected in series rather than parallel. Again, any of these elements could be realized by distributed components rather than lumped elements. As with the case of parallel loads, the load $Z_L$ impedance at resonance is equal to the respective resistance shown. However, far below or above resonance, the load $Z_L$ impedance tends toward an open circuit. In this case, the transmission line 1715 is constrained to be an even integer multiple of a quarter wavelength ($n\lambda/4$, where n is an even integer). In addition to the first, second and third examples, smart shelf 1701 may include one or more transmission lines 1715 having series loads and one or more transmission lines 1715 having parallel loads, rather than all transmission lines 1715 having loads of the same kind (parallel or series).

As described herein, a smart shelf or smart surface, such as described above with reference to FIG. 17, may be characterized as the following system. The system may include an RFID interrogator configured for generating an RFID signal, wherein a channel frequency of the RFID signal changes over time within an operating bandwidth. The system may further include one or more electromagnetic transmissive elements each extending between a first end thereof and a second end thereof, each of the electromagnetic transmissive elements electrically coupled with the RFID interrogator at the first end thereof, each of the electromagnetic transmissive elements comprising a frequency dependent load at the second end thereof and configured for transmitting the RFID signal from the RFID interrogator to the frequency dependent load, wherein the frequency dependent load presents different electromagnetic impedance characteristics to the RFID signal transmitted to the frequency dependent load depending on the channel frequency of the RFID signal. In some embodiments, the electrical coupling of the electromagnetic transmissive elements with the RFID interrogator is established via an antenna (or a plurality of antennas). That is, the interrogator radiates to a shelf antenna, which is connected to one or more of the electromagnetic transmissive elements, at the first end(s) thereof. The shelf antenna receives the signal from the interrogator and transmits it to the electromagnetic transmissive element(s).

While the discussion heretofore has described to one of ordinary skill in the art various methods of FM RFID using systems disclosed herein, nonetheless a limited and non-exhaustive group of exemplary methods or portions of such methods will now be described even more explicitly below.

Figure 18:
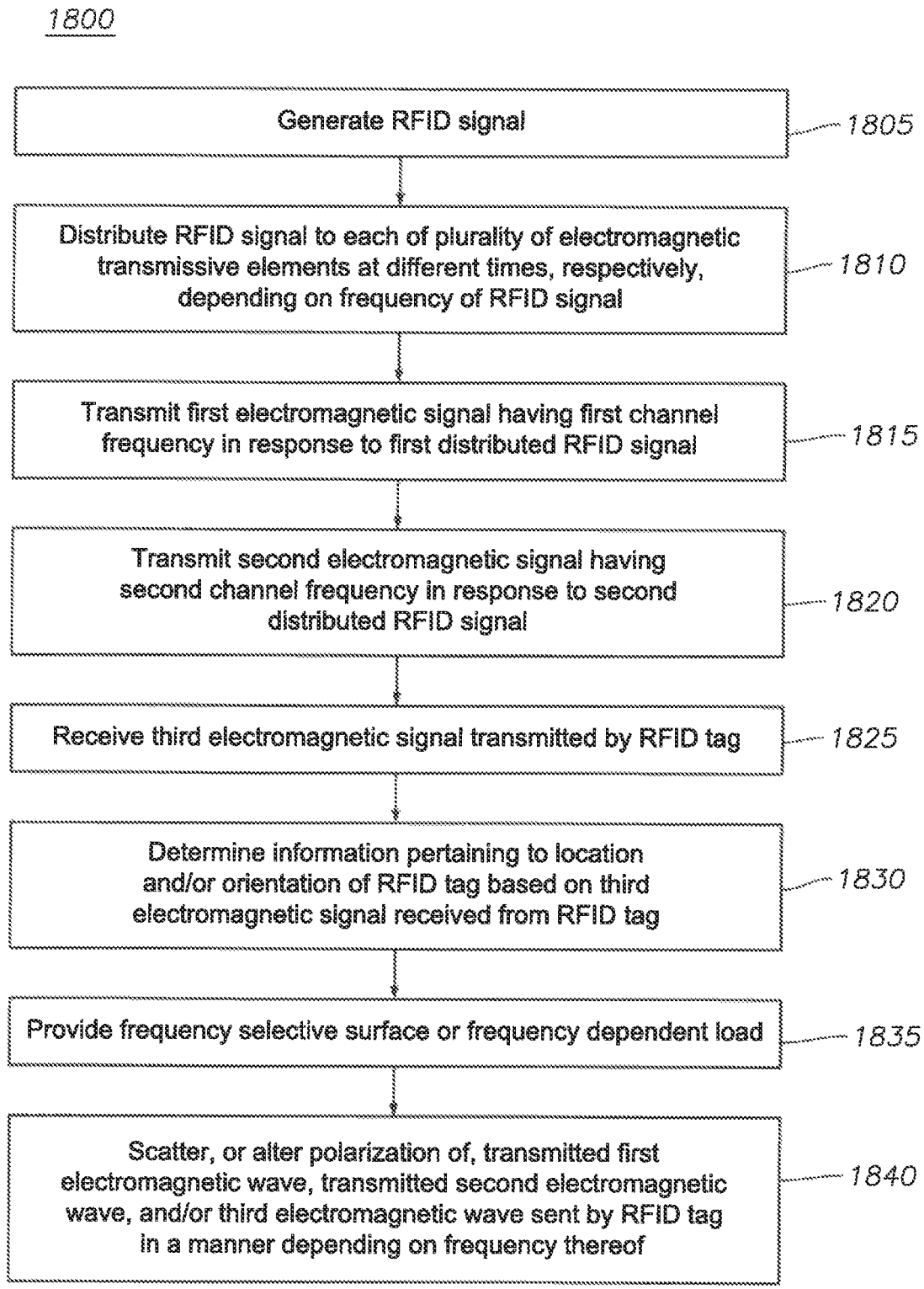
FIG. 18 is a flow chart, in accordance with one or more embodiments described herein, of a frequency multiplexing RFID method.

FIG. 18 is a flow chart illustrating a method of FM RFID 1800. Method 1800 illustrates the aforementioned first manner of operation of frequency multiplexing, in which signals are selectively distributed to different antennas/feed lines/transmission lines/etc., depending on the channel frequency of the signals. Method 1800 may be employed with a system including a plurality of antennas, a plurality of antenna feed lines (even if only a single antenna is included), or a plurality of (e.g., at least partially open) transmission lines. Method 1800 will be described in two different ways: first, as a linear series of steps and, second, as an iterative loop. At step 1805, an RFID signal is generated at one of a plurality of channel frequencies within an operating bandwidth. An RFID interrogator may perform this step. As explained below in the iterative loop description of method 1800, step 1805 is performed multiple times. Each time, the RFID signal may be generated at a different one of the plurality of channel frequencies; the interrogator may cause the channel frequency of the RFID signal to change over time, e.g., according to an FHSS protocol. At step 1810, the generated RFID signals are distributed (or fed or transmitted) to a plurality of electromagnetic transmissive elements, respectively, at different times, depending on the channel frequency of the RFID signal. In addition, the magnitude, or weighting, and the phase of the RFID signal generated and distributed to a respective electromagnetic transmissive element varies over time, depending on the channel frequency of the RFID signal. The plurality of electromagnetic transmissive elements may be a plurality of antennas, a plurality of antenna feed lines, or a plurality of (e.g., open) transmission lines. The antennas may but need not be narrow band antennas including a first narrow band antenna and a second narrow band antenna, the first narrow band antenna configured to filter out frequencies falling outside of a first range of frequencies and the second narrow band antenna configured to filter out frequencies falling outside of a second range of frequencies, the first range of frequencies being at least partially different from the second range of frequencies. Step 1810 may be performed by a diplexer, which may include a filter of any of various types, or by other means (e.g., narrowband antennas, adjustment of lengths of transmission lines/adjustment of impedance of electromagnetic transmissive element relative to impedance of transmission line from which the generated RFID signal is distributed to the electromagnetic transmissive element), as described herein. At step 1815, a first electromagnetic signal having a first channel frequency is transmitted in response to a first distributed RFID signal. This step may be performed by one of the plurality of electromagnetic transmissive elements, to which the first RFID signal was distributed. At step 1820, a second electromagnetic signal having a second channel frequency is transmitted in response to a second distributed RFID signal. This step may be performed by one of the plurality of electromagnetic transmissive elements, to which the second RFID signal was distributed. The first channel frequency may differ from the second channel frequency. In this case, the first and second electromagnetic signals may be transmitted by different ones of the plurality of electromagnetic transmissive elements, the first and second RFID signal having been distributed to the different ones, respectively. The first and second channel frequencies may be overlapping or not overlapping. The first and second channel frequencies may be close/adjacent or not close/adjacent. The first electromagnetic signal may have a first polarization, and the second electromagnetic signal may have a second polarization, the first polarization and the second polarization being characterized by different orientations. (In this case, method 1800 illustrates a combination of the aforementioned two manners of operation of frequency multiplexing, namely, the first manner of operation, in which signals are selectively distributed to different antennas/feed lines/transmission lines/etc., depending on the channel frequency of the signals, and the second manner of operation, in which signals excite different polarizations, depending on the channel frequency of the signal.) The first polarization and the second polarization may be orthogonal to each other, e.g., one may be horizontal and the other may be vertical. Where the plurality of electromagnetic transmissive elements is a plurality of at least partially open transmission lines, upon transmission of the aforementioned first and second electromagnetic signals, electromagnetic energy may be transmitted to an RFID tag by near-field coupling or radiation from the first and second electromagnetic signals.

At step 1825, a third electromagnetic signal transmitted by an RFID tag may be received. The third electromagnetic signal may have been transmitted by the RFID tag in response to the transmitted first or second electromagnetic signal. As explained below in the iterative loop description of method 1800, step 1825 may be repeated. At step 1830, information pertaining to a location and/or orientation of the RFID tag may be determined based on the third electromagnetic signal received from the RFID tag. This step may be performed by the RFID interrogator and/or a processor/processor logic associated therewith. As per the discussion above regarding the definition of the term "localization," it should be understood that this step may involve determination of location, position, distance (e.g., between tag and interrogator), presence, existence, movement (e.g., speed, direction), etc., as well as tracking of an RFID tag. With regard to orientation/bearing, step 1830 may involve determining an orientation of an RFID tag based on the channel frequency of the third electromagnetic signal sent by the RFID tag in response to the first or second electromagnetic signal, as described above with reference to FIG. 12. Specifically, if the third electromagnetic signal is predominantly within the first channel frequency, the tag is determined to have an orientation corresponding to the first polarization, and if the third electromagnetic signal is predominantly within the second channel frequency, the tag is determined to have an orientation corresponding to the second polarization (this conclusion assumes the first electromagnetic signal has the first polarization and the second electromagnetic signal has the second polarization as described above). While the discussion here has referred to determination of location, etc. of an RFID tag, it should be understood that such determination applies also, by extension, to the item to which the tag is attached. As explained below in the iterative loop description of method 1800, step 1830 may be repeated. In repeated instances of step 1830, determination of location, etc. may be refined rather than newly established. At optional step 1835, which may be performed prior to step 1815, a frequency selective surface (FSS) is provided. The FSS may be disposed within a (spatial) range of the transmitted first electromagnetic signal (wave) and/or a (spatial) range of the transmitted second electromagnetic signal (wave) (described in steps 1815 and 1820 above). Assuming step 1835 has been so performed, thereafter at optional step 1840, the transmitted first electromagnetic signal (wave), the transmitted second electromagnetic signal (wave), and/or a third electromagnetic signal (wave) sent by an RFID tag (e.g., in response to the transmitted first or second electromagnetic signal (wave)) is scattered and/or the polarization of any of these signals (waves) is altered. The scattering is according to a particular pattern, the particular pattern depending on the channel frequency of the respective signal (wave). The altering of the polarization is according to a particular manner, the particular manner depending on the channel frequency of the respective signal (wave). Step 1840 may be performed by the FSS. In step 1835, where at least partially open transmission lines are used rather than antennas, one or more frequency dependent loads may be provided instead of the frequency selective surface. In this case, each of the at least partially open transmission lines may extend between a respective first end thereof, to which the RFID signal is fed from an RFID interrogator (optionally via an antenna, as described above), and a respective second end thereof, opposite the first end. The frequency dependent load is provided at the second end of each of one or more of the at least partially open transmission lines. The frequency dependent load presents different electromagnetic characteristics (e.g., surface impedance boundary conditions, as described above) to a signal encountering the frequency dependent load, depending on a channel frequency of the signal. Use of a frequency selective surface or frequency dependent load may assist in the determination operation step (1830) as described in this disclosure.

Method 1800 will be now elaborated on, in order to describe it as an iterative loop, which may be a more intuitive presentation. As mentioned above, step 1805 may be repeated, and with each iteration of step 1805, the RFID signal may be generated at a different one of the plurality of channel frequencies. Thus, the channel frequency of the RFID signal may be said to change over time, e.g., according to an FHSS protocol. As for step 1810, its description given above in the linear-series-of-steps description of method 1800 already contains within it the repetition or iteration that occurs. That is, in a first iteration of step 1810, an RFID signal generated at a first channel frequency is distributed at a first time to a first one of the plurality of electromagnetic transmissive elements, depending on the channel frequency of the RFID signal. Following the first iteration of step 1810, step 1815 is performed, in which a first electromagnetic signal having the first channel frequency is transmitted in response to the first distributed RFID signal (the RFID signal distributed in the first iteration of step 1810). Following step 1815, a first iteration of step 1825 is performed.

(Note that step 1820 is not performed at this time, because it is a second iteration of the operation of step 1815; third and subsequent iterations of this operation may be performed, but they were not described in the linear-series-of-steps description given above.) Following the first iteration of step 1825, a first iteration of step 1830 is performed. At this point, the iterative looping occurs, and following the first iteration of step 1830, the method returns to step 1805, and repeats. In the second iteration of the method, at step 1805, the RFID signal may be generated at a second channel frequency, which is at least partly different from the first channel frequency of the RFID signal generated at step 1805 in the first iteration of the method. (Due to the pseudo random nature of FHSS, it is possible that the RFID signal generated at step 1805 in a given iteration of the method may fall within the same channel frequency as the RFID signal generated at step 1805 in a temporally adjacent iteration of the method.) Continuing with the second iteration of the method, at step 1810, the RFID signal generated at the second channel frequency is distributed at a second time to a second one of the plurality of electromagnetic transmissive elements, based on the channel frequency of the RFID signal (the second electromagnetic transmissive element is different than the first electromagnetic transmissive element, because the second channel frequency is different than the first channel frequency). Following the second iteration of step 1810, step 1820 is performed: a second electromagnetic signal having the second channel frequency is transmitted in response to the second distributed RFID signal (the RFID signal distributed in the second iteration of step 1810). After step 1820, a second iteration of step 1825, and subsequently a second iteration of step 1830, are performed. As noted, in the second or subsequent iterations of step 1830 a previously determined location, etc. may be refined, based on the electromagnetic wave transmitted by the RFID tag and received in preceding step 1825, rather than a new determination made. In particular, where the respective electromagnetic waves transmitted by the RFID tag and received in different iterations of step 1825 fall within different channel frequencies, the received waves may be particularly useful in refining the determination of location, etc. Following step 1830, the iterative loop recurs. In the next iteration, of course, step 1820 would be replaced by a corresponding step (namely, transmitting a third electromagnetic signal having a third channel frequency in response to a third distributed RFID signal) that was not described in the linear-series-of-steps description of the method given above, as that description covers only the basic (and broadest) iterative case, that is, the case having only two iterations. Finally, it should be noted that the iterative loop method may of course include optional steps 1835 and 1840. In that regard, step 1835 need only be performed one time, e.g., during the first iteration of the method, and step 1840 may be repeated over successive iterations.

Figure 19:
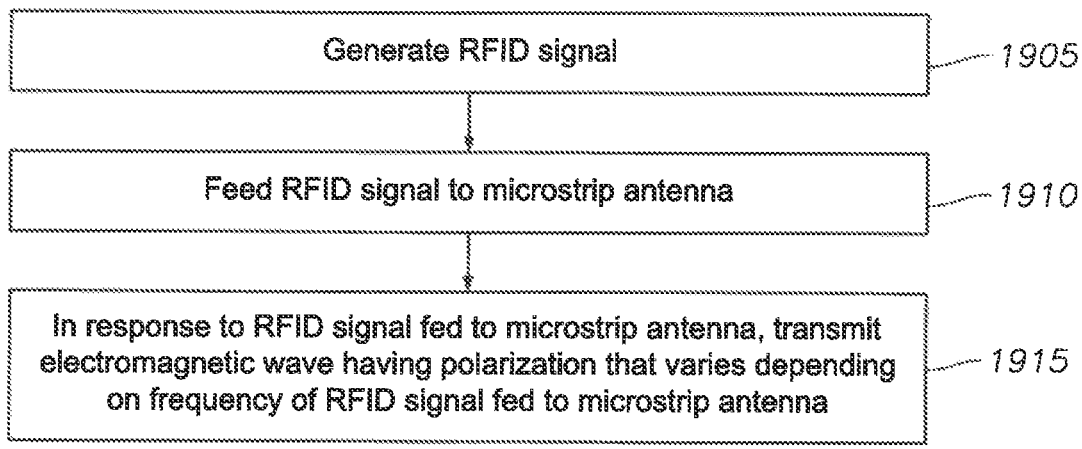
FIG. 19 is a flow chart, in accordance with one or more embodiments described herein, of a frequency multiplexing RFID method.

FIG. 19 is a flow chart illustrating another method of FM RFID 1900. Method 1900 illustrates the aforementioned second manner of operation of frequency multiplexing, in which signals excite different polarizations, depending on the channel frequency of the signal. Method 1900 may be employed with a system including a single feed microstrip antenna with an associated single antenna feed line. It may also be employed by a system having multiple antennas and/or feed lines. At step 1905, an RFID signal is generated. An RFID interrogator may perform this step. The channel frequency of the RFID signal may change over time within a bandwidth. In another step (not illustrated), the channel frequency of the RFID signal may change over time according to an FHSS protocol. At step 1910, the RFID signal is fed to a microstrip antenna. The microstrip antenna may be a patch antenna. This step may be performed by an antenna feed line. At step 1915, an electromagnetic wave is transmitted in response to the RFID signal fed to the microstrip antenna. The transmitted electromagnetic wave has a polarization that varies depending on the channel frequency of the RFID signal fed to the microstrip antenna. This variation of polarization depending on the channel frequency of the RFID signal has been described elsewhere in the instant disclosure. Step 1915 may be performed by the microstrip antenna.

Step 1915 may be performed as follows. An electromagnetic wave having a first polarization may be transmitted by the microstrip antenna if the channel frequency of the RFID signal falls within the first portion of the bandwidth, and an electromagnetic wave having a second polarization may be transmitted by the microstrip antenna if the channel frequency of the RFID signal falls within the second portion of the bandwidth, the first and second polarizations being orthogonal to one another.

Steps 1910 and 1915 may be performed as follows. The RFID signal may be fed to a first microstrip antenna if the channel frequency of the RFID signal falls within a first portion of the bandwidth, and the RFID signal may be fed to a second microstrip antenna if the channel frequency of the RFID signal falls within a second portion of the bandwidth, the first and second portions of the bandwidth comprising respectively different, but possibly overlapping, ranges of frequencies (step 1910). An electromagnetic wave having a first polarization may be transmitted by the first microstrip antenna if the channel frequency of the RFID signal falls within the first portion of the bandwidth, and an electromagnetic wave having a second polarization may be transmitted by the second microstrip antenna if the channel frequency of the RFID signal falls within the second portion of the bandwidth, the first and second polarizations being orthogonal to one another (step 1915).

Steps 1910 and 1915 may be performed as follows. The RFID signal may be fed to the microstrip antenna via a first transmission line if the channel frequency of the RFID signal falls within a first portion of the bandwidth, and the RFID signal may be fed to the microstrip antenna via a second transmission line if the channel frequency of the RFID signal falls within a second portion of the bandwidth, the first and second portions of the bandwidth comprising respectively different, but possibly overlapping, ranges of frequencies (step 1910). An electromagnetic wave having a first polarization may be transmitted by the microstrip antenna if the channel frequency of the RFID signal falls within the first portion of the bandwidth, and an electromagnetic wave having a second polarization may be transmitted by the microstrip antenna if the channel frequency of the RFID signal falls within the second portion of the bandwidth, the first and second polarizations being orthogonal to one another (step 1915).

The description of steps 1825, 1830, 1835 and 1840 of method 1800 is applicable to method 1900, the changes being made in view of the differences between method 1800 and method 1900 as described heretofore (e.g., method 1900 may be performed by a system including at least one single feed microstrip antenna and a single antenna feed line, while method 1800 may be performed by a system including a plurality of antennas, feed lines, or transmission lines).

As with method 1800, so too analogously method 1900 may be performed as an iterative loop, as will be understood by one of ordinary skill now having the benefit of the description of method 1800 given herein and the remainder of this disclosure.

We now turn to a discussion of various implementation examples/prototypes, test results, refinements and applications.

One prototype of an RFID-enabled pantry drawer for the International Space Station (ISS) includes four loop antennas in the drawer that are connected to an RFID reader. Although the loop antennas are highly effective at exciting RF fields in the drawer, the standoff distance from each antenna to the drawer wall is about 0.8 inches. This distance represents a significant loss of storage volume and also presents an obtrusion on which articles can become snagged. Accordingly, in some instances end users request that a planar cover for the antennas be placed over the entire wall of the drawer. This cover, of course, represents an even larger loss of storage volume. This prototype was compared with two frequency multiplexing prototypes, described below.

A second prototype is a four-element (four patch antennas), vertically-polarized feed comprising copper-clad Rogers 3010 board of thickness 0.635 mm ("VP patch"). A third prototype is a similar four-element (four patch antennas) circularly-polarized feed, using elements of the type shown in FIG. 11 ("CP patch"). The second prototype was tested with a series of full-wave simulated electric current on the feed elements at four different frequencies, each frequency corresponding to a center band of one of the elements. In the tests, one of the four elements showed a stronger current excited on it compared to the other three, thus indicating that the signal is largely multiplexed to that element. Simulation results of the power delivered to each of the four patches as a function of frequency showed four power signals that were somewhat overlapping but had distinct peaks, with higher peaks at the lowest and highest frequencies.

To compare performance, the three prototypes (loop, VP patch, and CP patch) were alternately secured in the prototype drawer and connected to an EPCglobal Class 1 Generation 2 Impinj Speedway reader. The drawer was filled with 150 Styrofoam blocks, each block containing an Alien "Squiggle" RFID tag. The number of tags read and the total number of reads were recorded for six different arrangements of the tags, the tags being disposed in a different orientation in each arrangement.

The results were tabulated in terms of the percentage of tags read for the loop, the VP patch, and the CP patch, for the six tag orientations. In most cases, the loop outperformed the multiplexed feeds. However, in all cases the multiplexed feeds read more than 90% of the 150 tags, and for some orientations the multiplexed feeds outperformed the loop feed. These results are quite positive considering that the multiplexed feeds (VP patch, CP patch) are approximately 30 times thinner than the loop antenna, and microstrip antenna efficiency degrades as the thickness decreases.

A fourth prototype is described as follows. This prototype may be thought of as a variant or elaboration of system 700, and it provides both spatial and polarization diversity for a smart drawer (or container) designed for the International Space Station (ISS). On each of two interior opposing sides of the drawer, a pair of thin panel (patch), frequency multiplexed antennas are provided, side by side. Each pair includes a vertically polarized ¼-wave antenna and a horizontally polarized ½-wave antenna. (This structure may be achieved by having the ¼-wave antenna oriented vertically and the ½-wave antenna oriented horizontally, the latter thus being rotated by 90 degrees relative to the former, as described for some embodiments in the description of FIG. 7 above.) The ¼-wave element was selected for vertical orientation due to lack of space in the vertical dimension within the drawer; if the vertical dimension is sufficient, the pair may include a vertically polarized ½-wave antenna and a horizontally polarized ¼-wave antenna. Note that each element is characterized by one mode and one polarization. However, the polarizations on opposing sides of the box are complementary, that is, the horizontally polarized antenna of the first pair (one side of the drawer) is opposed to the vertically polarized antenna of the second pair (the other side of the drawer), and the vertically polarized antenna of the first pair (one side of the drawer) is opposed to the horizontally polarized antenna of the second pair (the other side of the drawer). The attached reader uses two ports to connect to the two pairs of antennas, respectively, so that four antenna elements are effectively fed with only two feeds. Alternatively, the two pairs of antennas may be fed via a single reader port.

In the following discussion a refinement is presented. Although certain embodiments described above incorporate the bandpass function inherent in narrow band antennas (e.g., printed patch antennas) to achieve frequency multiplexing, printed or "lumped element" filters may alternatively be applied independent of any band-limiting function of the patch antenna. There are at least two advantages that may be derived from this approach, notwithstanding the fact that in some instances utilizing the patch's passband characteristics simplifies design and construction. One advantage relates to the fact that narrowing the bandwidth of the patch antenna increases its quality factor (Q), which results in a lower radiation efficiency. Segregating the patch radiation and the narrowband filtering function permits optimization of the patch as a radiator and optimization of the filter function so as to achieve a high Q for frequency multiplexing. In this arrangement, one option is to print the filter elements external to the patch. A second option is to utilize surface acoustic wave (SAW) bandpass filters. SAW filters have found extensive use in RF and microwave applications due to the extremely high Q that is achievable. For purposes of embodiments described herein, this feature may be used to refine spatial localization or extend the domain of localization over a larger area while retaining a fixed spatial localization accuracy.

In regard to this refinement, a SAW bandpass filter on a carrier with coaxial RF (e.g., SubMiniature version A (SMA)) connectors on each side was prototyped and tested. The two-port S-parameter response of the filter was measured using a vector network analyzer, and the results show that the characteristic response is well-modeled by a parallel RLC tank circuit. The recorded two-port parameter set was imported into a simulation tool. A second two-port parameter set was created by translating the original filter frequency response. Simulations were then conducted to determine how close, in spectrum, two such filters could be placed in order to determine how many localization channels could be created. The results showed that two such SAW filters can be spaced as closely as to have 2.5 MHz of center-band separation between them without significantly affecting the passband of either filter. To be sure, even narrower bandwidths can be achieved with SAW devices. Although the insertion loss increases with narrower bandwidth, these losses can be compensated for by increasing the transmit power. In some cases, however, lower transmit power is actually used. For example, cross-talk to adjacent smart shelves can be reduced through lower transmit power applied to a shelf.

In the following discussion, examples of additional applications of embodiments described herein are presented. One example application pertains to athletic training, where information pertaining to path or foot placement of an athlete is sought. For example, if a baseball pitcher's stride lands on the pitcher's glove side of the center line to the catcher, a rotational motion around the central body axis is established, making it more difficult to consistently deliver strikes. On the other hand, if the pitcher's stride lands on the other side of the center line, the pitcher tends to "throw across his body," typically reducing the achievable speed of the pitch and inducing additional stress on the throwing elbow. The length of the stride is also important, as reducing the distance from the release point to home plate reduces the time afforded the batter, by increasing the so-called "virtual velocity" of the pitch. Although motion imagery (e.g., video) can capture such foot position, the use of FM RFID would provide automated and real-time/near real-time evaluation as compared to video analysis that typically requires more human analysis and occurs much later. Footwork is likewise important for baseball players in other positions, such as catcher or shortstop. Gymnastics, fencing, tennis, football, and boxing are examples of other sports in which athletes may benefit from real-time feedback regarding foot positioning such as may be provided by FM RFID embodiments described herein.

Embodiments described herein can greatly facilitate such real-time assessment of foot position and orientation. To do so, footwear can be equipped with RFID tags. RFID tags can be made lightweight and flexible, thus being relatively imperceptible to the wearer. The multiplexed feeds can be embedded under a carpet, artificial turf, exercise mat, or the natural playing surface (e.g., Earth) of an athletic field.

Extension to a full football field would allow real-time tracking and recording of player movements as plays unfold. However, given the size of the field and the domain over which a reader can operate, such application may be quite expensive. Other applications, such as the tracking of gaming pieces (e.g., cards, chips, etc.) by FM RFID on a smart-grid table (e.g., in a casino), would be quite economical.

In light of the principles and exemplary embodiments described and illustrated herein, it will be recognized that the exemplary embodiments can be modified in arrangement and detail without departing from such principles. Also, the foregoing discussion has focused on particular embodiments, but other configurations are contemplated. In particular, even though expressions such as "in one embodiment," "in another embodiment," "in a version of the embodiment" or the like are used herein, these phrases are meant to generally reference the range of possibilities of embodiments, and are not intended to limit the disclosure to the particular embodiments and configurations described herein. As used herein, these terms may reference the same or different embodiments that are combinable into other embodiments.

Similarly, although exemplary processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, differently ordered or otherwise altered.

In view of the wide variety of useful permutations that may be readily derived from the exemplary embodiments described herein, this detailed description is intended to be illustrative only, and should not be taken as limiting the scope of the disclosure. What is claimed as the disclosure, therefore, are all implementations that come within the scope of the following claims, and all equivalents to such implementations. In the claims, means-plus-function and step-plus-function clauses are intended to cover the structures or acts described herein as performing the recited function and not only structural equivalents, but also equivalent structures. Thus, while a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A system comprising:
    an RFID interrogator configured for generating an RFID signal, wherein a channel frequency of the RFID signal changes over time;
    a plurality of antennas; and
    a diplexer coupling the RFID interrogator and the plurality of antennas and configured for distributing the RFID signal to each of the plurality of antennas, respectively, depending on the channel frequency of the RFID signal generated,
    wherein each of the plurality of antennas is configured to transmit an electromagnetic wave in response to and at the channel frequency of the RFID signal distributed thereto,
    wherein the channel frequency of the RFID signal generated by the RFID interrogator changes over time according to a frequency hopping spread spectrum protocol.

2. The system according to claim 1, wherein the diplexer comprises a plurality of bandpass filters.

3. The system according to claim 1, wherein the plurality of antennas are arranged in a linear or a rotated configuration.

4. The system according to claim 1, wherein the RFID interrogator is further configured to receive an electromagnetic signal transmitted by an RFID tag in response to an electromagnetic wave transmitted by one of the antennas.

5. The system according to claim 1, wherein the RFID interrogator is associated with logic for determining information pertaining to a location and/or orientation of an RFID tag based on an electromagnetic wave received from the RFID tag in response to an electromagnetic wave transmitted by one of the antennas.

6. A system comprising:
    an RFID interrogator configured for generating an RFID signal, wherein a channel frequency of the RFID signal changes over time within an operating bandwidth, the operating bandwidth comprising a first portion thereof and a second portion thereof, the first portion of the operating bandwidth not completely overlapping with the second portion of the operating bandwidth;
    at least one antenna; and
    a frequency selective surface,
    wherein the RFID signal is to be fed to the least one antenna, and the least one antenna is configured to transmit an electromagnetic wave in response to the RFID signal fed thereto,
    wherein the frequency selective surface is configured to present as a boundary condition a surface impedance that changes according to the frequency of an electromagnetic wave impinging thereon, wherein the frequency selective surface is configured such that (1) when the channel frequency of the RFID signal falls within the first portion of the operating bandwidth, a first surface impedance is established on the frequency selective surface that alters, according to a first pattern, the electromagnetic wave transmitted by the at least one antenna and/or an electromagnetic wave transmitted by an RFID tag for reception by the at least one antenna, and (2) when the channel frequency of the RFID signal falls within the second portion of the operating bandwidth, a second surface impedance is established on the frequency selective surface that alters, according to a second pattern, the electromagnetic wave transmitted by the at least one antenna and/or an electromagnetic wave transmitted by the RFID tag for reception by the at least one antenna, and wherein the first pattern differs from the second pattern.

7. The system according to claim 6,
wherein each of the altering of the electromagnetic wave according to the first pattern and the altering of the electromagnetic wave according to the second pattern comprises scattering the electromagnetic wave or altering a polarization of the electromagnetic wave.

8. The system according to claim 6,
wherein the operating bandwidth further comprises a third portion thereof, the third portion of the operating bandwidth not completely overlapping with the second portion of the operating bandwidth and not completely overlapping with the first portion of the operating bandwidth;
wherein the frequency selective surface is further configured such that (3) when the channel frequency of the RFID signal falls within the third portion of the operating bandwidth, a third surface impedance is established on the frequency selective surface that alters, according to a third pattern, the electromagnetic wave transmitted by the at least one antenna and/or an electromagnetic wave transmitted by an RFID tag for reception by the at least one antenna.

9. The system according to claim 8,
wherein the second portion of the operating bandwidth lies at least partly between the first portion of the operating bandwidth and the third portion of the operating bandwidth, and
wherein the third surface impedance is at least substantially the same as the first surface impedance.

10. The system according to claim 8,
wherein over the first and third portions of the operating bandwidth the frequency selective surface presents as a boundary condition a surface impedance at least substantially equivalent to a short circuit, and over the second portion of the operating bandwidth the FSS presents as a boundary condition a surface impedance at least substantially equivalent to an open circuit or a matched resistive termination.

11. The system according to claim 6, further comprising a current sheet in proximity to the frequency selective surface.

12. The system according to claim 6, wherein the frequency selective surface comprises a solid conductive layer, an insulating layer, and a printed conductive layer.

13. The system according to claim 6, wherein the frequency selective surface comprises a metamaterial.

14. A system comprising:
an RFID interrogator configured for generating an RFID signal, wherein a channel frequency of the RFID signal changes over time;
a plurality of antennas; and
a diplexer coupling the RFID interrogator and the plurality of antennas and configured for distributing the RFID signal to each of the plurality of antennas, respectively, depending on the channel frequency of the RFID signal generated,
wherein each of the plurality of antennas is configured to transmit an electromagnetic wave in response to and at the channel frequency of the RFID signal distributed thereto,
wherein the diplexer comprises a surface acoustic wave filter.

* * * * *